US010931851B2

United States Patent
Douady-Pleven et al.

(10) Patent No.: US 10,931,851 B2
(45) Date of Patent: *Feb. 23, 2021

(54) IMAGE STITCHING WITH ELECTRONIC ROLLING SHUTTER CORRECTION

(71) Applicant: GoPro, Inc., San Mateo, CA (US)

(72) Inventors: Bruno César Douady-Pleven, Orsay (FR); Antoine Meler, Chapareillan (FR); Christophe Clienti, Saint-Maur-des-Fosses (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/680,732

(22) Filed: Nov. 12, 2019

(65) Prior Publication Data

US 2020/0084338 A1 Mar. 12, 2020

Related U.S. Application Data

(63) Continuation of application No. 15/681,764, filed on Aug. 21, 2017, now Pat. No. 10,477,064.

(51) Int. Cl.
*H04N 1/387* (2006.01)
*G06T 3/00* (2006.01)
(Continued)

(52) U.S. Cl.
CPC ......... *H04N 1/3876* (2013.01); *G06T 3/0093* (2013.01); *G06T 5/005* (2013.01);
(Continued)

(58) Field of Classification Search
CPC .............. G06T 3/0093; G06T 3/4038; G06T 2207/10004; G06T 2207/10016;
(Continued)

(56) References Cited

U.S. PATENT DOCUMENTS 5,963,664 A * 10/1999 Kumar ............... G06K 9/32
382/154
6,985,619 B1 * 1/2006 Seta ................ G06K 9/00798
382/154
(Continued)

FOREIGN PATENT DOCUMENTS

WO 2015172235 A1 11/2015
WO 2017205597 11/2017

OTHER PUBLICATIONS

International Preliminary Report on Patentability for Application No. PCT/US2018/047129, dated Mar. 5, 2020, 7 pages.
(Continued)

*Primary Examiner* — Vu Le
(74) *Attorney, Agent, or Firm* — Young Basile Hanlon & MacFarlane, P.C.

(57) ABSTRACT

Systems and methods are disclosed for image signal processing. For example, methods may include receiving a first image from a first image sensor; receiving a second image from a second image sensor; determining an electronic rolling shutter correction mapping for the first image and the second image; determining a parallax correction mapping based on the first image and the second image for stitching the first image and the second image; determining a warp mapping based on the parallax correction mapping and the electronic rolling shutter correction mapping, wherein the warp mapping applies the electronic rolling shutter correction mapping after the parallax correction mapping; applying the warp mapping to image data based on the first image and the second image to obtain a composite image; and storing, displaying, or transmitting an output image that is based on the composite image.

20 Claims, 15 Drawing Sheets

(51) Int. Cl.
  *G06T 5/00* (2006.01)
  *H04N 5/232* (2006.01)
  *H04N 5/225* (2006.01)
  *H04N 5/353* (2011.01)

(52) U.S. Cl.
  CPC ....... *H04N 5/2258* (2013.01); *H04N 5/23238* (2013.01); *H04N 5/3532* (2013.01)

(58) Field of Classification Search
  CPC .......... G06T 2207/20128; G06T 2207/20221; G06T 2210/22; G06T 3/0068; G06T 5/006; G06T 5/50; G06T 7/344; G06T 7/85; G06T 2207/10012; G06T 2207/10028; G06T 2207/20016; G06T 7/593; G06T 17/00; G06T 2207/10021; G06T 7/50; G06T 7/60; G06T 5/005; G06T 2200/24; G06T 2200/28; G06T 2207/10024; G06T 2207/20096; G06T 7/11; G06T 7/194; G06T 7/246; G06T 17/05; H04N 5/2258; H04N 5/23238; H04N 5/247; H04N 17/002; H04N 19/85; H04N 5/2252; H04N 5/2253; H04N 5/2257; H04N 5/23216; H04N 5/23229; H04N 5/23232; H04N 5/2624; H04N 5/2628; H04N 5/3415; H04N 5/3572; H04N 13/128; H04N 13/243; H04N 13/271; H04N 2013/0081; H04N 5/2226; H04N 5/2256; H04N 5/332; H04N 13/239; H04N 13/25; H04N 13/282; H04N 5/3532; H04N 5/225; H04N 5/23222; H04N 1/3876; H04N 5/272; H04N 13/15; H04N 5/23293; H04N 5/2621; G02B 2027/0136; G02B 2027/0138; G02B 2027/014; G02B 27/017; G02B 27/0172; G02B 2207/10012; G02B 2207/10028; G02B 2207/20016; G02B 7/593; A61B 5/0013; A61B 90/20; G06K 9/66; G06K 9/00798; G06K 9/00818; G06K 9/44; B60W 2420/42; G01C 21/3635; G01C 21/3638
  USPC ........ 382/284, 275, 151, 103; 348/175, 188, 348/95, 36, 47, 48, 135
  See application file for complete search history.

(56) References Cited

U.S. PATENT DOCUMENTS

| | | | | |
|---|---|---|---|---|
| 8,619,082 | B1* | 12/2013 | Ciurea | ................ H04N 13/243 345/427 |
| 8,970,675 | B2* | 3/2015 | Morioka | .............. H04N 13/189 348/46 |
| 9,639,935 | B1 | 5/2017 | Douady-Pleven | |
| 2006/0204040 | A1* | 9/2006 | Freeman | ................ G06T 7/246 382/107 |
| 2008/0240612 | A1 | 10/2008 | Liang | |
| 2009/0290641 | A1 | 11/2009 | Crinon | |
| 2010/0189179 | A1 | 7/2010 | Gu | |
| 2010/0322306 | A1 | 12/2010 | Au | |
| 2011/0033130 | A1 | 2/2011 | Poon | |
| 2012/0105597 | A1* | 5/2012 | Tajiri | ................... H04N 13/128 348/49 |
| 2012/0154545 | A1 | 6/2012 | Choi | |
| 2013/0021483 | A1 | 1/2013 | Bennett | |
| 2013/0051689 | A1 | 2/2013 | Shimauchi | |
| 2013/0051697 | A1 | 2/2013 | Takahashi | |
| 2014/0028876 | A1 | 1/2014 | Mills | |
| 2014/0160309 | A1* | 6/2014 | Karpenko | ............ H04N 5/2329 348/208.6 |
| 2014/0341287 | A1 | 11/2014 | Mody | |
| 2014/0369584 | A1* | 12/2014 | Fan | ...................... A61B 5/1079 382/131 |
| 2015/0002734 | A1* | 1/2015 | Lee | ...................... H04N 5/3532 348/367 |
| 2015/0016543 | A1 | 1/2015 | Rapaka | |
| 2015/0042767 | A1* | 2/2015 | Ciurea | .................... G06T 7/557 348/48 |
| 2015/0049193 | A1 | 2/2015 | Gupta | |
| 2015/0254868 | A1* | 9/2015 | Srikanth | ................. G06T 7/194 348/47 |
| 2015/0293328 | A1* | 10/2015 | Laroia | .................. H04N 5/2622 348/369 |
| 2015/0302561 | A1 | 10/2015 | Pekkucuksen | |
| 2015/0317781 | A1 | 11/2015 | Napier | |
| 2016/0037061 | A1 | 2/2016 | Lim | |
| 2016/0063676 | A1* | 3/2016 | Donovan | .............. G06T 3/4007 382/162 |
| 2016/0125570 | A1 | 5/2016 | MacMillan | |
| 2016/0142643 | A1* | 5/2016 | Jiang | ...................... G06T 5/006 348/598 |
| 2016/0307346 | A1 | 10/2016 | Staudenmaier | |
| 2016/0309134 | A1* | 10/2016 | Venkataraman | ....... G01C 11/06 |
| 2016/0358355 | A1* | 12/2016 | Lin | ..................... G06K 9/4638 |
| 2017/0084007 | A1 | 3/2017 | Rakhshanfar | |
| 2017/0111652 | A1 | 4/2017 | Davies | |
| 2017/0287184 | A1 | 10/2017 | Pettersson | |
| 2018/0262683 | A1* | 9/2018 | Meler | ...................... G06T 7/70 |

OTHER PUBLICATIONS

Form PCT/ISA/206 and Annex to Form PCT/ISA/206 Communication Relating to the Results of the Partial International Search for International Application No. PCT/US2017/034231 dated Sep. 13, 2017 (14 pgs).
International Search Report and Written Opinion for PCT/US2018/047129, dated Dec. 12, 2018, 10 pages.
PCT International Preliminary Report and Written Opinion for PCT/US2017/034231 dated Nov. 27, 2018, 11 pages.
PCT International Preliminary Report and Writtten Opinion for PCT/US2017/034422, dated Nov. 27, 2018, 10 pages.
PCT International Search Report and Written Opinion for PCT/US16/31076, dated Aug. 8, 2016, 19 Pages.
PCT International Search Report and Written Opinion for PCT/US2017/034231 dated Nov. 7, 2017, 19 pages.
Pesquet-Popescu et al., "Motion Estimation Techniques," TELECOM Paris Tech, https://pdfs.semanticscholar.org/98ca/f8325abb40aa6bbddd0e7f5d3a6c366d03e6.pdf, 76 pages.

* cited by examiner

IMAGE STITCHING WITH ELECTRONIC ROLLING SHUTTER CORRECTION

CROSS REFERENCE TO RELATED APPLICATION(S)

This application is a continuation of U.S. application Ser. No. 15/681,764, filed Aug. 21, 2017, which is incorporated by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

TECHNICAL FIELD

The present disclosure relates to digital image and video processing.

BACKGROUND

Image capture devices, such as cameras, may capture content as images or video. Light may be received and focused via a lens and may be converted to an electronic image signal by an image sensor. The image signal may be processed by an image signal processor (ISP) to form an image, which may be stored and/or encoded. In some implementations, multiple images or video frames may include spatially adjacent or overlapping content. Accordingly, systems, methods, and apparatus for capturing, processing, and/or encoding images, video, or both may be advantageous.

SUMMARY

The present disclosure describes, inter alia, apparatus and methods for digital image and video processing.

In a first aspect, the subject matter described in this specification can be embodied in systems that include a first image sensor configured to capture a first image and a second image sensor configured to capture a second image. The systems include a processing apparatus that is configured to receive the first image from the first image sensor; receive the second image from the second image sensor; determine an electronic rolling shutter correction mapping for the first image and the second image, wherein the electronic rolling shutter correction mapping specifies translations of image portions that depend on location within the first image and the second image along a dimension along which a rolling shutter advanced; determine compensated epipolar lines based on electronic rolling shutter data; determine a parallax correction mapping based on the first image, the second image, and the compensated epipolar lines; determine a warp mapping based on the parallax correction mapping and the electronic rolling shutter correction mapping, wherein the warp mapping applies the electronic rolling shutter correction mapping to output of the parallax correction mapping; apply the warp mapping to image data based on the first image and the second image to obtain a composite image; and store, display, or transmit an output image that is based on the composite image.

In a second aspect, the subject matter described in this specification can be embodied in methods that include receiving a first image from a first image sensor; receiving a second image from a second image sensor; determining an electronic rolling shutter correction mapping for the first image and the second image, wherein the electronic rolling shutter correction mapping specifies translations of image portions that depend on location within the first image and the second image along a dimension along which a rolling shutter advanced; determining a parallax correction mapping based on the first image and the second image for stitching the first image and the second image; determining a warp mapping based on the parallax correction mapping and the electronic rolling shutter correction mapping, wherein the warp mapping applies the electronic rolling shutter correction mapping after the parallax correction mapping; applying the warp mapping to image data based on the first image and the second image to obtain a composite image; and storing, displaying, or transmitting an output image that is based on the composite image.

In a third aspect, the subject matter described in this specification can be embodied in systems that include a first image sensor configured to capture a first image; and a second image sensor configured to capture a second image. The systems include a processing apparatus that is configured to perform operations including: receiving the first image from the first image sensor; receiving the second image from the second image sensor; applying parallax correction for stitching the first image and the second image to obtain a composite image; applying electronic rolling shutter correction to the composite image to obtain an electronic rolling shutter corrected image, where the electronic rolling shutter correction mitigates distortion caused by movement of the first image sensor and the second image sensor between times when different portions of the first image and the second image are captured; and storing, displaying, or transmitting an output image that is based on the electronic rolling shutter corrected image.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

BRIEF DESCRIPTION OF THE DRAWINGS

The disclosed embodiments have other advantages and features which will be more readily apparent from the detailed description, the appended claims, and the accompanying figures. A brief introduction of the figures is below.

Figure 1:
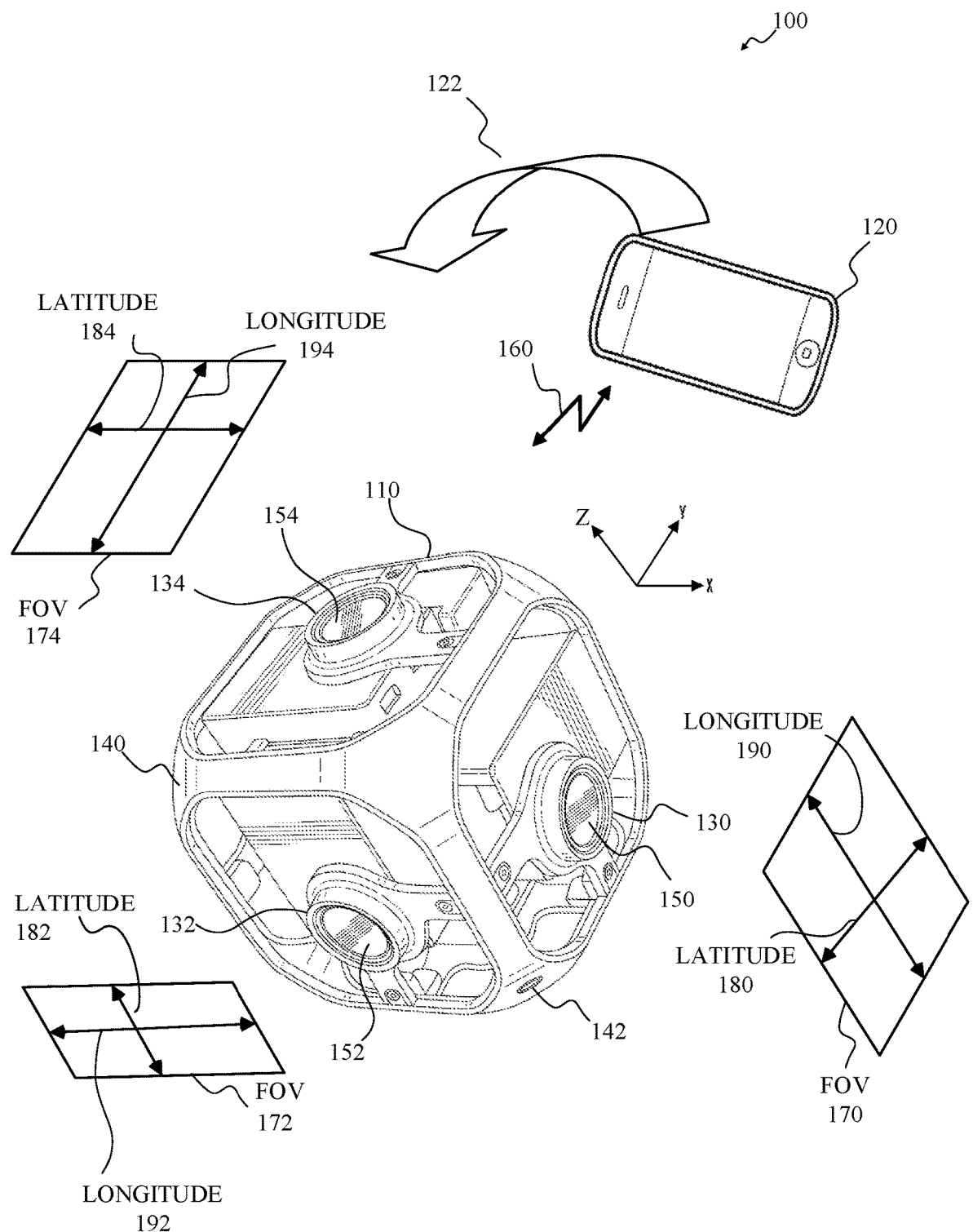
FIG. 1 is a diagram of an example of an image capture system for content capture in accordance with implementations of this disclosure.

All figures disclosed herein are © Copyright 2019 GoPro Inc. All rights reserved.

DETAILED DESCRIPTION

This document includes disclosure of systems, apparatus, and methods for stitching images captured using electronic rolling shutter image sensors. For example, some image capture systems include multiple (e.g., two or six) image sensors and generate composite images by stitching images from two or more sensors together. Stitching may be a dynamic, data-dependent operation that may introduce distortions into the resulting composite image. For example, a slight misalignment of pixels from two images being stitched can result in discontinuities (e.g., lines at which color changes abruptly) in the composite, stitched image, which can be quite noticeable to humans and significantly degrade image quality. Stitching is a process of combining images with overlapping fields of view to produce a composite image (e.g., to form a panoramic image). Stitching may include aligning the pixels of two images being combined in a region (which may be called a seam) along a boundary between sections of a composite image that are respectively based on two different input images—called a stitching boundary. For example, stitching may include applying parallax correction (e.g., binocular disparity correction) to align pixels corresponding to objects appearing in the fields of view of multiple image sensors. For example, because the binocular disparity depends on the distance of an object from the image sensors, the stitching process may be data dependent in the sense that it utilizes image data reflecting positions of objects in the fields of view of the sensors during the capture of a particular image (e.g., a particular frame of video) to determine the mappings of pixels from input images to a composite image.

Parallax correction for stitching can be significantly complicated by motion artifacts, including motion artifacts related to the use of an electronic rolling shutter for image capture. For example, multiple images (e.g., two images captured through fisheye lenses) with overlapping fields of view may be combined, by stitching, to form a composite image (e.g., a spherical image, or panoramic image). The optical centers of the image sensors used to capture the constituent images may not coincide, which may cause a parallax effect. Parallax correction (also called disparity correction) may be used to properly align pixels from two constituent images that correspond to objects appearing in the overlapping region of the constituent images. Determining a parallax correction transformation may include searching along an epipolar line for the correspondence of an image portion (e.g., a pixel or a block of pixels) of one of the images in the other image and stretching the images accordingly. The search for a corresponding image portion along the epipolar line (determined by the geometry of the camera device(s) holding the image sensors) is a one dimensional search. If the timings of image capture in the image sensors are not synchronized sufficiently precisely, an image capture device holding the image sensors may have moved between the times at which the images have been taken. Even if such movement is small, this may cause movement of pixels that correspond for the parallax correction search to move off of the epipolar lines, thus a more complex two dimensional search for pixel correspondence in the image overlap region may be needed to achieve a desired image quality. Also, an electronic rolling shutter may be used to capture the constituent images, which can cause additional image distortion in the presence of motion of an image capture device, since different portions of the constituent images are captured at slightly different times. These distortions may be mitigated using a warp mapping that maps image portions (e.g., pixels or blocks of pixels) from the locations in constituent images to locations within a composite image. For example, the following steps may be implemented by applying a warp mapping to stitch constituent images: compensate lens distortion; compensate electronic rolling shutter distortion; compensate stitching disparity (or parallax); and project on a chosen output space (e.g., 6-faces or Cube Map Projection (CMP), equirectangular projection (ERP), spherical, Equi-Angular Cubemap (EAC), Rotated Sphere Projection (RSP3x2)).

By performing electronic rolling shutter correction jointly with parallax correction, the processing resources required for parallax compensation may be significantly reduced. For example, when parallax correction is performed jointly with electronic rolling shutter correction, a one dimensional search (along the epipolars) for matching constituent images may achieve sufficient image quality, while if electronic rolling shutter correction is not performed to compensate for camera motion related distortion, a two dimensional search (which may be significantly more demanding in terms of processor cycles) may be needed to achieve a desired image quality.

Additional savings of computing resources may be achieved by inverting the natural order of electronic rolling shutter correction and parallax correction. Normally, physically, electronic rolling shutter correction is applied and parallax correction is applied to the resulting electronic rolling shutter corrected constituent images. In this scenario, because the processing order for determining a warp mapping specifying these distortion corrections walks backward, from output to input, a parallax correction is determined first and then an electronic rolling shutter correction is determined for the resulting partial mapping with parallax correction. The problem with this natural order is that parallax distortion is a high spatial frequency phenomenon; thus, the processing to determine parallax correction is performed at a high resolution using relatively small image portions (e.g., 8×8 blocks of pixels). Once such a fine grain correction mapping is determined, the subsequent determination of additional distortion corrections require this fine grain (high resolution), which may greatly increase the complexity of the subsequent distortion correction processing. By itself, electronic rolling shutter compensation is a low spatial frequency phenomenon which can be corrected at a low resolution using relatively larger image portions (e.g., on a grid of 32×32 pixel blocks), which is much less demanding in terms of processing requirements. By inverting the order of computation for electronic rolling shutter correction and parallax correction, electronic rolling shutter correction can be determined at a lower resolution (e.g., 32×32 pixel blocks) and parallax correction can be determined at a higher resolution (e.g., 8×8 pixel blocks), rather than having to determine both of these corrections at high resolution. To achieve this inversion, compensation of the epipolar lines used to determine the parallax correction displacements may be performed, though, this compensation of epipolar lines is much lighter in terms of processing requirements than determining the electronic rolling shutter correction at the higher resolution.

For example, these approaches may be implemented by: determining a warp mapping (e.g., a coordinate mapping between image portions of the composite image and image portions of the constituent images on which they are based); applying the warp mapping to the input images (e.g., after in-place processing, such as noise reduction and demosaicing) to determine the composite image; and near a boundary between constituent images, blending the images to have a smooth transition from one image to the other. To determine the warp mapping, processing may proceed backward from output to input as follows: first project output space to a sphere at low resolution (e.g., using 32×32 pixel blocks); next determine an electronic rolling shutter correction at low resolution, ignoring parallax correction; next compensate epipolar lines for the image sensors based on electronic rolling shutter data for near points of the epipolar lines; then determine parallax correction at high resolution (e.g., using 8×8 pixel blocks) by finding corresponding pixels in the overlap area, searching along the compensated epipolar lines; and then determine lens distortion correction at high resolution. Determining electronic rolling shutter correction before parallax correction allows electronic rolling shutter correction to be processed at lower resolution, using less computing resources as compared to determining electronic rolling shutter correction after parallax correction.

FIG. 1 is a diagram of an example of an image capture system 100 for content capture in accordance with implementations of this disclosure. As shown in FIG. 1, an image capture system 100 may include an image capture apparatus 110, an external user interface (UI) device 120, or a combination thereof.

In some implementations, the image capture apparatus 110 may be a multi-face apparatus and may include multiple image capture devices, such as image capture devices 130, 132, 134 as shown in FIG. 1, arranged in a structure 140, such as a cube-shaped cage as shown. Although three image capture devices 130, 132, 134 are shown for simplicity in FIG. 1, the image capture apparatus 110 may include any number of image capture devices. For example, the image capture apparatus 110 shown in FIG. 1 may include six cameras, which may include the three image capture devices 130, 132, 134 shown and three cameras not shown.

In some implementations, the structure 140 may have dimensions, such as between 25 mm and 150 mm. For example, the length of each side of the structure 140 may be 105 mm. The structure 140 may include a mounting port 142, which may be removably attachable to a supporting structure, such as a tripod, a photo stick, or any other camera mount (not shown). The structure 140 may be a rigid support structure, such that the relative orientation of the image capture devices 130, 132, 134 of the image capture apparatus 110 may be maintained in relatively static or fixed alignment, except as described herein.

The image capture apparatus 110 may obtain, or capture, image content, such as images, video, or both, with a 360° field-of-view, which may be referred to herein as panoramic or spherical content. For example, each of the image capture devices 130, 132, 134 may include respective lenses, for receiving and focusing light, and respective image sensors for converting the received and focused light to an image signal, such as by measuring or sampling the light, and the multiple image capture devices 130, 132, 134 may be arranged such that respective image sensors and lenses capture a combined field-of-view characterized by a spherical or near spherical field-of-view.

In some implementations, each of the image capture devices 130, 132, 134 may have a respective field-of-view 170, 172, 174, such as a field-of-view 170, 172, 174 that 90° in a lateral dimension 180, 182, 184 and includes 120° in a longitudinal dimension 190, 192, 194. In some implementations, image capture devices 130, 132, 134 having overlapping fields-of-view 170, 172, 174, or the image sensors thereof, may be oriented at defined angles, such as at 90°, with respect to one another. In some implementations, the image sensor of the image capture device 130 is directed along the X axis, the image sensor of the image capture device 132 is directed along the Y axis, and the image sensor of the image capture device 134 is directed along the Z axis. The respective fields-of-view 170, 172, 174 for adjacent image capture devices 130, 132, 134 may be oriented to allow overlap for a stitching function. For example, the longitudinal dimension 190 of the field-of-view 170 for the image capture device 130 may be oriented at 90° with respect to the latitudinal dimension 184 of the field-of-view 174 for the image capture device 134, the latitudinal dimension 180 of the field-of-view 170 for the image capture device 130 may be oriented at 90° with respect to the longitudinal dimension 192 of the field-of-view 172 for the image capture device 132, and the latitudinal dimension 182 of the field-of-view 172 for the image capture device 132 may be oriented at 90° with respect to the longitudinal dimension 194 of the field-of-view 174 for the image capture device 134.

The image capture apparatus 110 shown in FIG. 1 may have 420° angular coverage in vertical and/or horizontal planes by the successive overlap of 90°, 120°, 90°, 120° respective fields-of-view 170, 172, 174 (not all shown) for four adjacent image capture devices 130, 132, 134 (not all shown). For example, fields-of-view 170, 172 for the image capture devices 130, 132 and fields-of-view (not shown) for two image capture devices (not shown) opposite the image capture devices 130, 132 respectively may be combined to provide 420° angular coverage in a horizontal plane. In some implementations, the overlap between fields-of-view of image capture devices 130, 132, 134 having a combined field-of-view including less than 360° angular coverage in a vertical and/or horizontal plane may be aligned and merged or combined to produce a panoramic image. For example, the image capture apparatus 110 may be in motion, such as rotating, and source images captured by at least one of the image capture devices 130, 132, 134 may be combined to form a panoramic image. As another example, the image capture apparatus 110 may be stationary, and source images captured contemporaneously by each image capture device 130, 132, 134 may be combined to form a panoramic image.

In some implementations, an image capture device 130, 132, 134 may include a lens 150, 152, 154 or other optical element. An optical element may include one or more lens, macro lens, zoom lens, special-purpose lens, telephoto lens, prime lens, achromatic lens, apochromatic lens, process lens, wide-angle lens, ultra-wide-angle lens, fisheye lens, infrared lens, ultraviolet lens, perspective control lens, other lens, and/or other optical element. In some implementations, a lens 150, 152, 154 may be a fisheye lens and produce fisheye, or near-fisheye, field-of-view images. For example, the respective lenses 150, 152, 154 of the image capture devices 130, 132, 134 may be fisheye lenses. In some implementations, images captured by two or more image capture devices 130, 132, 134 of the image capture apparatus 110 may be combined by stitching or merging fisheye projections of the captured images to produce an equirectangular planar image. For example, a first fisheye image may be a round or elliptical image, and may be transformed to a first rectangular image, a second fisheye image may be a round or elliptical image, and may be transformed to a second rectangular image, and the first and second rectangular images may be arranged side-by-side, which may include overlapping, and stitched together to form the equirectangular planar image.

Although not expressly shown in FIG. 1, In some implementations, an image capture device 130, 132, 134 may include one or more image sensors, such as a charge-coupled device (CCD) sensor, an active pixel sensor (APS), a complementary metal-oxide semiconductor (CMOS) sensor, an N-type metal-oxide-semiconductor (NMOS) sensor, and/or any other image sensor or combination of image sensors.

Although not expressly shown in FIG. 1, in some implementations, an image capture apparatus 110 may include one or more microphones, which may receive, capture, and record audio information, which may be associated with images acquired by the image sensors.

Although not expressly shown in FIG. 1, the image capture apparatus 110 may include one or more other information sources or sensors, such as an inertial measurement unit (IMU), a global positioning system (GPS) receiver component, a pressure sensor, a temperature sensor, a heart rate sensor, or any other unit, or combination of units, that may be included in an image capture apparatus.

In some implementations, the image capture apparatus 110 may interface with or communicate with an external device, such as the external user interface (UI) device 120, via a wired (not shown) or wireless (as shown) computing communication link 160. Although a single computing communication link 160 is shown in FIG. 1 for simplicity, any number of computing communication links may be used.

Although the computing communication link 160 shown in FIG. 1 is shown as a direct computing communication link, an indirect computing communication link, such as a link including another device or a network, such as the internet, may be used. In some implementations, the computing communication link 160 may be a Wi-Fi link, an infrared link, a Bluetooth (BT) link, a cellular link, a ZigBee link, a near field communications (NFC) link, such as an ISO/IEC 23243 protocol link, an Advanced Network Technology interoperability (ANT+) link, and/or any other wireless communications link or combination of links. In some implementations, the computing communication link 160 may be an HDMI link, a USB link, a digital video interface link, a display port interface link, such as a Video Electronics Standards Association (VESA) digital display interface link, an Ethernet link, a Thunderbolt link, and/or other wired computing communication link.

In some implementations, the user interface device 120 may be a computing device, such as a smartphone, a tablet computer, a phablet, a smart watch, a portable computer, and/or another device or combination of devices configured to receive user input, communicate information with the image capture apparatus 110 via the computing communication link 160, or receive user input and communicate information with the image capture apparatus 110 via the computing communication link 160.

In some implementations, the image capture apparatus 110 may transmit images, such as panoramic images, or portions thereof, to the user interface device 120 via the computing communication link 160, and the user interface device 120 may store, process, display, or a combination thereof the panoramic images.

In some implementations, the user interface device 120 may display, or otherwise present, content, such as images or video, acquired by the image capture apparatus 110. For example, a display of the user interface device 120 may be a viewport into the three-dimensional space represented by the panoramic images or video captured or created by the image capture apparatus 110.

In some implementations, the user interface device 120 may communicate information, such as metadata, to the image capture apparatus 110. For example, the user interface device 120 may send orientation information of the user interface device 120 with respect to a defined coordinate system to the image capture apparatus 110, such that the image capture apparatus 110 may determine an orientation of the user interface device 120 relative to the image capture apparatus 110. Based on the determined orientation, the image capture apparatus 110 may identify a portion of the panoramic images or video captured by the image capture apparatus 110 for the image capture apparatus 110 to send to the user interface device 120 for presentation as the viewport. In some implementations, based on the determined orientation, the image capture apparatus 110 may determine the location of the user interface device 120 and/or the dimensions for viewing of a portion of the panoramic images or video.

In an example, a user may rotate (sweep) the user interface device 120 through an arc or path 122 in space, as indicated by the arrow shown at 122 in FIG. 1. The user interface device 120 may communicate display orientation information to the image capture apparatus 110 using a communication interface such as the computing communication link 160. The image capture apparatus 110 may provide an encoded bitstream to enable viewing of a portion of the panoramic content corresponding to a portion of the environment of the display location as the image capture apparatus 110 traverses the path 122. Accordingly, display orientation information from the user interface device 120 may be transmitted to the image capture apparatus 110 to control user selectable viewing of captured images and/or video.

In some implementations, the image capture apparatus 110 may communicate with one or more other external devices (not shown) via wired or wireless computing communication links (not shown).

In some implementations, data, such as image data, audio data, and/or other data, obtained by the image capture apparatus 110 may be incorporated into a combined multimedia stream. For example, the multimedia stream may include a video track and/or an audio track. As another example, information from various metadata sensors and/or sources within and/or coupled to the image capture apparatus 110 may be processed to produce a metadata track associated with the video and/or audio track. The metadata track may include metadata, such as white balance metadata, image sensor gain metadata, sensor temperature metadata, exposure time metadata, lens aperture metadata, bracketing configuration metadata and/or other parameters. In some implementations, a multiplexed stream may be generated to incorporate a video and/or audio track and one or more metadata tracks.

In some implementations, the user interface device 120 may implement or execute one or more applications, such as GoPro Studio, GoPro App, or both, to manage or control the image capture apparatus 110. For example, the user interface device 120 may include an application for controlling camera configuration, video acquisition, video display, or any other configurable or controllable aspect of the image capture apparatus 110.

In some implementations, the user interface device 120, such as via an application (e.g., GoPro App), may generate and share, such as via a cloud-based or social media service, one or more images, or short video clips, such as in response to user input.

In some implementations, the user interface device 120, such as via an application (e.g., GoPro App), may remotely control the image capture apparatus 110, such as in response to user input.

In some implementations, the user interface device 120, such as via an application (e.g., GoPro App), may display unprocessed or minimally processed images or video captured by the image capture apparatus 110 contemporaneously with capturing the images or video by the image capture apparatus 110, such as for shot framing, which may be referred to herein as a live preview, and which may be performed in response to user input.

In some implementations, the user interface device 120, such as via an application (e.g., GoPro App), may mark one or more key moments contemporaneously with capturing the images or video by the image capture apparatus 110, such as with a HiLight Tag, such as in response to user input.

In some implementations, the user interface device 120, such as via an application (e.g., GoPro App), may display, or otherwise present, marks or tags associated with images or video, such as HiLight Tags, such as in response to user input. For example, marks may be presented in a GoPro Camera Roll application for location review and/or playback of video highlights.

In some implementations, the user interface device 120, such as via an application (e.g., GoPro App), may wirelessly control camera software, hardware, or both. For example, the user interface device 120 may include a web-based graphical interface accessible by a user for selecting a live or previously recorded video stream from the image capture apparatus 110 for display on the user interface device 120.

In some implementations, the user interface device 120 may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture apparatus 110.

Figure 2B:
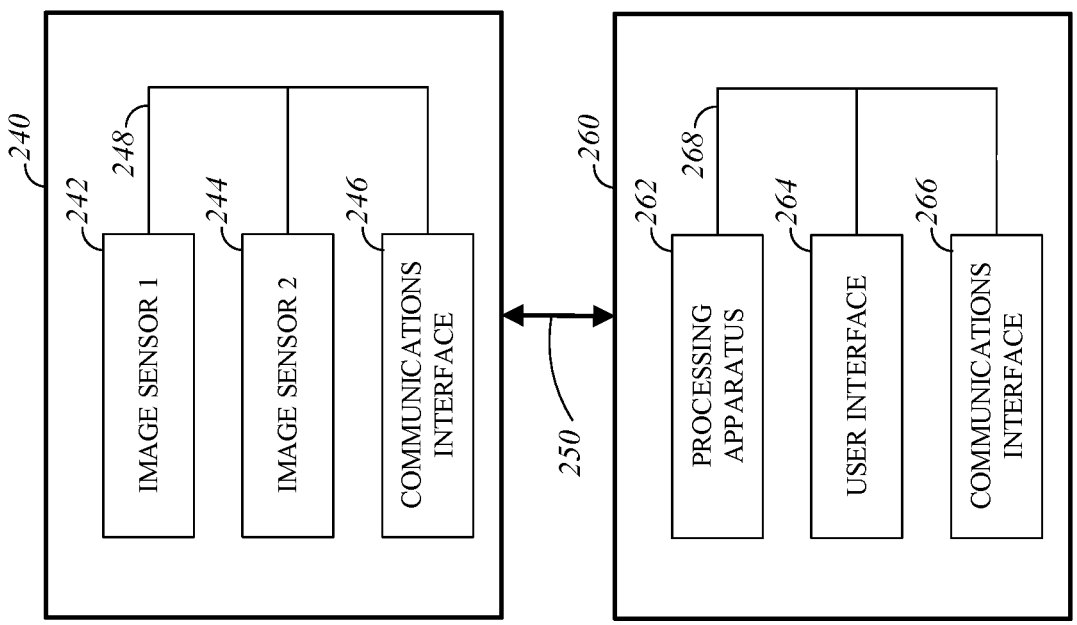
FIG. 2B is a block diagram of an example of a system configured for image capture and stitching.
Figure 2A:
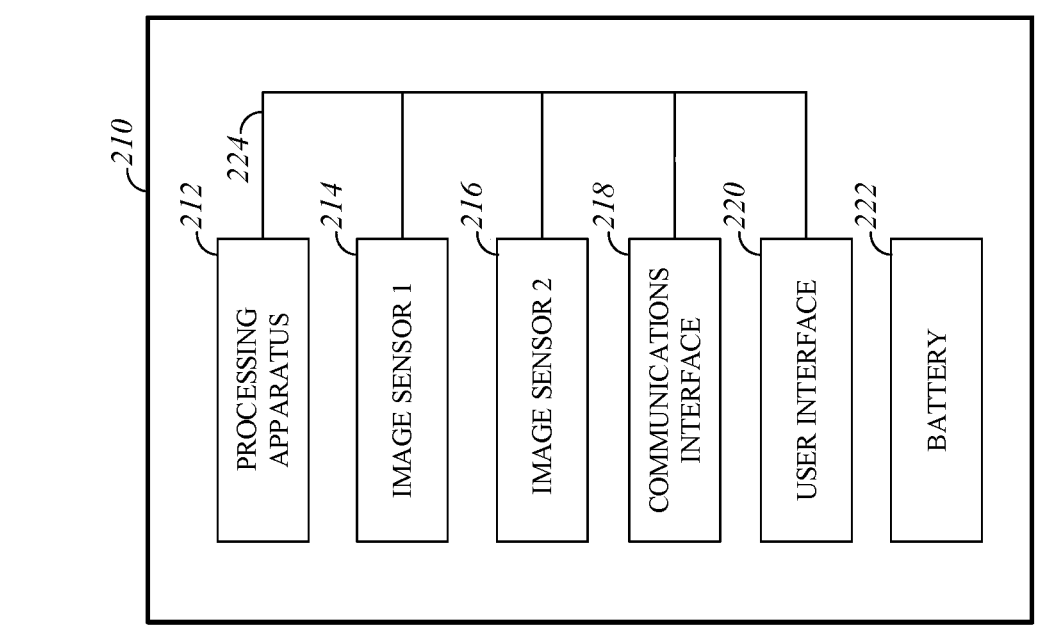
FIG. 2A is a block diagram of an example of a system configured for image capture and stitching.

FIG. 2A is a block diagram of an example of a system 200 configured for image capture and stitching. The system 200 includes an image capture device 210 (e.g., a camera or a drone) that includes a processing apparatus 212 that is configured to receive a first image from a first image sensor 214 and receive a second image from a second image sensor 216. The processing apparatus 212 may be configured to perform image signal processing (e.g., filtering, stitching, and/or encoding) to generated composite images based on image data from the image sensors 214 and 216. The image capture device 210 includes a communications interface 218 for transferring images to other devices. The image capture device 210 includes a user interface 220, which may allow a user to control image capture functions and/or view images. The image capture device 210 includes a battery 222 for powering the image capture device 210. The components of the image capture device 210 may communicate with each other via a bus 224. The system 200 may be used to implement techniques described in this disclosure, such as the technique 1000 of FIG. 10 and/or the technique 1200 of FIG. 12A.

The processing apparatus 212 may include one or more processors having single or multiple processing cores. The processing apparatus 212 may include memory, such as random access memory device (RAM), flash memory, or any other suitable type of storage device such as a non-transitory computer readable memory. The memory of the processing apparatus 212 may include executable instructions and data that can be accessed by one or more processors of the processing apparatus 212. For example, the processing apparatus 212 may include one or more DRAM modules such as double data rate synchronous dynamic random-access memory (DDR SDRAM). In some implementations, the processing apparatus 212 may include a digital signal processor (DSP). In some implementations, the processing apparatus 212 may include an application specific integrated circuit (ASIC). For example, the processing apparatus 212 may include a custom image signal processor.

The first image sensor 214 and the second image sensor 216 are configured to detect light of a certain spectrum (e.g., the visible spectrum or the infrared spectrum) and convey information constituting an image as electrical signals (e.g., analog or digital signals). For example, the image sensors 214 and 216 may include charge-coupled devices (CCD) or active pixel sensors in complementary metal-oxide-semiconductor (CMOS). The image sensors 214 and 216 may detect light incident through respective lens (e.g., a fisheye lens). In some implementations, the image sensors 214 and 216 include digital to analog converters. In some implementations, the image sensors 214 and 216 are held in a fixed orientation with respective fields of view that overlap.

The image capture device 210 may include the communications interface 218, which may enable communications with a personal computing device (e.g., a smartphone, a tablet, a laptop computer, or a desktop computer). For example, the communications interface 218 may be used to receive commands controlling image capture and processing in the image capture device 210. For example, the communications interface 218 may be used to transfer image data to a personal computing device. For example, the communications interface 218 may include a wired interface, such as a high-definition multimedia interface (HDMI), a universal serial bus (USB) interface, or a FireWire interface. For example, the communications interface 218 may include a wireless interface, such as a Bluetooth interface, a ZigBee interface, and/or a Wi-Fi interface.

The image capture device 210 may include the user interface 220. For example, the user interface 220 may include an LCD display for presenting images and/or messages to a user. For example, the user interface 220 may include a button or switch enabling a person to manually turn the image capture device 210 on and off. For example, the user interface 220 may include a shutter button for snapping pictures.

The image capture device 210 may include the battery 222 that powers the image capture device 210 and/or its peripherals. For example, the battery 222 may be charged wirelessly or through a micro-USB interface.

FIG. 2B is a block diagram of an example of a system 230 configured for image capture and stitching. The system 230 includes an image capture device 240 that communicates via a communications link 250 with a personal computing device 260. The image capture device 240 includes a first image sensor 242 and a second image sensor 244 that are configured to capture respective images. The image capture device 240 includes a communications interface 246 configured to transfer images via the communication link 250 to the personal computing device 260. The personal computing device 260 includes a processing apparatus 262, a user interface 264, and a communications interface 266. The processing apparatus 262 is configured to receive, using the communications interface 266, a first image from the first image sensor 242, and receive a second image from the second image sensor 244. The processing apparatus 262 may be configured to perform image signal processing (e.g., filtering, stitching, and/or encoding) to generated composite images based on image data from the image sensors 242 and 244. The system 230 may be used to implement techniques described in this disclosure, such as the technique 1000 of FIG. 10 and/or the technique 1200 of FIG. 12A.

The first image sensor 242 and the second image sensor 244 are configured to detect light of a certain spectrum (e.g., the visible spectrum or the infrared spectrum) and convey information constituting an image as electrical signals (e.g., analog or digital signals). For example, the image sensors 242 and 244 may include charge-coupled devices (CCD) or active pixel sensors in complementary metal-oxide-semiconductor (CMOS). The image sensors 242 and 244 may detect light incident through respective lens (e.g., a fisheye lens). In some implementations, the image sensors 242 and 244 include digital to analog converters. In some implementations, the image sensors 242 and 244 are held in a fixed relative orientation with respective fields of view that overlap. Image signals from the image sensors 242 and 244 may be passed to other components of the image capture device 240 via a bus 248.

The communications link 250 may be wired communications link or a wireless communications link. The communications interface 246 and the communications interface 266 may enable communications over the communications link 250. For example, the communications interface 246 and the communications interface 266 may include a high-definition multimedia interface (HDMI), a universal serial bus (USB) interface, a FireWire interface, a Bluetooth interface, a ZigBee interface, and/or a Wi-Fi interface. For example, the communications interface 246 and the communications interface 266 may be used to transfer image data from the image capture device 240 to the personal computing device 260 for image signal processing (e.g., filtering, stitching, and/or encoding) to generated composite images based on image data from the image sensors 242 and 244.

The processing apparatus 262 may include one or more processors having single or multiple processing cores. The processing apparatus 262 may include memory, such as random access memory device (RAM), flash memory, or any other suitable type of storage device such as a non-transitory computer readable memory. The memory of the processing apparatus 262 may include executable instructions and data that can be accessed by one or more processors of the processing apparatus 262. For example, the processing apparatus 262 may include one or more DRAM modules such as double data rate synchronous dynamic random-access memory (DDR SDRAM). In some implementations, the processing apparatus 262 may include a digital signal processor (DSP). In some implementations, the processing apparatus 262 may include an application specific integrated circuit (ASIC). For example, the processing apparatus 262 may include a custom image signal processor. The processing apparatus 262 may exchange data (e.g., image data) with other components of the personal computing device 260 via the bus 268.

The personal computing device 260 may include the user interface 264. For example, the user interface 264 may include a touchscreen display for presenting images and/or messages to a user and receiving commands from a user. For example, the user interface 264 may include a button or switch enabling a person to manually turn the personal computing device 260 on and off. In some implementations, commands (e.g., start recording video, stop recording video, or snap photograph) received via the user interface 264 may be passed on to the image capture device 240 via the communications link 250.

Figure 3:
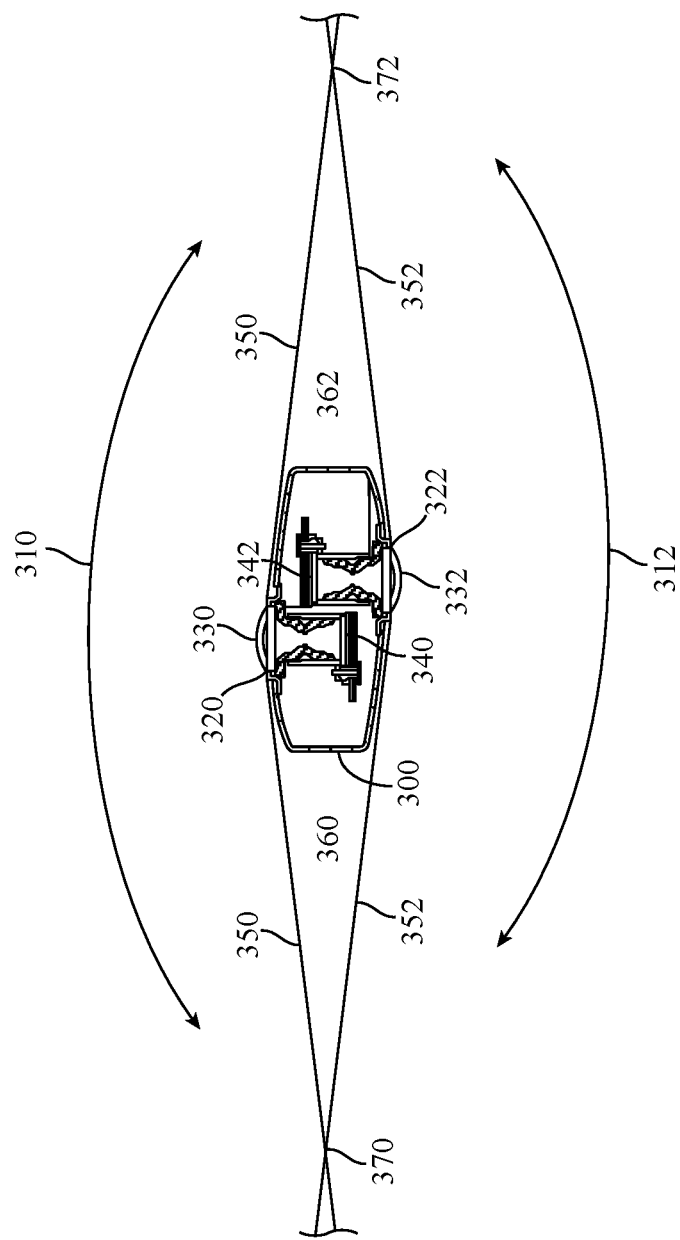
FIG. 3 is a cross-sectional view of an example of an image capture apparatus including overlapping fields-of-view in accordance with implementations of this disclosure.

FIG. 3 is a cross-sectional view of an example of a dual-lens image capture apparatus 300 including overlapping fields-of-view 310, 312 in accordance with implementations of this disclosure. In some implementations, the image capture apparatus 300 may be a spherical image capture apparatus with fields-of-view 310, 312 as shown in FIG. 3. For example, the image capture apparatus 300 may include image capture devices 320, 322, related components, or a combination thereof, arranged in a back-to-back or Janus configuration. For example, a first image capture device 320 may include a first lens 330 and a first image sensor 340, and a second image capture device 322 may include a second lens 332 and a second image sensor 342 arranged oppositely from the first lens 330 and the first image sensor 340.

The first lens 330 of the image capture apparatus 300 may have the field-of-view 310 shown above a boundary 350. Behind the first lens 330, the first image sensor 340 may capture a first hyper-hemispherical image plane from light entering the first lens 330, corresponding to the first field-of-view 310.

The second lens 332 of the image capture apparatus 300 may have a field-of-view 312 as shown below a boundary 352. Behind the second lens 332, the second image sensor 342 may capture a second hyper-hemispherical image plane from light entering the second lens 332, corresponding to the second field-of-view 312.

In some implementations, one or more areas, such as blind spots 360, 362, may be outside of the fields-of-view 310, 312 of the lenses 330, 332, light may be obscured from the lenses 330, 332 and the corresponding image sensors 340, 342, and content in the blind spots 360, 362 may be omitted from capture. In some implementations, the image capture apparatus 300 may be configured to minimize the blind spots 360, 362.

In some implementations, the fields-of-view 310, 312 may overlap. Stitch points 370, 372, proximal to the image capture apparatus 300, at which the fields-of-view 310, 312 overlap may be referred to herein as overlap points or stitch points. Content captured by the respective lenses 330, 332, distal to the stitch points 370, 372, may overlap.

In some implementations, images contemporaneously captured by the respective image sensors 340, 342 may be combined to form a combined image. Combining the respective images may include correlating the overlapping regions captured by the respective image sensors 340, 342, aligning the captured fields-of-view 310, 312, and stitching the images together to form a cohesive combined image.

In some implementations, a small change in the alignment (e.g., position and/or tilt) of the lenses 330, 332, the image sensors 340, 342, or both may change the relative positions of their respective fields-of-view 310, 312 and the locations of the stitch points 370, 372. A change in alignment may affect the size of the blind spots 360, 362, which may include changing the size of the blind spots 360, 362 unequally.

In some implementations, incomplete or inaccurate information indicating the alignment of the image capture devices 320, 322, such as the locations of the stitch points 370, 372, may decrease the accuracy, efficiency, or both of generating a combined image. In some implementations, the image capture apparatus 300 may maintain information indicating the location and orientation of the lenses 330, 332 and the image sensors 340, 342 such that the fields-of-view 310, 312, stitch points 370, 372, or both may be accurately determined, which may improve the accuracy, efficiency, or both of generating a combined image.

In some implementations, optical axes through the lenses 330, 332 may be substantially antiparallel to each other, such that the respective axes may be within a tolerance such as 1%, 3%, 5%, 10%, and/or other tolerances. In some implementations, the image sensors 340, 342 may be substantially perpendicular to the optical axes through their respective lenses 330, 332, such that the image sensors may be perpendicular to the respective axes to within a tolerance such as 1%, 3%, 5%, 10%, and/or other tolerances.

In some implementations, the lenses 330, 332 may be laterally offset from each other, may be off-center from a central axis of the image capture apparatus 300, or may be laterally offset and off-center from the central axis. As compared to an image capture apparatus with back-to-back lenses (e.g., lenses aligned along the same axis), the image capture apparatus 300 including laterally offset lenses 330, 332 may include substantially reduced thickness relative to the lengths of the lens barrels securing the lenses 330, 332. For example, the overall thickness of the image capture apparatus 300 may be close to the length of a single lens barrel as opposed to twice the length of a single lens barrel as in a back-to-back configuration. Reducing the lateral distance between the lenses 330, 332 may improve the overlap in the fields-of-view 310, 312.

In some implementations, images or frames captured by an image capture apparatus, such as the image capture apparatus 110 shown in FIG. 1 or the image capture apparatus 300 shown in FIG. 3, may be combined, merged, or stitched together, to produce a combined image, such as a spherical or panoramic image, which may be an equirectangular planar image. In some implementations, generating a combined image may include three-dimensional, or spatiotemporal, noise reduction (3DNR). In some implementations, pixels along the stitching boundary may be matched accurately to minimize boundary discontinuities.

Figure 4:
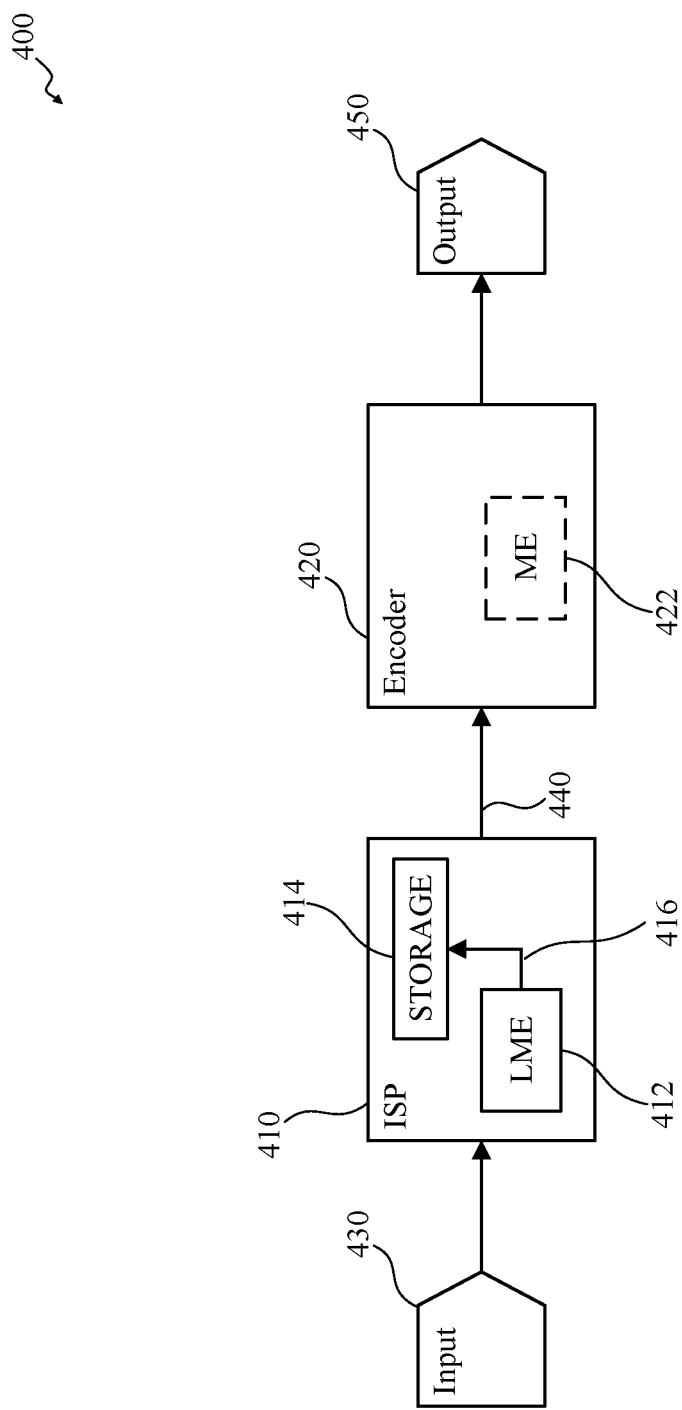
FIG. 4 is a block diagram of an example of an image processing and coding pipeline in accordance with implementations of this disclosure.

FIG. 4 is a block diagram of an example of an image processing and coding pipeline 400 in accordance with implementations of this disclosure. In some implementations, the image processing and coding pipeline 400 may be included in an image capture device, such as the image capture device 210 shown in FIG. 2A, or an image capture apparatus, such as the image capture apparatus 110 shown in FIG. 1 or the image capture apparatus 300 shown in FIG. 3. In some implementations, the image processing and coding pipeline 400 may include an image signal processor (ISP) 410, an encoder 420, or a combination thereof.

In some implementations, the image signal processor 410 may receive an input image signal 430. For example, an image sensor (not shown), such as image sensor 230 shown in FIG. 2, may capture an image, or a portion thereof, and may send, or transmit, the captured image, or image portion, to the image signal processor 410 as the input image signal 430. In some implementations, an image, or frame, such as an image, or frame, included in the input image signal, may be one of a sequence or series of images or frames of a video, such as a sequence, or series, of frames captured at a rate, or frame rate, which may be a number or cardinality of frames captured per defined temporal period, such as 24, 30, or 60 frames per second.

In some implementations, the image signal processor 410 may include a local motion estimation (LME) unit 412, which may generate local motion estimation information for use in image signal processing and encoding, such as in correcting distortion, stitching, and/or motion compensation. In some implementations, the local motion estimation unit 412 may partition the input image signal 430 into blocks (e.g., having 4×4, 16×16, 64×64, and/or other dimensions). In some implementations, the local motion estimation unit 412 may partition the input image signal 430 into arbitrarily shaped patches and/or individual pixels.

In some implementations, the local motion estimation unit 412 may compare pixel values of blocks of pixels between image frames, such as successive image frames, from the input image signal 430 to determine displacement, or movement, between frames. The local motion estimation unit 412 may produce motion vectors (e.g., an x component and y component of motion) at multiple locations within an image frame. The motion vectors may be represented by a translational model or other models that may approximate camera motion, such as rotation and translation in three dimensions, and zooming.

In some implementations, the image signal processor 410 of the image processing and coding pipeline 400 may include electronic storage 414, such as memory (e.g., random access memory (RAM), flash, or other types of memory). The electronic storage 414 may store local motion estimation information 416 determined by the local motion estimation unit 412 for one or more frames. The local motion estimation information 416 and associated image or images may be output 440 to the encoder 420. In some implementations, the electronic storage 414 may include a buffer, or cache, and may buffer the input image signal as an input, or source, image, or frame.

In some implementations, the image signal processor 410 may output an image, associated local motion estimation information 416, or both as the output 440. For example, the image signal processor 410 may receive the input image signal 430, process the input image signal 430, and output a processed image as the output 440. Processing the input image signal 430 may include generating and using the local motion estimation information 416, spatiotemporal noise reduction (3DNR), dynamic range enhancement, local tone adjustment, exposure adjustment, contrast adjustment, image stitching, and/or other operations.

The encoder 420 may encode or compress the output 440 of the image signal processor 410. In some implementations, the encoder 420 may implement the one or more encoding standards, which may include motion estimation.

In some implementations, the encoder 420 may output encoded video as an encoded output 450. For example, the encoder 420 may receive the output 440 of the image signal processor 410, which may include processed images, the local motion estimation information 416, or both. The encoder 420 may encode the images and may output the encoded images as the encoded output 450.

In some implementations, the encoder 420 may include a motion estimation unit 422 that may determine motion information for encoding the image output 440 of the image signal processor 410. In some implementations, the encoder 420 may encode the image output 440 of the image signal processor 410 using motion information generated by the motion estimation unit 422 of the encoder 420, the local motion estimation information 416 generated by the local motion estimation unit 412 of the image signal processor 410, or a combination thereof. For example, the motion estimation unit 422 may determine motion information at pixel block sizes that may differ from pixel block sizes used by the local motion estimation unit 412. In another example, the motion estimation unit 422 of the encoder 420 may generate motion information and the encoder may encode the image output 440 of the image signal processor 410 using the motion information generated by the motion estimation unit 422 of the encoder 420 and the local motion estimation information 416 generated by the local motion estimation unit 412 of the image signal processor 410. In another example, the motion estimation unit 422 of the encoder 420 may use the local motion estimation information 416 generated by the local motion estimation unit 412 of the image signal processor 410 as input for efficiently and accurately generating motion information.

In some implementations, the image signal processor 410, the encoder 420, or both may be distinct units, as shown. For example, the image signal processor 410 may include a motion estimation unit, such as the local motion estimation unit 412 as shown, and/or the encoder 420 may include a motion estimation unit, such as the motion estimation unit 422.

In some implementations, the image signal processor 410 may store motion information, such as the local motion estimation information 416, in a memory, such as the electronic storage 414, and the encoder 420 may read the motion information from the electronic storage 414 or otherwise receive the motion information from the image signal processor 410. The encoder 420 may use the motion estimation information determined by the image signal processor 410 for motion compensation processing.

Figure 5:
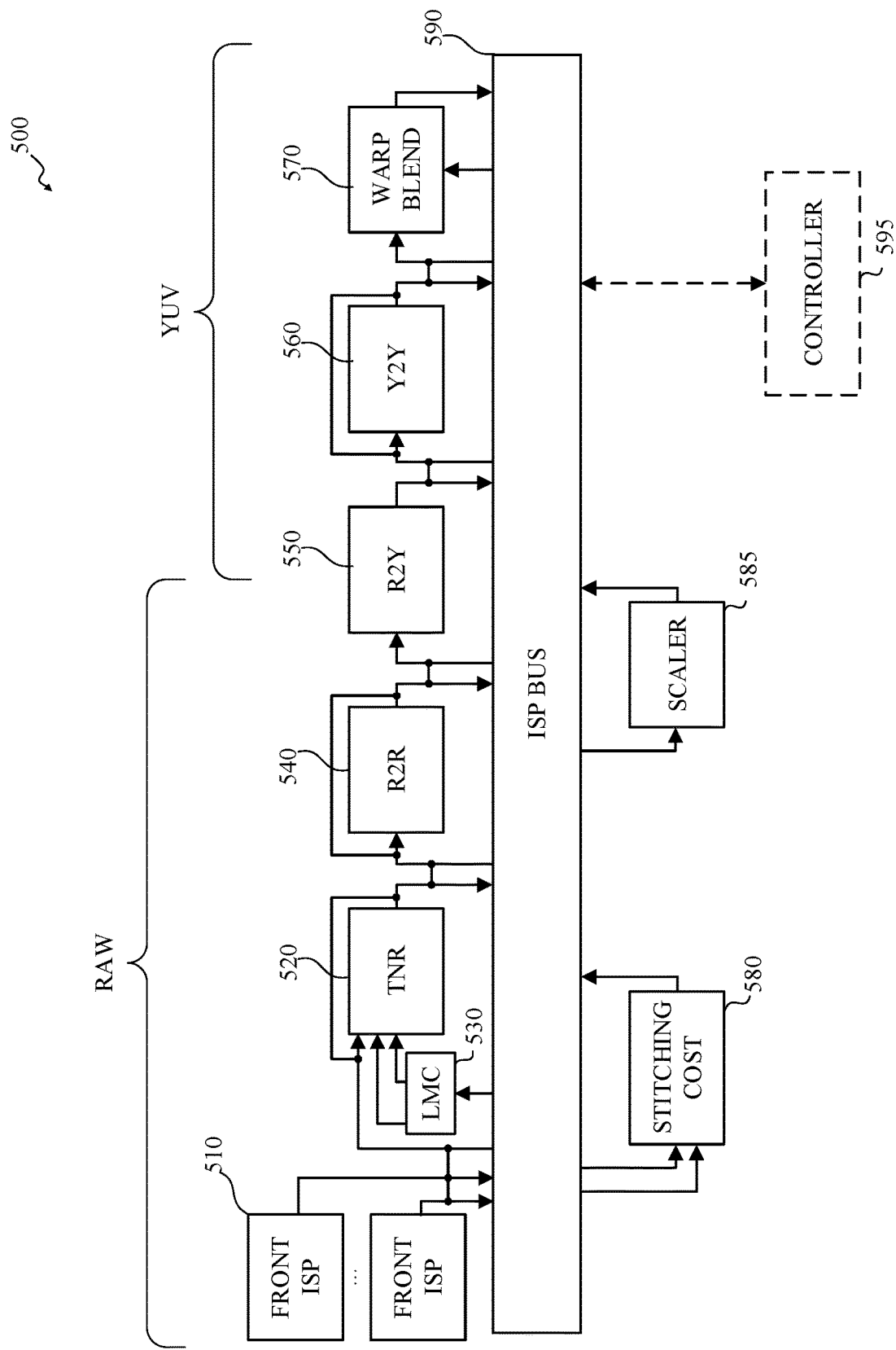
FIG. 5 is a functional block diagram of an example of an image signal processor in accordance with implementations of this disclosure.

FIG. 5 is a functional block diagram of an example of an image signal processor 500 in accordance with implementations of this disclosure. In some implementations, an image signal processor 500 may be included in an image capture device, such as the image capture device 210 shown in FIG. 2A, or an image capture apparatus, such as the image capture apparatus 110 shown in FIG. 1 or the image capture apparatus 300 shown in FIG. 3. In some implementations, the image signal processor 500 may be similar to the image signal processor 410 shown in FIG. 4.

In some implementations, the image signal processor 500 may receive an image signal, such as from an image sensor, in a defined format, such as a format of the image sensor, which may be referred to herein as "a raw image", "raw image data", "raw data", "a raw signal", or "a raw image signal." For example, the raw image signal may be in a format such as RGB format, which may represent individual pixels using a combination of values or components, such as a red component (R), a green component (G), and a blue component (B). In some implementations, the image signal processor 500 may convert the raw image data (RGB data) to another format, such as a format expressing individual pixels using a combination of values or components, such as a luminance, or luma, value (Y), a blue chrominance, or chroma, value (U or Cb), and a red chroma value (V or Cr), such as the YUV or YCbCr formats.

In some implementations, the image signal processor 500 may include a front image signal processor (Front ISP) 510, or multiple front image signal processors as shown, a temporal noise reduction (TNR) unit 520, a local motion compensation unit 530, a raw to raw (R2R) unit 540, a raw to YUV (R2Y) unit 550, a YUV to YUV (Y2Y) unit 560, a combined warp and blend unit 570, a stitching cost unit 580, a scaler 585, an image signal processing bus (ISP BUS) 590, or a combination thereof.

Although not shown expressly in FIG. 5, in some implementations, one or more of the front image signal processor 510, the temporal noise reduction unit 520, the local motion compensation unit 530, the raw to raw unit 540, the raw to YUV unit 550, the YUV to YUV unit 560, the combined warp and blend unit 570, the stitching cost unit 580, the scaler 585, the image signal processing bus 590, or any combination thereof, may include a respective clock, power domain, or both.

In some implementations, the front image signal processor 510 may minimally process image signals received from respective image sensors, which may include image scaling. Scaling, by the front image signal processor 510, may include processing pixels, such as a defined cardinality of pixels, corresponding to a determined quality. For example, the front image signal processor 510 may correct dead pixels, perform band processing, decouple vertical blanking, or a combination thereof. In some implementations, the front image signal processor 510 may output a full resolution frame, a low resolution frame, such as a ¼×¼ resolution frame, or both.

In some implementations, a multiple camera apparatus, such as the image capture apparatus 110 shown in FIG. 1, may include multiple image capture devices, such as the image capture device 210 shown in FIG. 2A, and may include a respective front image signal processor 510 associated with each image capture device.

In some implementations, the temporal noise reduction unit 520 may reduce temporal noise in input images, which may include recursively reducing temporal noise in a sequence of input images, such as a video. Recursive temporal noise reduction may include combining a current image with noise feedback information corresponding to a previously processed frame (recirculated frame). The recirculated frame may be local motion compensated and may be received from the local motion compensation unit 530. The temporal noise reduction unit 520 may generate output including a pixel value and associated noise variance for the pixel value for one or more pixels of the current frame.

In some implementations, the local motion compensation unit 530 may determine motion vectors for the input image and/or video data for representing motion in an image frame, such as motion caused by moving objects in the field-of-view. In some implementations, the local motion compensation unit 530 may apply motion vectors to align a recirculated frame from the temporal noise reduction unit 520 with the incoming, current frame.

In some implementations, the temporal noise reduction unit 520 may reduce temporal noise using three-dimensional (3D) noise reduction (3DNR), such as in conjunction with the local motion compensation unit 530.

In some implementations, the raw to raw unit 540 may perform spatial denoising of frames of raw images based on noise variance values received from the temporal noise reduction unit 520. For example, spatial denoising in the raw to raw unit 540 may include multiple passes of image signal processing, including passes at various resolutions.

In some implementations, the raw to YUV unit 550 may demosaic, and/or color process, the frames of raw images, which may include representing each pixel in the YUV format, which may include a combination of a luminance (Y) component and two chrominance (UV) components.

In some implementations, the YUV to YUV unit 560 may perform local tone mapping of YUV images. In some implementations, the YUV to YUV unit 560 may include multi-scale local tone mapping using a single pass approach or a multi-pass approach on a frame at different scales.

In some implementations, the warp and blend unit 570 may warp images, blend images, or both. In some implementations, the warp and blend unit 570 may warp a corona around the equator of each frame to a rectangle. For example, the warp and blend unit 570 may warp a corona around the equator of each frame to a rectangle based on the corresponding low resolution frame generated by the front image signal processor 510.

In some implementations, the warp and blend unit 570 may apply one or more transformations to the frames. In some implementations, spherical images produced by a multi-face camera device, such as the image capture apparatus 110 shown in FIG. 1 or the image capture apparatus 300 shown in FIG. 3, may be warped and/or blended by the warp and blend unit 570 to correct for distortions at image edges. In some implementations, the warp and blend unit 570 may apply a transformation that is subject to a close to identity constraint, wherein a location of a pixel in an input image to the warp and blend unit 570 may be similar to, such as within a defined distance threshold of, a location of a corresponding pixel in an output image from the warp and blend unit 570. For example, the warp and blend unit 570 may include an internal memory, which may have a size, such as 100 lines, which may be smaller than a size of a frame, and the warp and blend unit 570 may process the input image data in raster-in/raster-out order using a transformation that is subject to a close to identity constraint. In some implementations, the warp and blend unit 570 may apply a transformation that is independent of close to identity constraints, which may include processing the input image data in raster-in/dynamic-out or dynamic-in/raster-out order. For example, the warp and blend unit 570 may transform two or more non-rectilinear (fisheye) images to generate a combined frame, such as an equirectangular frame, by processing the input image data in raster-in/dynamic-out or dynamic-in/raster-out order.

In some implementations, the stitching cost unit 580 may generate a stitching cost map as an output. In some implementations, the cost map may be represented as a rectangle having disparity x and longitude y based on a warping. Each value of the cost map may be a cost function of a disparity x value for a corresponding longitude. Cost maps may be generated for various scales, longitudes, and disparities.

In some implementations, the scaler 585 may scale images received from the output of the warp and blend unit 570, which may be in patches, or blocks, of pixels such as 16×16 blocks, 8×8 blocks, or patches or blocks of any other size or combination of sizes.

In some implementations, the image signal processing bus 590 may be a bus or interconnect, such as an on-chip interconnect or embedded microcontroller bus interface, for communication between the front image signal processor 510, the temporal noise reduction unit 520, the local motion compensation unit 530, the raw to raw unit 540, the raw to YUV unit 550, the YUV to YUV unit 560, the combined warp and blend unit 570, the stitching cost unit 580, the scaler 585, the configuration controller 595, or any combination thereof.

In some implementations, a configuration controller 595 may coordinate image processing by the front image signal processor 510, the temporal noise reduction unit 520, the local motion compensation unit 530, the raw to raw unit 540, the raw to YUV unit 550, the YUV to YUV unit 560, the combined warp and blend unit 570, the stitching cost unit 580, the scaler 585, or any combination thereof, of the image signal processor 500. For example, the configuration controller 595 may control camera alignment model calibration, auto-exposure, auto-white balance, or any other camera calibration or similar process or combination of processes. In some implementations, the configuration controller 595 may be a microcontroller. The configuration controller 595 is shown in FIG. 5 using broken lines to indicate that the configuration controller 595 may be included in the image signal processor 500 or may be external to, and in communication with, the image signal processor 500. The configuration controller 595 may include a respective clock, power domain, or both.

Figure 6:
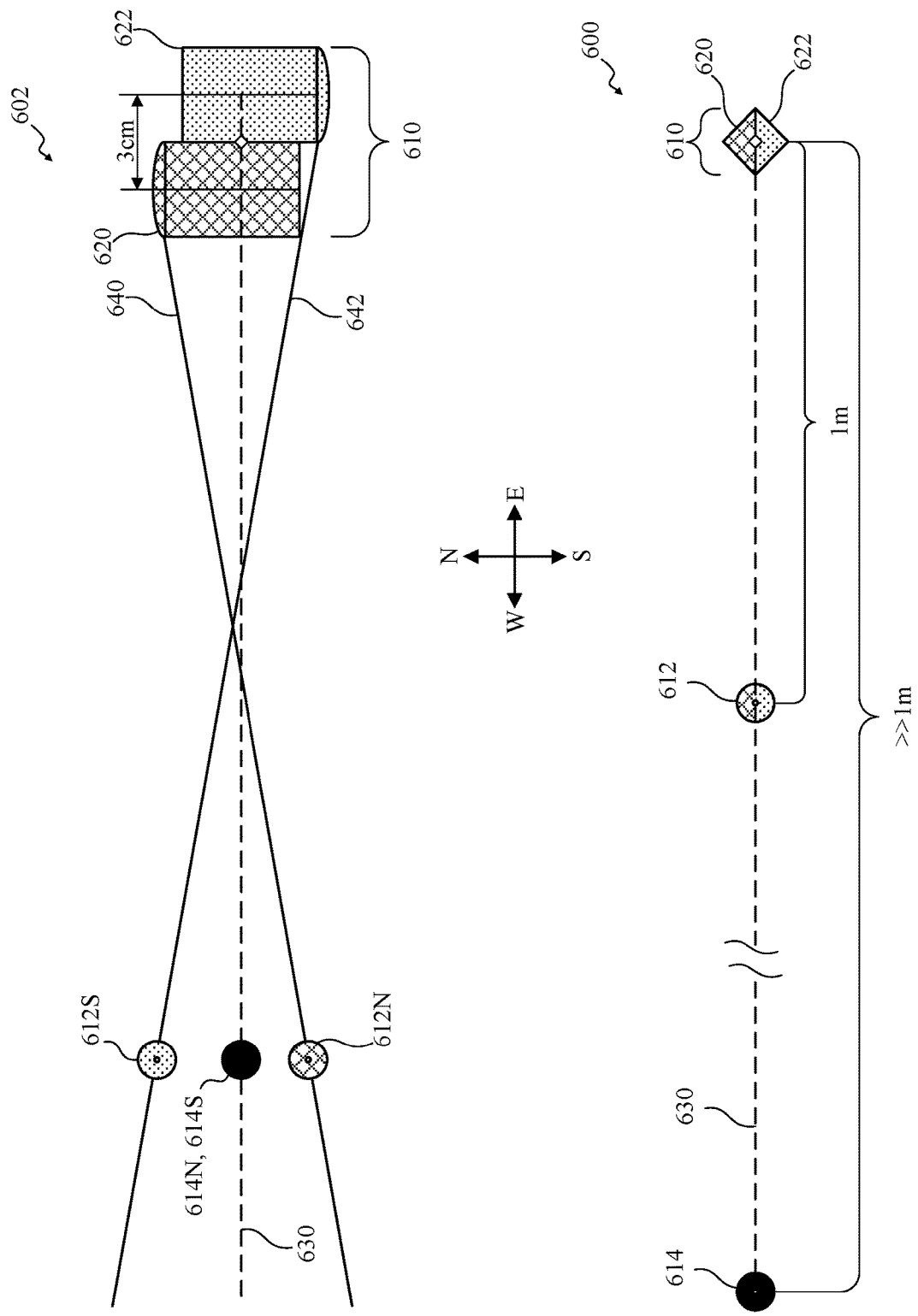
FIG. 6 is a diagram of an example of spatial and field-of-view representations of overlapping field-of-view for adaptive camera model calibration in accordance with implementations of this disclosure.

FIG. 6 is a diagram of an example of spatial and field-of-view representations of overlapping field-of-view for adaptive camera model calibration in accordance with implementations of this disclosure. FIG. 6 is shown as oriented with north at the top and east at the right and is described with reference to longitude and latitude for simplicity and clarity; however, any orientation may be used, direction, longitude, and latitude are described with reference to the image capture apparatus or the respective image capture devices and may differ from geographic analogs.

FIG. 6 includes a lower portion showing a spatial representation 600 of an image capture apparatus 610 including a near object 612 and a far object 614 and an upper portion showing a corresponding field-of-view representation 602 for the image capture apparatus 610 including near object content 612N as captured by the north facing image capture device 620, near object content 612S as captured by the south facing image capture device 622, far object content 614N as captured by the north facing image capture device 620, and far object content 614S as captured by the south facing image capture device 622.

In the spatial representation 600, the image capture apparatus 610, which may be a multi-face image capture apparatus, such as the image capture apparatus 110 shown in FIG. 1 or the image capture apparatus 300 shown in FIG. 3, is represented by a diamond. In some implementations, the multi-face image capture apparatus 610 may include two or more image capture devices 620, 622, such as the image capture device 210 shown in FIG. 2A, which may have overlapping field-of-view. A north facing image capture device 620 is indicated as a triangle with a cross hatched background, and a south facing image capture device 622 is indicated as a triangle with a stippled background. An equator 630, which may be a midpoint between the two image capture devices 620, 622, is indicated by a broken line.

In the spatial representation 600, the near object 612, which may be captured, in whole or in part, in one or more images captured by the image capture devices 620, 622, is shown as a circle, along the equator 630, having a north half with a cross-hatched background and a south half having a stippled background. The near object 612 may be a relatively short distance from the image capture apparatus 610, such as 1 meter (1 m) as shown. The far object 614, which may be captured, in whole or in part, in one or more images captured by the image capture devices 620, 622, is shown as a black circle along the equator 630. The far object 614 may be a relatively long distance from the image capture apparatus 610, such as a distance much greater than 1 meter (>>1 m) as shown. For example, the far object 614 may be near the horizon.

In the field-of-view representation 602, the north facing image capture device 620 is shown on the left of the image capture apparatus 610, facing north, with a cross hatched background, and the corresponding north field-of-view is partially represented as including content above, such as north of, a north field-of-view border line 640. The south facing image capture device 622 of the image capture apparatus 610 is shown on the right, facing south, with a stippled background, and the corresponding south field-of-view is partially represented as including content below, such as south of, a south field-of-view border line 642.

In some implementations, the respective fields-of-view for the image capture devices 620, 622 may include a defined N° longitudinal dimension, such as 360° of longitude, and may include a defined N° lateral dimension, which may be greater than 180° of latitude. For example, the north facing image capture device 620 may have a field-of-view that extends 10° latitude below the equator 630 as represented by the north field-of-view border line 640, and the south facing image capture device 622 may have a field-of-view that extends 10° latitude above the equator 630, as represented by the south field-of-view border line 642. The overlapping region may include 360° of longitude and may include 20° of latitude, which may include a range of 10° north latitude to 10° south latitude.

In some implementations, the image capture devices 620, 622 may be physically offset along one or more spatial axis. For example, as shown in the field-of-view representation 602, the north facing image capture device 620 is offset vertically (north-south) and horizontally. In the example shown in FIG. 6, the horizontal, or longitudinal, offset between the image capture devices 620, 622, or between the respective optical centers of the image capture devices 620, 622, is 3 cm; however, other offsets may be used.

As shown in the spatial representation 600, the near object 612 is positioned along the equator 630 and is positioned relatively proximal to the image capture apparatus 610, such as 1 meter (1 m). The far object 614 is positioned along the equator, and is positioned relatively distal (>>1 m) from the image capture apparatus 610. For simplicity and clarity, the distance of the far object 614 may be, as an example, three kilometers from the spatial center of the image capture apparatus 610 as indicated by the small white diamond in the image capture apparatus 610.

As shown in the field-of-view representation 602, the optical center of the north facing image capture device 620 may be offset from the spatial center of the image capture apparatus 610 horizontally by a defined amount, such as by 1.5 cm west laterally, and vertically by a defined amount, such as by 1.5 cm north longitudinally, and the optical center of the south facing image capture device 622 may be offset from the spatial center of the image capture apparatus 610 horizontally by a defined amount, such as by 1.5 cm east laterally, and vertically by a defined amount, such as by 1.5 cm south longitudinally.

In the field-of-view representation 602, the near object content 612N as captured by the north facing image capture device 620, corresponding to the near object 612 shown in the spatial representation 600, the near object content 612S as captured by the south facing image capture device 622, corresponding to the near object 612 shown in the spatial representation 600, the far object content 614N as captured by the north facing image capture device 620, corresponding to the far object 614 shown in the spatial representation 600, and the far object content 614S as captured by the south facing image capture device 622, corresponding to the far object 614 shown in the spatial representation 600, are shown vertically aligned at an intermediate distance from the image capture apparatus 610 to indicate that distance information for the near object 612 and the far object 614 may be unavailable independent of analyzing the images.

In the field-of-view representation 602, the far object content 614N as captured by the north facing image capture device 620 and the far object content 614S as captured by the south facing image capture device 622 are shown along the equator 630 indicating that the position of the far object content 614N as captured by the north facing image capture device 620 may be indistinguishable from the position of the far object content 614S as captured by the south facing image capture device 622. For example, the far object 614, as shown in the spatial representation 600, may be approximately 2,999.9850000375 meters at an angle of approximately 0.00028648° from the optical center of the north facing image capture device 620 and may be approximately 3,000.0150000375 meters at an angle of approximately 0.00028647° from the optical center of the south facing image capture device 622. The angular difference of approximately one hundred-millionth of a degree between the location of the far object 614 relative to the optical center of the north facing image capture device 620 and the location of the far object 614 relative to the optical center of the south facing image capture device 622 may correspond to a difference of zero pixels in the corresponding images.

The position of the near object 612 may differ in the respective images captured by the image capture devices 620, 622. In the field-of-view representation 602, the near object content 612N as captured by the north facing image capture device 620 is shown with a cross-hatched background below the equator 630 indicating that the position of the near object content 612N as captured by the north facing image capture device 620 may be slightly below the equator 630, such as 1° south latitude, and the near object content 612S as captured by the south facing image capture device 622 is shown with a stippled background above the equator 630 indicating that the position of the near object content 612S as captured by the south facing image capture device 622 may be slightly above the equator 630, such as 1° north latitude. For example, the near object 612, as shown in the spatial representation 600, may be approximately 1.01511083 meters at an angle of approximately 0.846674024° from the optical center of the north facing image capture device 620, and may be approximately 0.985114207 meters at an angle of approximately 0.872457123° from the optical center of the south facing image capture device 622. The angular difference of approximately 1.72° between the location of the near object 612 relative to the optical center of the north facing image capture device 620 and the location of the near object 612 relative to the optical center of the south facing image capture device 622 may correspond to a difference of one or more pixels in the corresponding images.

In some implementations, images captured by the image capture devices 620, 622 may be combined to generate a combined image wherein overlapping regions and transitions between overlapping regions, such as portions corresponding to field-of-view boundaries 640, 642, are visually cohesive. In some implementations, combining images may include aligning overlapping regions of the images to adjust for differences between the relative locations of the respective image capture devices 620, 622 and the content captured by the images. In some implementations, aligning overlapping regions of images may be based on the physical alignment of the respective image capture devices 620, 622 of the image capture apparatus 610, the distance between the respective image capture devices 620, 622 of the image capture apparatus 610 and the content captured by the images, or both. An example of image alignment is shown in FIG. 7.

Figure 7:
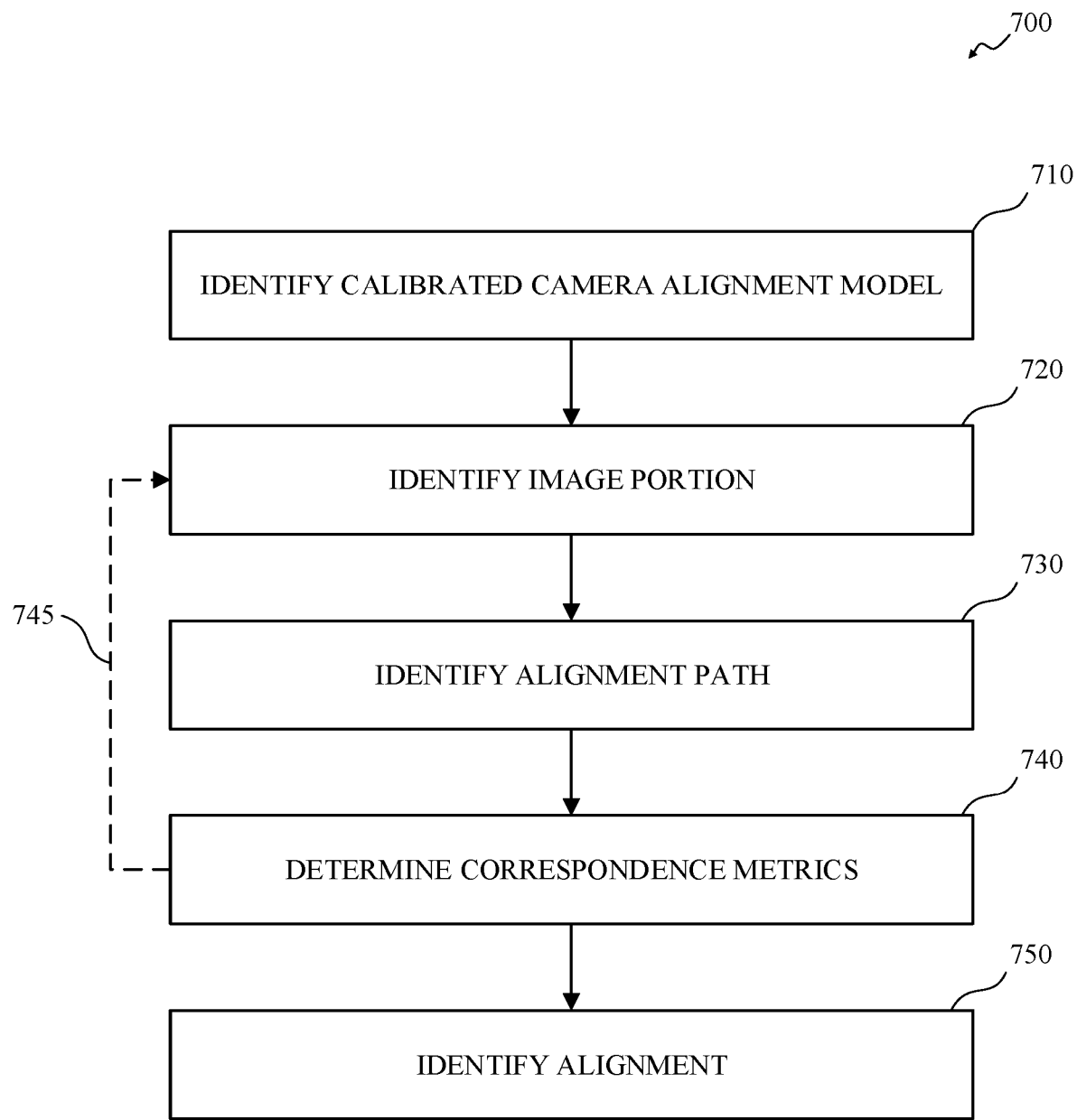
FIG. 7 is a flowchart of an example of aligning overlapping image regions in accordance with implementations of this disclosure.

FIG. 7 is a flowchart of an example of aligning overlapping image regions 700 in accordance with implementations of this disclosure. In some implementations, aligning overlapping image regions 700 may be implemented in an image capture apparatus, such as the image capture apparatus 110 shown in FIG. 1, the image capture apparatus 300 shown in FIG. 3, or the image capture apparatus 610 shown in FIG. 6. For example, a stitching cost unit, such as the stitching cost unit 580 of the image signal processor 500 shown in FIG. 5, may implement aligning overlapping image regions 700. In some implementations, aligning overlapping image regions 700 may include identifying a calibrated camera alignment model at 710, identifying image portions corresponding to defined relative space at 720, identifying an alignment path at 730, determining correspondence metrics at 740, identifying an alignment at 750, or a combination thereof.

Although not shown separately in FIG. 7, an image signal processor, such as the image signal processor 410 shown in FIG. 4 or the image signal processor 500 shown in FIG. 5, which may be included in an image capture apparatus, may receive one or more input image signals, such as the input image signal 430 shown in FIG. 4, from one or more image sensors, such as the image sensors 214 and 216 shown in FIG. 2A or the image sensors 340, 342 shown in FIG. 3, or from one or more front image signal processors, such as the front image signal processors 510 shown in FIG. 5, and may identify one or more input images, or frames, from the one or more input image signals, which may include buffering the input images or frames. In some implementations, the input images or frames may be associated with respective temporal information indicating a respective temporal location, such as a time stamp, a date stamp, sequence information, or a combination thereof. For example, the input images or frames may be included in a stream, sequence, or series of input images or frames, such as a video, and each input image or frame may be associated with respective temporal information.

In some implementations, a calibrated camera alignment model may be identified at 710. In some implementations, an image capture apparatus may include a memory, such as memory of the processing apparatus 212 shown in FIG. 2 or the electronic storage 414 shown in FIG. 4, and a calibrated camera alignment model may be read from the memory, or otherwise received by the image capture apparatus. For example, the calibrated camera alignment model may be a previously generated calibrated camera alignment model, such as a calibrated camera alignment model calibrated based on one or more previously captured images or frames.

A camera alignment model for image capture devices having overlapping fields-of-view may indicate an expected correspondence between the relative spatial orientation of the fields-of-view and portions, such as pixels, in overlapping regions of corresponding images captured by the image capture devices. The relative spatial orientation of the fields-of-view may correspond with a physical alignment of the respective image capture devices and may be expressed in terms of relative longitude and latitude.

In some implementations, a camera alignment model may include one or more parameters for use in aligning the overlapping images. For example, a camera alignment model may indicate one or more portions, such as pixels, of an overlapping region of an image, one or more of which is expected to correspond with a defined relative longitude. For example, the one or more portions may be expressed as a path of pixels, each pixel corresponding to a respective relative latitude, on or near a defined longitude, which may be referred to herein as an alignment path, or epipolar. In some implementations, the calibrated camera alignment model may vary based on image resolution.

In some implementations, the correspondence between the expected relative alignment of the overlapping fields-of-view captured by respective images of an image capture apparatus and the respective images may be described by a camera alignment model and may be referred to herein as the defined relative space. For example, a camera alignment model may indicate a portion, such as a pixel, of a first image that is expected to correspond with a defined location in the defined relative space, such as at the relative prime meridian (0° relative longitude) and the relative equator (0° relative latitude), and may indicate a corresponding portion, such as a corresponding pixel, of the second image that is expected to align with the pixel in the first image at the defined location, conditioned on the distance of the content captured at the respective portions of the images being greater than a threshold, wherein the threshold indicates a maximum distance from the image capture apparatus for which angular distances translate to pixel differences.

In some implementations, an expected camera alignment model may indicate an expected alignment of image capture devices, which may differ from the physical alignment of the image capture devices concurrent with capturing images. A calibrated camera alignment model may be a camera alignment model, such as an expected camera alignment model, calibrated based on captured images to correspond with the contemporaneous physical alignment of the image capture devices.

In some implementations, one or more image portions corresponding to defined relative space may be identified at 720. For example, a first image portion, which may be a point, such as a first pixel, at the relative prime meridian (0° relative longitude) and the relative equator (0° relative latitude) in a first image, and a second image portion, such as a second pixel, at the relative prime meridian (0° relative longitude) and the relative equator (0° relative latitude) in a second image may be identified. The relative equator may correspond with the vertical center of the overlap area, which may be N° from the edge of the respective fields-of-view, which may correlate with M pixels from the edge of the respective images.

In some implementations, an alignment path may be identified at 730. The alignment path, or epipolar, may indicate a path, which may be vertical, or approximately vertical, from the point identified at 720 to a point along the edge of the image. In some implementations, the alignment path, or epipolar, may be a path along the longitude of the point identified at 720. For example, the two image capture devices may be aligned in a back-to-back configuration, with optical centers aligned along an axis, and the epipolar may be a path along a longitude. In some implementations, the alignment path, or epipolar, may be described by the calibrated camera alignment model. For example, the image capture devices may be aligned in an offset configuration, such as the configuration shown in FIG. 6, and the alignment path may be a function, which may be similar to a sinusoidal waveform, of the camera alignment relative to longitude and latitude. In some implementations, an alignment path for one frame may correspond to a respective alignment path for the other frame. In some implementations, an alignment path may begin at a first end, such as at a location, which may be a portion, such as a pixel, of the image, along, or proximate to, a defined relative longitude, such as the relative prime meridian, and a defined relative latitude, such as the relative equator, of an image, end at a second end, such as at a location, which may be a portion, such as a pixel, of the image, along, or proximate to, the defined relative longitude and the edge of an image which may be distal from the relative equator with respect to the optical center of the image capture device.

In some implementations, one or more correspondence metrics may be determined at 740. In some implementations, a group, or block, such as a 13×13 block of pixels, centered on the first pixel identified at 720 may be identified from the first image, and a group, or block, such as a 13×13 block of pixels, centered on the second pixel identified at 720 may be identified from the second image. A difference, or match quality metric, may be determined as a difference between the first block from the first frame and the second block from the second frame. For example, the match quality metric may be determined as a sum of squared differences (SSD), a weighted sum of squared differences, or other difference metric, between the two blocks.

In some implementations, determining the correspondence metrics may include determining a match quality metric for each point along the alignment paths, which may be performed iteratively or in parallel. For example, a match quality metric may be determined for the two blocks corresponding to the current relative longitude and the relative equator (0° relative latitude), and a second match quality metric may be determined for two blocks corresponding to a respective point, or pixel, in each frame along the current alignment path and defined distance, such as 0.1° latitude, toward the edge of the respective frame, which may be 0.1° north in the south frame and 0.1° south in the north frame. Respective match quality metrics, such as approximately 150 match quality metrics, may be determined for blocks at each point, or pixel, along the respective alignment paths, at defined latitude distance intervals. In some implementations, a two-dimensional (2D) cost map may be generated. A first dimension of the two-dimensional cost map may indicate a longitude for a respective match quality metric. A second dimension of the two-dimensional cost map may indicate a number, or cardinality, of pixels (spatial difference) between the corresponding pixel and the point, or pixel, at the origin of the alignment path, which may be referred to herein as a disparity. A value of the two-dimensional cost map for an intersection of the first and second dimensions of the two-dimensional cost map may be the corresponding match quality metric. Although the blocks in the two frames are described as being at corresponding, or symmetrical, latitude positions along the respective alignment paths, in some implementations, other correspondence metrics may be determined. For example, a correspondence metric may be determined based on differences between points along the alignment path in one frame and one or more points at different latitudes along the alignment path in the other frame.

In some implementations, identifying image portions corresponding to defined relative space at 720, identifying an alignment path at 730, determining correspondence metrics at 740, or a combination thereof, may be performed for two or more longitudes as indicated by the broken line at 745. For example, identifying image portions corresponding to defined relative space at 720, identifying an alignment path at 730, and determining correspondence metrics at 740 may be performed for each defined longitudinal distance, such as each 0.5° of longitude, or a defined pixel distance corresponding to a defined longitudinal distance as a function of a resolution of the captured images.

Figure 8:
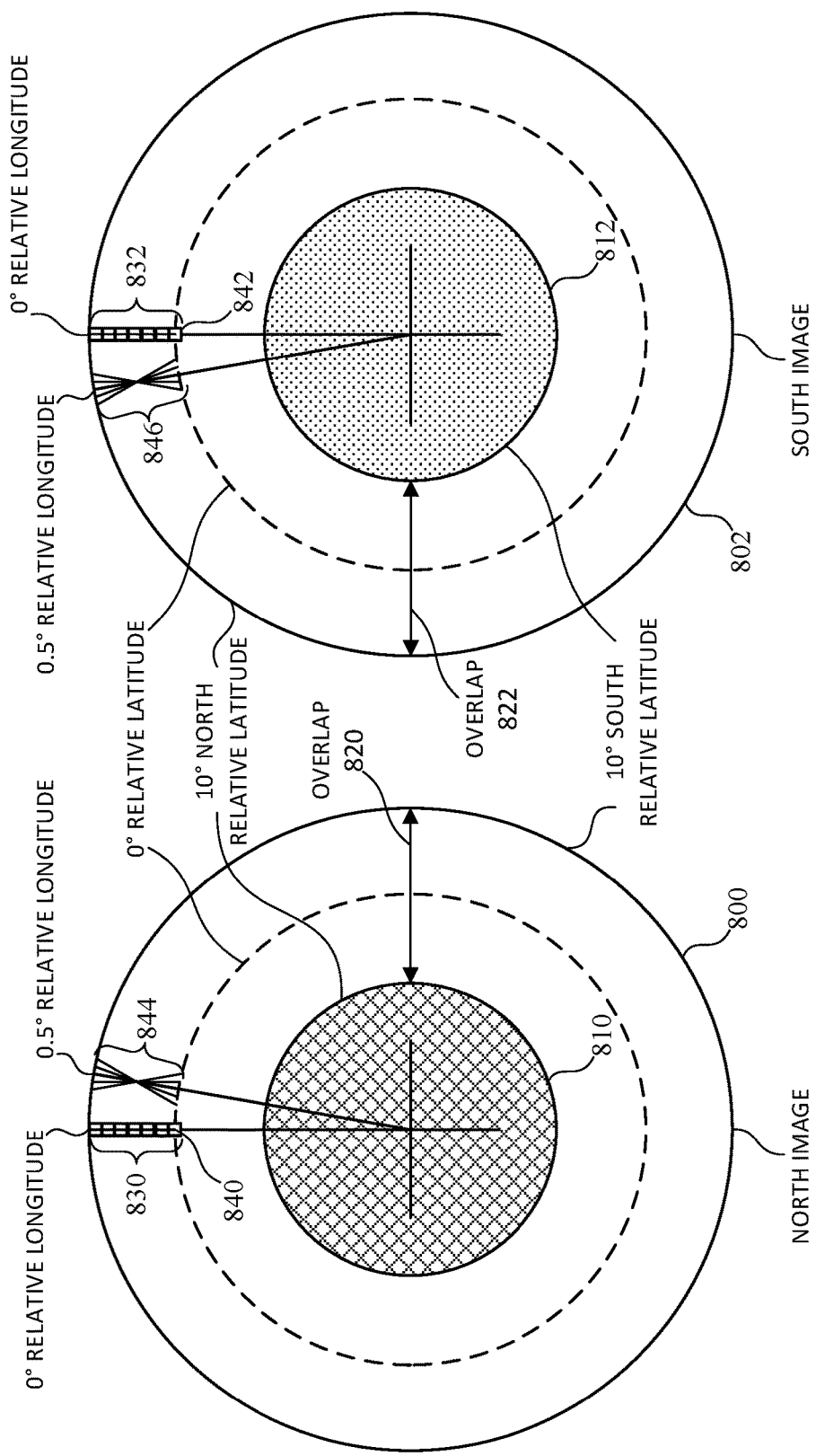
FIG. 8 is a diagram of elements of aligning overlapping image regions in accordance with this disclosure.

In some implementations, an alignment for the current images may be identified at 750. In some implementations, identifying the alignment for the current images at 750 may include simultaneously optimizing the correspondence metrics and a smoothness criterion. For example, identifying the alignment for the current images at 750 may include identifying one or more disparity profiles from the correspondence metrics, such as from the cost map generated at 740. A disparity profile from the correspondence metrics may include a discrete per longitude sequence of match quality metrics. For example, a disparity profile may include, for each longitude, such as each 0.5° of longitude, a disparity and a corresponding match quality metric. Optimizing the correspondence metrics may include identifying the minimal match quality metric for each longitude. Optimizing the smoothness criterion may include minimizing a sum of absolute differences in the disparity between adjacent longitudes. Simultaneously optimizing may include identifying a disparity profile representing a latitude per longitude evaluated, having a minimal cost, which may be a sum of match quality metrics, subject to the smoothness criterion. For example, a difference between the disparity corresponding to a minimal match quality metric for a longitude and the disparity corresponding to a minimal match quality metric for an adjacent longitude may exceed a defined threshold, which may indicate that the low match quality metric represents a false positive, and the second smallest match quality metric for one or both of the longitudes may be used. An example of elements of aligning overlapping image regions is shown in FIG. 8.

In some implementations, identifying the disparity profile may include generating disparity profiles at multiple scales, which may include generating match cost metrics at each of a defined set of scales. In some implementations, the disparity profile may be identified based on a low resolution frame, such as low resolution frame generated by the front image signal processor 510 shown in FIG. 5.

In some implementations, simultaneously optimizing the correspondence metrics and a smoothness criterion may include determining a weighted sum of the correspondence metrics and the smoothness criterions for each respective disparity profile and identifying the minimal weighted sum as the simultaneously optimized disparity profile. For example, simultaneously optimizing may include, for a disparity profile (p), determining a sum of the match quality metrics along the disparity profile as a first cost (c1), determining a sum of the absolute difference between successive disparity values as a cost (c2), and determining a simultaneously optimized disparity profile ($p_{so}$) using a first weight (w1) representing the relative importance of the first cost and a second weight (w2) representing a relative importance of the second cost, which may be expressed as $p_{so}=w1*c1+w2*c2$. Although weighted averaging is described herein, other combining functions may be used.

For example, 724 longitudes may be evaluated in each frame, which may include determining correspondence metrics for 724 alignment paths, which may be approximately one alignment path per 0.5° longitude for 360°, determining correspondence metrics for each alignment path may include determining 150 match quality metrics, which may correspond to 150 latitudes evaluated per longitude evaluated, which may be approximately one match quality metric per 0.1° latitude for 10°, determining the correspondence metrics may include determining 108600 (724*150) match quality metrics, and simultaneously optimizing may include identifying a disparity profile including 724 of the 108600 match quality metrics.

In an example, content captured by the overlapping regions of the image capture devices along the equator far, such as three kilometers, from the image capture apparatus, may correspond with match quality metrics corresponding to a relatively small disparity, such as zero, which may correspond to a position at or near the equator, and content captured by the overlapping regions of the image capture devices along the equator near, such as one meter, to the image capture apparatus, may correspond with match quality metrics corresponding to a relatively large disparity, such as a disparity corresponding to a position at or near the edge of the images, such as at 10° latitude.

FIG. 8 is a diagram of elements of aligning overlapping image regions in accordance with this disclosure. FIG. 8 shows a north circular frame 800 and a south circular frame 802. The north circular frame 800 includes a non-overlapping region 810 indicated with a cross-hatched background, and an overlapping region 820. The south circular frame 802 includes a non-overlapping region 812 indicated with a stippled background, and an overlapping region 822. In some implementations, the longitudes in a frame, such as the north frame 800 as shown, may be oriented clockwise, and the longitudes in a corresponding frame, such as the south frame 802 as shown, may be oriented counterclockwise.

The overlapping regions 820, 822 of the north circular frame 800 and the south circular frame 802 may be aligned as shown in FIG. 7. For example, in the north circular frame 800, blocks 830, such as a 13×13 block of pixels, may be identified along an alignment path 840 beginning at 0° relative longitude and 0° relative latitude and ending along the edge of the frame 800, which may be at a distal relative latitude, such as 10° south latitude, as shown. In the south circular frame 802, corresponding blocks 832 may be identified along a corresponding alignment path 842 beginning at 0° relative longitude and 0° relative latitude and ending along the edge of the frame 802, which may be at 10° north latitude, as shown. Correspondence metrics may be determined based on differences between the identified blocks 830 from the north circular frame 800 and the spatially corresponding blocks 832 from the south circular frame 802.

In the north circular frame 800, candidate alignment paths 844 are shown for the 0.5° relative longitude, each path beginning at 0° relative latitude and ending along the edge of the north circular frame 800, to indicate that correspondence metrics may be determined at each defined distance longitudinally and to indicate that for each respective longitude, multiple candidate alignment paths 844 may be evaluated. For example, a first candidate alignment path from the candidate alignment paths 844 may be orthogonal to the equator, which may be aligned along the respective longitude, and each other candidate alignment path from the candidate alignment paths 844 may be angularly offset relative to the longitude as shown. FIG. 8 is not to scale. Although the blocks are shown as adjacent, the blocks may overlap horizontally, vertically, or both. Although seven blocks and two alignments paths are shown for simplicity, any number of blocks and alignment paths may be used. For example, 724 alignment paths, which may correspond with approximately 0.5° longitudinal intervals, may be used, and 150 blocks per alignment path, which may correspond with approximately 0.1° latitude intervals, may be used. Corresponding candidate alignment paths 846 are shown in the south circular frame 802. In some implementations, a number, or cardinality, of points, such as pixels, indicated by each respective candidate alignment path 844 may be a defined cardinality, such as 150 points, and each respective point from a candidate alignment path 844 may be offset, or shifted, from a corresponding point in another candidate alignment path 844 parallel to the equator. In some implementations, a candidate alignment path 844, or a portion thereof, for a longitude may overlap a candidate alignment path, or a portion thereof, for an adjacent longitude.

In some implementations, a camera alignment model may be based on the physical orientation of elements of the image capture device, such as the physical alignment of lenses, image sensors, or both. Changes in the physical orientation of elements of one or more of the image capture devices having overlapping fields-of-view may cause misalignment such that aligning overlapping image regions, such as the aligning overlapping image regions 700 shown in FIG. 7, based on a misaligned camera alignment model may inaccurately or inefficiently align image elements, such as pixels. For example, misalignment of image capture devices may occur during fabrication such that the alignment of image capture devices having overlapping field-of-view may differ from an expected alignment. In another example, the physical orientation of elements of an image capture device may change, such as in response to physical force, temperature variation, material aging or deformation, atmospheric pressure, or any other physical or chemical process, or combination of processes, that may change image capture device alignment. In some implementations, camera alignment model calibration may include updating, adjusting, or modifying a camera alignment model based on identified changes in the physical orientation of elements of one or more of the respective image capture devices. An example of camera alignment model calibration is shown in FIG. 9.

Figure 9:
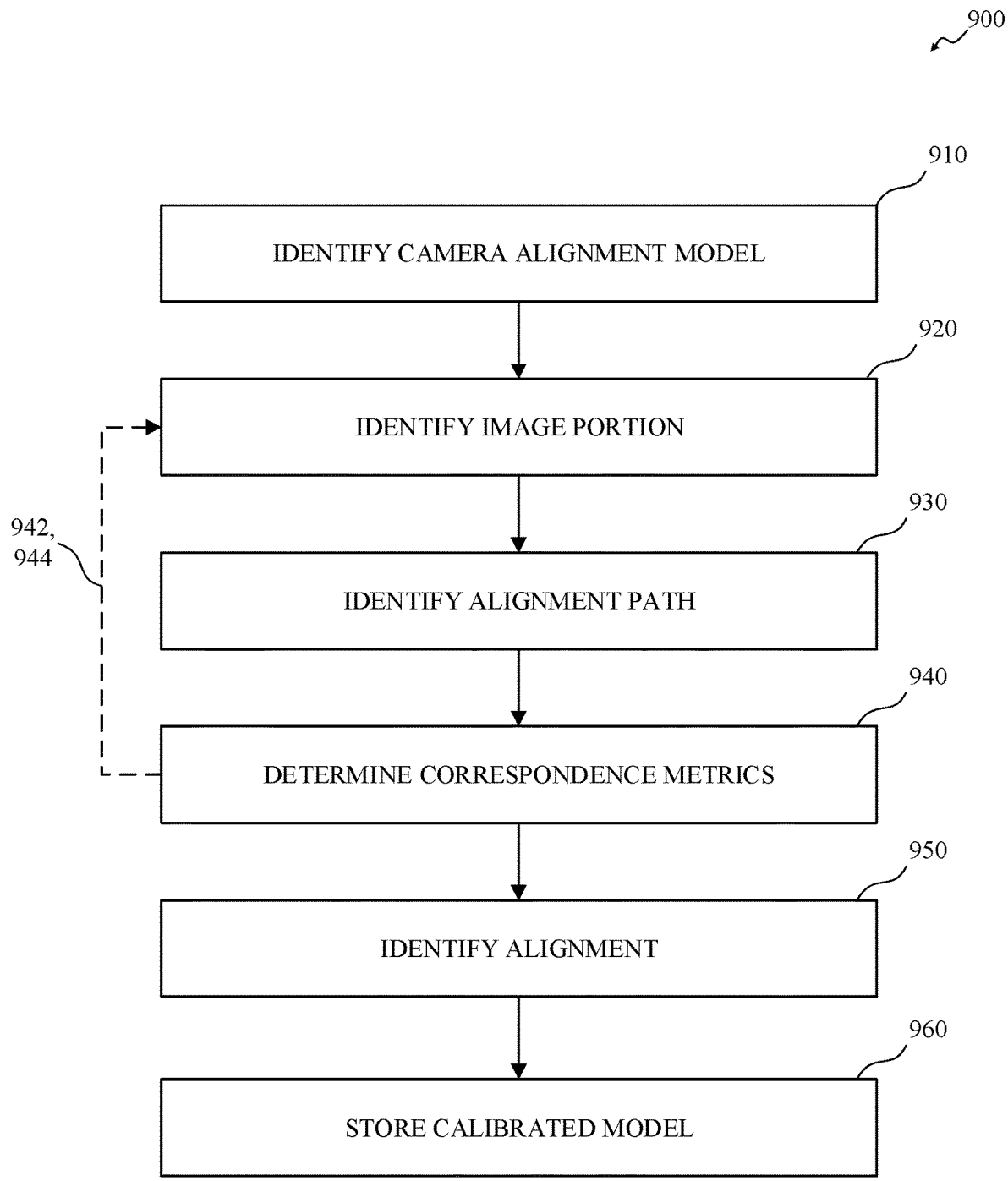
FIG. 9 is a flowchart of an example of a method of camera alignment model calibration in accordance with implementations of this disclosure.

FIG. 9 is a flowchart of an example of a method of camera alignment model calibration 900 in accordance with implementations of this disclosure. In some implementations, camera alignment model calibration 900 may include adaptively detecting image capture device misalignment and generating or modifying a camera alignment model to maintain or restore the alignment of defined elements in overlapping images, such that overlapping image regions may be combined to form a visually cohesive combined image.

In some implementations, camera alignment model calibration 900 may be performed periodically, in response to an event, or both. For example, camera alignment model calibration 900 may be performed periodically, at a camera alignment calibration rate, such as once per unit time, such as once per second, which may be less than half the frame rate of the input video. In some implementations, the camera alignment calibration rate may be one one-hundredth of the frame rate. In another example, camera alignment model calibration 900 may be performed in response to an event, such as capturing a defined number of frames, such as 30 frames or 60 frames, which may correspond to a frame-rate for captured video, in response to an expiration of a timer, in response to starting, such a powering on, or resetting, an image capture apparatus, in response to input, such as user input, indicating camera alignment model calibration, in response to detecting kinetic force exceeding a defined threshold, in response to detecting a misalignment of overlapping image regions, or any other event, or combination of events, capable of triggering camera alignment model calibration 900.

In some implementations, camera alignment model calibration 900 may be implemented in an image capture apparatus, such as the image capture apparatus 110 shown in FIG. 1, the image capture apparatus 300 shown in FIG. 3, or the image capture apparatus 610 shown in FIG. 6. In some implementations, camera alignment model calibration 900 may be similar to aligning overlapping image regions 700 as shown in FIG. 7, except as described herein. For example, a calibration controller, such as the calibration controller 595 shown in FIG. 5, may implement camera alignment model calibration 900. In another example, aligning overlapping image regions as shown at 700 in FIG. 7 may include identifying one alignment path per longitude evaluated, which may be referred to herein as including a one-dimensional (1D) search, and camera alignment model calibration 900 as shown in FIG. 9 may include identifying a set of candidate alignment paths per longitude evaluated, which may be referred to herein as including a two-dimensional search.

In some implementations, camera alignment model calibration 900 may include identifying a camera alignment model at 910, identifying image portions corresponding to defined relative space at 920, identifying an alignment path at 930, determining correspondence metrics at 940, identifying an alignment at 950, storing a recalibrated camera alignment model at 960, or a combination thereof. In some implementations, camera alignment model calibration 900 may be performed in independently of, or in conjunction with, generating a combined image, such as generating a combined image based on two or more images captured by image capture devices having overlapping fields-of-view. For example, a combined image may be generated based on two or more images captured by image capture devices having overlapping fields-of-view, and, independently, camera alignment model calibration 900 may be performed based on the two or more images.

In some implementations, a camera alignment model, such as a calibrated camera alignment model may be identified at 910. In some implementations, identifying the camera alignment model at 910 may be similar to identifying a calibrated camera alignment model at 710 as shown in FIG. 7. For example, a multi-face capture apparatus, such as the image capture apparatus 110 shown in FIG. 1, the image capture apparatus 300 shown in FIG. 3, or the image capture apparatus 610 shown in FIG. 6, may include a memory, such as memory of the processing apparatus 212 shown in FIG. 2 or the electronic storage 414 shown in FIG. 4, and a camera alignment model may be read from the memory, or otherwise received by the image capture apparatus. In some implementations, a calibrated camera alignment model may be a previously calibrated camera alignment model identified based on a previous camera alignment model calibration 900. In some implementations, the image capture apparatus, or a component thereof, such as an image signal processor, may receive calibration parameters, such as from another component to the image capture apparatus. In some implementations, one or more calibration parameters, such as white balance, focus, exposure, flicker adjustment, or the like, may be automatically adjusted in accordance with this disclosure.

Although not shown separately in FIG. 9, in some implementations, the calibrated camera alignment model may be a camera alignment model generated in conjunction with fabrication of the image capture apparatus. For example, the image capture apparatus may be fabricated such that the respective axes of individual image capture devices, such as the image capture device 210 shown in FIG. 2A, are physically aligned within a defined fabrication alignment tolerance of an expected fabrication alignment, and an expected fabrication alignment model may indicate an expected mechanical alignment, which may include an expected angular, or rotational, alignment; an expected longitudinal, x-axis, or horizontal, displacement; an expected lateral, y-axis, or vertical, displacement; an expected elevation, z-axis, or depth, displacement; or a combination thereof, between respective image sensors having overlapping fields-of-view. In some implementations, the expected angular alignment may include an expected alignment along a longitudinal, horizontal, or x-axis; a lateral, vertical, or y-axis; an elevation, depth, or z-axis; or a combination thereof. For example, in a multi-face image capture apparatus, such as the image capture apparatus 110 shown in FIG. 1, two image capture devices may have overlapping fields-of-view, the expected angular alignment may indicate that the x-axis and the z-axis of a first image capture device are 90° from the corresponding y-axis and the corresponding z-axis of a second image capture device, and the y-axis of the first image capture device may be parallel to the x-axis of the second image capture device. In some implementations, a fabrication misalignment may be identified, which may indicate a determined difference in camera alignment between the physical alignment of image capture devices as fabricated and the expected alignment, such as a difference within the defined fabrication alignment tolerance. In some implementations, identifying the fabrication misalignment may include capturing overlapping images of reference content; identifying a spatial location in the overlapping regions of the respective images that captured the reference content, which may be related to a distance between the content captured and the respective image capture devices; and determining a difference between an expected spatial location of the reference content in each captured image and the identified spatial location of the reference content.

Although not shown separately in FIG. 9, in some implementations, camera alignment model calibration 900 may include storing frames captured by a multi-camera array, such as a six-camera cubic array, in a multi-dimensional array, such as a two-dimensional 2×3 array. Storing the frames may be performed prior to camera alignment model calibration 900, prior to generating a combined frame, or both. In some implementations, the six-camera cubic array may include a top image capture device, a right image capture device, a bottom image capture device, a front image capture device, a left image capture device, and a rear image capture device. The 2×3 array may include top storage portions (0,0; 0,1; 0,2) and bottom storage portions (1,0; 1,1; 1,2). Frames captured by the top image capture device, the right image capture device, and the bottom image capture device may be stored in the top storage portions (0,0; 0,1; 0,2), and frames captured by the front image capture device, the left image capture device, and the rear image capture device may be stored in the bottom storage portions (1,0; 1,1; 1,2).

In some implementations, subsequent to identifying the camera alignment model at 910, the physical alignment of one or more image capture devices of an image capture apparatus may change. For example, physical components, such as structural components or materials, of one or more image capture devices, the image capture apparatus, or both may expand, contract, warp, or a combination thereof, in response to changes, such as variations in temperature, aging, physical force, or a combination thereof, which may cause image capture device misalignment. For example, a one micron change in image capture device alignment may cause a single pixel discrepancy between the image capture devices.

In some implementations, one or more image portions corresponding to defined relative space may be identified at 920. Identifying image portions at 920 may be similar to identifying image portions at 720 as shown in FIG. 7, except as described herein. For example, a first image portion, which may be a point, such as a first pixel, at the relative prime meridian (0° relative longitude) and the relative equator (0° relative latitude) in a first image, and a second image portion, such as a second pixel, at the relative prime meridian (0° relative longitude) and the relative equator (0° relative latitude) in a second image may be identified. The relative equator may correspond with the vertical center of the overlap area, which may be N° from the edge of the respective fields-of-view, which may correlate with M pixels from the edge of the respective images.

In some implementations, an alignment path may be identified at 930. Identifying an alignment path at 930 may be similar to identifying an alignment path at 730 as shown in FIG. 7, except as described herein. The alignment path, or epipolar, may indicate a path, which may be vertical, or approximately vertical, from the point identified at 920 to a point along the edge of the image, such as a point at a distal relative latitude. In some implementations, the alignment path, or epipolar, may be a path along the longitude of the point identified at 920. For example, the two image capture devices may be aligned in a back-to-back configuration, with optical centers aligned along an axis, and the epipolar may be a path along a longitude. In some implementations, the alignment path, or epipolar, may be described by the calibrated camera alignment model. For example, the image capture devices may be aligned in an offset configuration, such as the configuration shown in FIG. 6, and the alignment path may be a function, which may be similar to a sinusoidal waveform, of the camera alignment relative to longitude and latitude. In some implementations, an alignment path for one frame may correspond to a respective alignment path for the other frame.

In some implementations, one or more correspondence metrics may be determined at 940. Identifying correspondence metrics at 940 may be similar to identifying correspondence metrics at 740 as shown in FIG. 7, except as described herein. In some implementations, a group, or block, such as a 13×13 block of pixels, centered on the first pixel identified at 920 may be identified from the first image, and a group, or block, such as a 13×13 block of pixels, centered on the second pixel identified at 920 may be identified from the second image. A difference, or match quality metric, may be determined as a difference between the first block from the first frame and the second block from the second frame. For example, the match quality metric may be determined as a sum of squared differences (SSD), a weighted sum of squared differences, or other difference metric, between the two blocks. In some implementations, determining the correspondence metrics may include determining a match quality metric for each point along the alignment paths, which may be performed iteratively or in parallel.

In some implementations, identifying image portions corresponding to defined relative space at 920, identifying an alignment path at 930, determining correspondence metrics at 940, or both may be performed for a set of candidate alignment paths for a longitude as indicated by the broken line at 942. A first candidate alignment path from the set of candidate alignment paths may be orthogonal to the equator, which may be aligned along the respective longitude, and each other candidate alignment path from the set of candidate alignment paths may be angularly offset relative to the longitude. The degree of angular offset for each candidate alignment path may be a defined angular difference from the degree of angular offset for each other candidate alignment path from the set of candidate alignment path for a longitude. For example, a candidate image portion along a candidate alignment path may be a 13×13 block of pixels, and the degree of angular offset for each other candidate alignment path from the set of candidate alignment path for a longitude may correspond with a spatial difference of six pixels.

For example, a first candidate image portion corresponding to a point, or pixel, along the identified longitude may be identified as indicated at 920, a first candidate alignment path may be identified originating at the first candidate image portion as indicated at 930, and first correspondence metrics may be determined for the first candidate alignment path as indicated at 940; a second candidate image portion corresponding to a point, or pixel, longitudinally, or horizontally, adjacent to the identified longitude, such as a point along the latitude of the first candidate image portion and within a defined spatial distance, such as one pixel, from the identified longitude, in a first direction, such as left or right may be identified, a second candidate alignment path may be identified originating at the second candidate image portion as indicated at 930, and second correspondence metrics may be determined for the second candidate alignment path as indicated at 940; and a third candidate image portion corresponding to a point, or pixel, longitudinally, or horizontally, adjacent to the identified longitude, such as a point along the latitude of the first candidate image portion and within a defined spatial distance, such as one pixel, from the identified longitude, in a second direction, opposite the direction of the second candidate image portion, such as right or left of the first identified image portion may be identified, a third candidate alignment path may be identified originating at the third candidate image portion as indicated at 930, and third correspondence metrics may be determined for the third candidate alignment path as indicated at 940. Although three candidate alignment paths are described herein, any number of candidate alignment paths may be used.

In another example, an alignment path may extend from a location, such as a pixel, in a frame corresponding to a relative longitude and an equator, which may be a midpoint between the field-of-view of the image capture device and the overlapping field-of-view of the adjacent image capture device. The path may extend to a location, such as a pixel, in the frame at an edge of the frame. At a latitude along the path, a longitude of the path may differ from the relative longitude by an amount corresponding to an expected relative orientation of the image capture device and the adjacent image capture device, which may be indicated by the camera alignment model. The alignment path may be identified as a first candidate alignment path, and a second alignment path may be identified corresponding to the first alignment path and longitudinally offset from the first alignment path.

In some implementations, identifying image portions corresponding to defined relative space at 920, identifying an alignment path at 930, determining correspondence metrics at 940, or a combination thereof, may be performed for two or more longitudes as indicated by the broken line at 944. For example, identifying image portions corresponding to defined relative space at 920, identifying an alignment path at 930, and determining correspondence metrics at 940 may be performed for each defined longitudinal distance, such as each 0.5° of longitude, or a defined pixel distance corresponding to a defined longitudinal distance as a function of a resolution of the captured images.

In some implementations, an alignment for the current images may be identified at 950. Identifying the alignment for the current images at 950 may be similar to identifying the alignment for the current images at 750 as shown in FIG. 7, except as described herein. In some implementations, identifying the alignment for the current images at 950 may include simultaneously optimizing the correspondence metrics, which may include the correspondence metrics for each candidate alignment path, and a smoothness criterion. A disparity profile from the correspondence metrics may include a discrete per longitude sequence of match quality metrics, wherein each match quality metric for a longitude may correspond to one of the candidate alignment paths for the longitude. Simultaneously optimizing may include identifying a disparity profile representing a latitude per longitude evaluated, having a minimal cost, which may be a sum of match quality metrics, subject to the smoothness criterion.

For example, 724 longitudes may be evaluated in each frame, which may include determining correspondence metrics for 724 alignment paths, which may be approximately one alignment path per 0.5° longitude for 360°; 150 match quality metrics may be determined for each alignment path, which may include three candidate alignment paths per longitude, which may correspond to 450 (3*150) latitudes evaluated per longitude evaluated, which may be approximately three match quality metrics per 0.1° latitude for 10°, and determining the correspondence metrics may include determining 325800 (724*3*150) match quality metrics.

In some implementations, a calibrated, or recalibrated, camera alignment model may be generated and stored at 960. Generating the calibrated camera alignment model may include calibrating the camera alignment model identified at 910 based on the disparity profile identified at 950. For example, for a longitude the camera alignment model identified at 910 may indicate an alignment path, the disparity profile identified at 950 may indicate a candidate alignment path that differs from the alignment path for the longitude indicated by the camera alignment model identified at 910, and the calibrated camera alignment model may update the alignment path for the longitude based on the candidate alignment path identified at 950. For example, updating the alignment path may include omitting the alignment path indicated in the camera alignment model identified at 910 from the calibrated camera alignment model and including the candidate alignment path identified at 950 in the calibrated camera alignment model as the alignment path for the longitude. In another example, updating the alignment path may include using a weighted average of the alignment path indicated in the camera alignment model identified at 910 and the candidate alignment path identified at 950 as the alignment path for the longitude.

In some implementations, the relative weight of the candidate alignment path for updating the alignment path may be lowered, or updating based on the candidate alignment path may be omitted. For example, a difference between the alignment path for the longitude indicated by the camera alignment model identified at 910 and the candidate alignment path identified at 950 may exceed a threshold, which may indicate that the difference is inconsistent with one or more defined alignment change profiles, and updating based on the candidate alignment path may be omitted. An alignment change profile may indicate a defined range of change in alignment corresponding to a cause, such as a temperature change, of the change in alignment.

Although not shown separately in FIG. 9, in some implementations, determining the correspondence metrics at 940 may include determining a gradient of the match quality metric as a function of the angle of the path relative to the longitude, and calibrating the camera alignment model at 960 may be based on the gradient, and the periodic 2D search may be omitted. For example, a gradient of the match quality metric as a function of the angle of the path relative to the longitude may be a difference between the match metrics on adjacent pixels, such as two adjacent pixels, in a direction parallel to the equator, which may indicate a direction, magnitude, or both of angular offset to apply to a corresponding alignment path.

Figure 10:
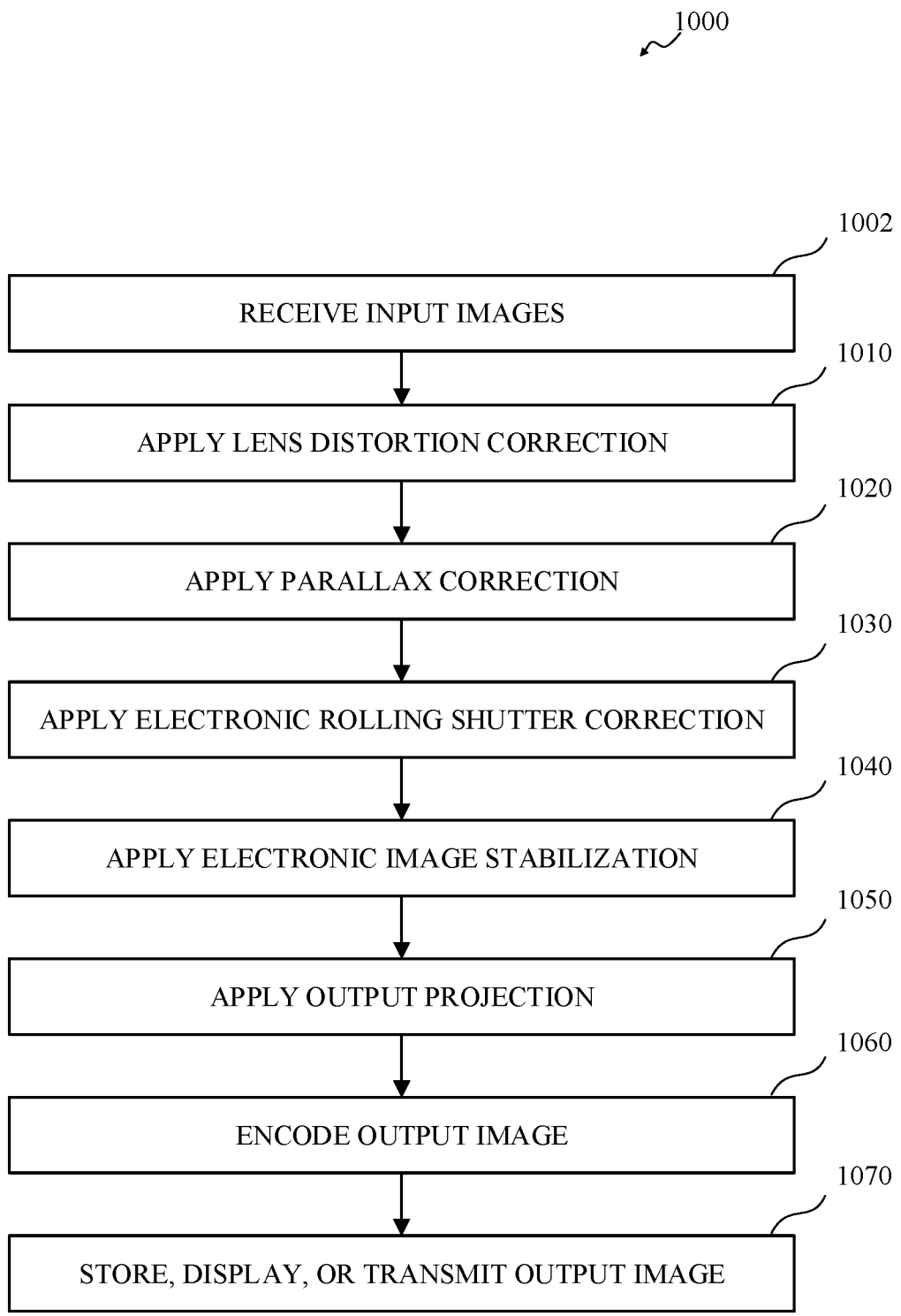
FIG. 10 is a flowchart of an example of a technique for stitching images captured using electronic rolling shutters.

FIG. 10 is a flowchart of an example of a technique 1000 for stitching images captured using electronic rolling shutters. The technique 1000 includes receiving 1002 images from respective image sensors; applying 1010 lens distortion correction; applying 1020 parallax correction for stitching the received images to obtain a composite image; applying 1030 electronic rolling shutter correction to the composite image to obtain an electronic rolling shutter corrected image; applying 1040 electronic image stabilization; applying an output projection; encoding 1060 an output image; and storing, displaying, or transmitting 1070 an output image that is based on the electronic rolling shutter corrected image. For example, the technique 1000 may be implemented by the system 200 of FIG. 2A or the system 230 of FIG. 2B. For example, the technique 1000 may be implemented by an image capture device, such the image capture device 210 shown in FIG. 2, or an image capture apparatus, such as the image capture apparatus 110 shown in FIG. 1. For example, the technique 1000 may be implemented by a personal computing device, such as the personal computing device 260.

The input images, including at least a first image from a first image sensor and a second image from a second image sensor, are received 1002 from the image sensors. The image sensors may be part of an image capture apparatus (e.g., the image capture apparatus 110, the image capture device 210, or the image capture device 240) that holds the image sensors in a relative orientation such that the image sensors have partially overlapping fields of view. For example, the images may be received 1002 from the sensors via a bus (e.g., the bus 224 or image signal processing bus 590). In some implementations, the images may be received 1002 via a communications link (e.g., the communications link 250). For example, the images may be received 1002 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the images may be received 1002 via communications interface 266. For example, a front ISP (e.g., the front ISP 1320) may receive 1002 an input image signal. In some implementations, a front ISP may receive 1002 the input image as shown at 1350 in FIG. 13 from an image sensor, such as the image sensor 1310 shown in FIG. 13. For example, an input image signal may represent each pixel value in a defined format, such as in a RAW image signal format. In some implementations, an input image may be frame of video, i.e., one of a sequence of images of a video.

A transformation for lens distortion correction may be applied 1010 to the input images (e.g., frames of input video). In some implementations, the input images may include partially processed image data from a front ISP (e.g., the front ISP 1320). In some implementations, the images may be low resolution (e.g., ¼×¼ resolution) copies of input images that have been determined and stored by a front ISP (e.g., the front ISP 1320). For example, the lens distortion correction may be grid based. For example, the lens distortion correction transformation may include bilinear, biquadratic, or bicubic interpolation.

The technique 1000 includes applying 1020 parallax correction for stitching input images, including at least a first image and a second image, to obtain a composite image. Parallax correction may be simplified (e.g., reduced from a two dimensional search to a one dimensional search) in some cases by performing pre-compensation for electronic rolling shutter distortion in a seam. In some implementations, applying 1020 parallax correction may include pre-compensating for electronic rolling shutter distortion within a seam region along a stitching boundary. For example, the technique 1100 of FIG. 11A may be implemented to compensate epipolar lines used to determine the parallax correction for electronic rolling shutter distortion. In some implementations, more than two images may be stitched together (e.g., stitching together six images from the image sensors of the image capture apparatus 110 to obtain a spherical image). For example, stitching more than two images together may be simplified where pixels capturing the same object lying at infinity (i.e., far from an image capture apparatus) are captured at the same time. In some implementations, stitching may include applying 1020 parallax correction (e.g., binocular disparity correction for a pair of images) for received images with overlapping fields of view to align the pixels from the images corresponding to objects appearing in multiple fields of view. For example, identifying the alignment for the images may include simultaneously optimizing the correspondence metrics and a smoothness criterion. For example, parallax correction may be applied in one dimension (e.g., parallel to an epipolar line between two image sensors) or in two dimensions. For example, applying 1020 parallax correction may be implemented by a processing apparatus (e.g., the processing apparatus 212 or the processing apparatus 262).

For example, applying 1020 parallax correction may include identifying parallax translations or disparities along a stitching boundary by generating a stitching cost map, as described in relation to FIGS. 5 and 7. For example, the stitching cost unit 580 may be used to determine disparity as described in relation to FIG. 5. For example, applying 1020 parallax correction may include determining a stitching profile, as described in relation to FIGS. 5 and 7. In some implementations, two low resolution input images with overlapping fields of view may be warped to a stitching cost space. For example, an Anscombe transformation (or a similar transformation) may be applied (e.g., using a look up table) as part of the warp to the stitching cost space to impose a value independent noise level. For example, color images may be converted to grey scale images as part of the warp to the stitching cost space. For example, a transformation may be selected based on the epipolars being horizontal and applied as part of the warp to the stitching cost space. For example, an image may be mirrored as part of the warp to the stitching cost space. A stitching cost map may be generated based on the warped images. The stitching cost map may be a two dimensional area indexed by disparity and position (or angle) along the length of the seam or overlapping region of the two input images being stitched. For example, a disparity may be a position along an epipolar line that has been compensated for electronic rolling shutter distortion as described in relation to FIGS. 11A-B. The value of each element in the cost map may be a cost metric (e.g., a pixel discrepancy) associated with using that disparity at that position along the seam between the two images. A stitching profile may be determined as an array specifying a single parallax translation (or disparity) value at each position along the length of the seam. For example, a stitching profile may be determined by using an optimization process, based at least in part on the stitching cost map, to select an alignment path. For example, a stitching profile may be found that has low total cost along the path and smooth changes in disparity along the length of the seam. In some implementations, a temporal smoothness criteria may be considered. In that case, the total cost may be a combination of terms relating to: a cost found in the cost map along a profile; the cost associated with the profile not being uniform spatially; and the cost associated with the profile not being identical with a cost from a previous frame. The parallax translations of the stitching profile may then be applied 1020 to translate image portions (e.g., pixels or blocks of pixels) of the input images that are in the seam to correct for parallax distortion.

The technique 1000 includes applying 1030 electronic rolling shutter correction to the composite image to obtain an electronic rolling shutter corrected image. The electronic rolling shutter correction may mitigate distortion caused by movement of the first image sensor and the second image sensor between times when different portions of the first image and the second image are captured. The electronic rolling shutter correction may include a rotation that is determined based on motion sensor (e.g., gyroscope, magnetometer, and/or accelerometer) measurements from a time associated with the input image(s). For example, applying 1030 electronic rolling shutter correction may include receiving angular rate measurements from an angular rate sensor for a device including the image sensors used to capture a first input image and a second input image, and determining an electronic rolling shutter correction transformation based on the angular rate measurements and times when portions of the first image and the second image were captured using an electronic rolling shutter. For example, angular rate measurements may be interpolated and/or integrated to estimate the motion of an image capture device (e.g., the image capture device 210 of FIG. 2A or the image capture device 240 of FIG. 2B) during the time between capture of different portions of the input images captured using electronic rolling shutter. For example, determining the electronic rolling shutter correction transformation may include determining rotations for respective portions of the first image and the second image based on the angular rate measurements corresponding to times when the respective portions were captured; interpolating the rotations to determine interpolated rotations for smaller image portions of the first image and the second image; and determining the electronic rolling shutter correction transformations based on the interpolated rotations.

The technique 1000 includes applying 1040 electronic image stabilization. For example, a portion of the composite image may be shifted to a new address or position within the composite image based on the electronic image stabilization rotation. An electronic image stabilization rotation may be determined based at least in part on angular rate measurements for a device including the one or more image sensors used to capture the input images. The electronic image stabilization rotation may be determined based on motion sensor (e.g., gyroscope, magnetometer, and/or accelerometer) measurements from a time associated with the input images.

The technique 1000 includes applying 1050 an output projection to the composite image to transform the composite image to a chosen output space or representation (e.g., 6-faces, equirectangular, or spherical). For example, the projection transformation may be grid based. The projection transformation may project a portion of the composite image into one or more portions of the composite image in the final format.

The technique 1000 includes encoding 1060 the output image (e.g., in a compressed format). The output image (e.g., the frame of output video) may be encoded 1060 by an encoder (e.g., the encoder 1340).

The technique 1000 includes storing, displaying, or transmitting 1070 an output image that is based on the electronic rolling shutter corrected image. For example, the output image may be transmitted to an external device (e.g., a personal computing device) for display or storage. For example, the output image may be displayed in the user interface 220 or in the user interface 264. For example, the output image may be transmitted via the communications interface 218.

The technique 1000 may be applied to input images that have been processed to mitigate image sensor noise, adjust tones to enhance contrast, or otherwise improve the quality of the image(s). For example, the input images may have been processed to by a front ISP (e.g., e.g., the front ISP 1320) to perform operations such as image scaling, correcting dead pixels, performing band processing, decoupling vertical blanking, or a combination thereof. For example, the input images may have been processed by a noise reduction module (e.g., the temporal noise reduction unit 520 and/or the raw to raw 540) to mitigate image sensor noise using temporal and/or spatial noise reduction methods. For example, the input images may have been processed by the R2Y 550 to perform a demosaic operation. For example, the input images may have been processed by a tone mapping module (e.g., Y2Y 560) to perform local tone mapping and/or global tone mapping to contrast and/or perceived image quality.

In some implementations, the operations of the technique 1000 are applied successively in order to a set of constituent input images in a sequence of operations, where the output of an operation is passed as input to the next operation until the technique 1000 has been completed. In some implementations, multiple operations of the technique 1000 (e.g., applying 1010 lens distortion correction, applying 1020 parallax correction, applying 1030 electronic rolling shutter correction, applying 1040 electronic image stabilization, and/or applying 1050 an output projection) may be applied simultaneously by applying a warp mapping that has been determined to affect the sequence of operations in a single mapping transformation. For example, the technique 1000 may be implemented using the technique 1200 of FIG. 12A to, among other things, determine and apply a warp mapping that effectively applies an electronic rolling shutter correction after a parallax correction. For example, the technique 1000 may be implemented by the warp and blend unit 570 of FIG. 5.

Figure 11A:
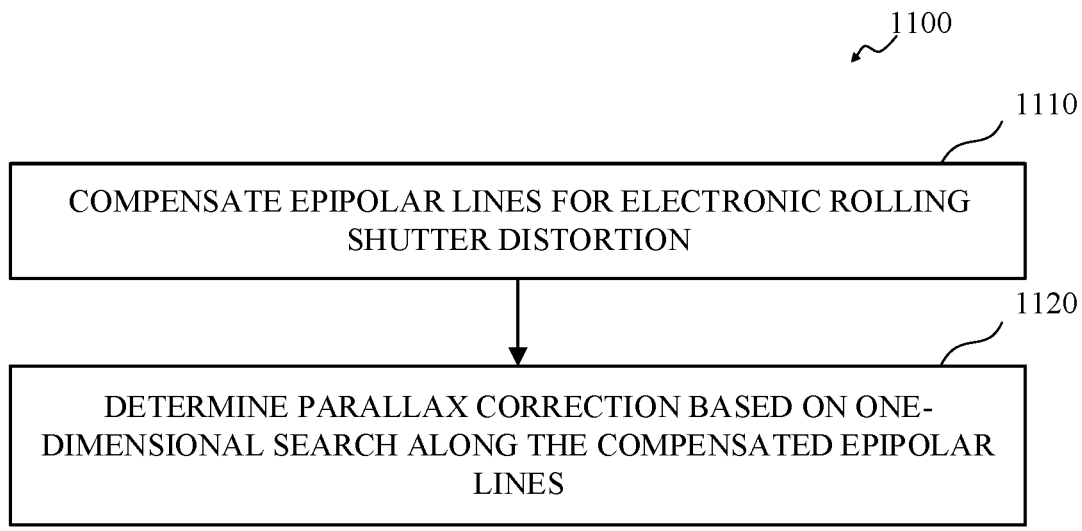
FIG. 11A is a flowchart of an example of a technique for compensating for electronic rolling shutter distortion when determining parallax correction for stitching images captured using electronic rolling shutters.

FIG. 11A is a flowchart of an example of a technique 1100 for compensating for electronic rolling shutter distortion when determining parallax correction for stitching images captured using electronic rolling shutters. The technique 1100 includes compensating 1110 epipolar lines for electronic rolling shutter distortion; and determining 1120 parallax correction based on one-dimensional search along the compensated epipolar lines. For example, the technique 1100 may be implemented by the system 200 of FIG. 2A or the system 230 of FIG. 2B. For example, the technique 1100 may be implemented by an image capture device, such the image capture device 210 shown in FIG. 2, or an image capture apparatus, such as the image capture apparatus 110 shown in FIG. 1. For example, the technique 1100 may be implemented by a personal computing device, such as the personal computing device 260.

The technique 1100 includes compensating 1110 epipolar lines for electronic rolling shutter distortion. An initial set of epipolar lines for a pair of image sensors may be determined based on the relative position and/or orientation of the two image sensors. The relative position and/or orientation of two image sensors may be determined as a mechanical model of an apparatus that includes the two image sensors and holds them in position and/or orientation relative to one another. The initial set of epipolar lines may include epipolar lines passing through respective image portions (e.g., pixels or blocks of pixels) along a stitching boundary (e.g., at 90 degrees from north or south for the image sensor 340 or 342 of FIG. 3). The epipolar lines in a seam may be specified by respective pairs of points (e.g., image portions) including a far point on a stitching boundary (e.g., at 90 degrees from north or south for the image sensor 340 or 342 of FIG. 3) that corresponds little or no binocular disparity for an object far from the image sensors, and a near point that is near an edge (e.g., at 97 degrees from north or south for the image sensor 340 or 342 of FIG. 3) of a stitching region or seam that will be searched and corresponds to a maximum expected binocular disparity for an object near the image sensors. Compensating 1110 the epipolar lines may include adjusting the respective near points based on electronic rolling shutter distortion information (e.g., gyroscope measurements for a time between when an image portion at the far point was captured and a second time when an image portion at the corresponding near point was captured). The far point and the adjusted near point specify a compensated epipolar line and can be used to identify other image portions along the compensated epipolar line by linear interpolation. For example, the technique 1150 of FIG. 11B may be implemented to compensate 1110 an epipolar line and may be repeated to compensate 1110 multiple epipolar lines.

The technique 1100 includes determining 1120 parallax correction based on one-dimensional search along the compensated epipolar lines. The image portions (e.g., pixels or blocks of pixels) along a compensated epipolar line may be searched for correspondence between the images being stitched. For example, a set of translations of image portions for parallax correction (e.g., binocular disparity correction for a pair of images) may be determined 1120 for received images with overlapping fields of view to align the pixels from the images corresponding to objects appearing in multiple fields of view. For example, identifying the alignment for the images may include simultaneously optimizing the correspondence metrics and a smoothness criterion. For example, determining 1120 a set of translations of image portions for parallax correction may include identifying parallax translations or disparities along a stitching boundary by generating a stitching cost map, as described in relation to FIGS. 5 and 7. For example, the stitching cost unit 580 may be used to determine disparity as described in relation to FIG. 5. For example, determining 1120 a set of translations of image portions for parallax correction may include determining a stitching profile, as described in relation to FIGS. 5 and 7. In some implementations, two low resolution input images with overlapping fields of view may be warped to a stitching cost space. For example, an Anscombe transformation (or a similar transformation) may be applied (e.g., using a look up table) as part of the warp to the stitching cost space to impose a value independent noise level. For example, color images may be converted to grey scale images as part of the warp to the stitching cost space. For example, a transformation may be selected based on the epipolars being horizontal and applied as part of the warp to the stitching cost space. For example, an image may be mirrored as part of the warp to the stitching cost space. A stitching cost map may be generated based on the warped images. The stitching cost map may be a two dimensional area indexed by disparity and position (or angle) along the length of the seam or overlapping region of the two input images being stitched. The value of each element in the cost map may be a cost metric (e.g., a pixel discrepancy) associated with using that disparity at that position along the seam between the two images. A stitching profile may be determined as an array specifying a single parallax translation (or disparity) value at each position along the length of the seam. For example, a stitching profile may be determined by using an optimization process, based at least in part on the stitching cost map, to select an alignment path. For example, a stitching profile may be found that has low total cost along the path and smooth changes in disparity along the length of the seam.

Figure 11B:
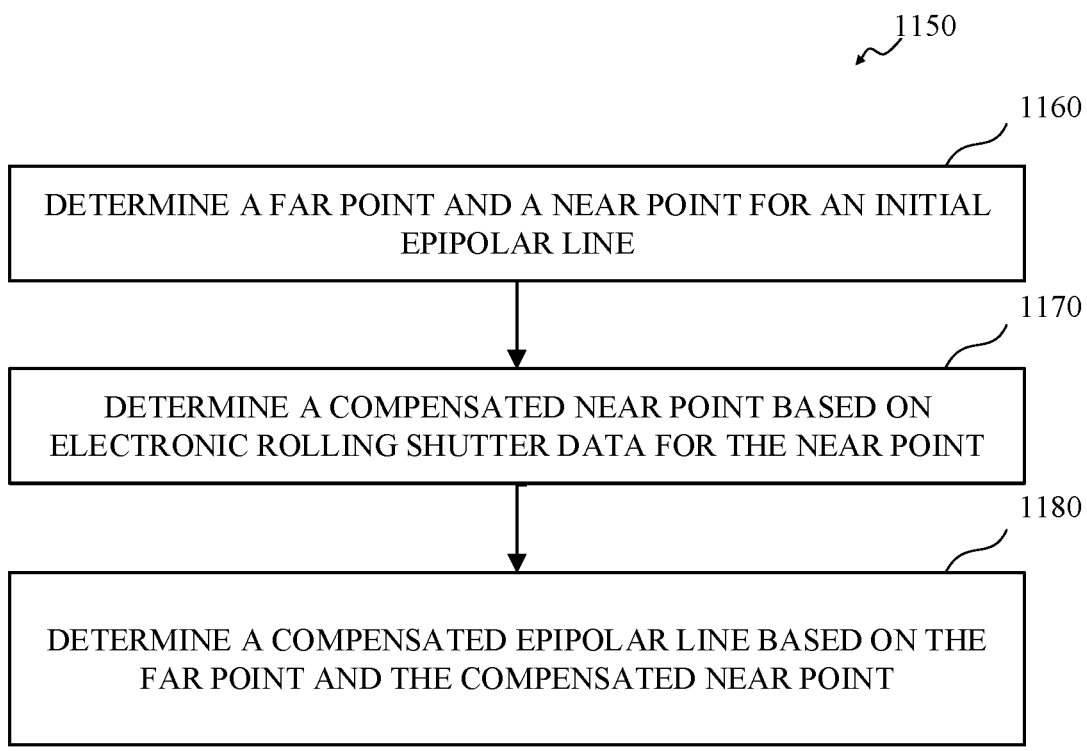
FIG. 11B is a flowchart of an example of a technique for compensating an epipolar line for electronic rolling shutter distortion.

FIG. 11B is a flowchart of an example of a technique 1150 for compensating an epipolar line for electronic rolling shutter distortion. The technique 1150 includes determining 1160 a far point and a near point for an initial epipolar line that is based on a mechanical model of an apparatus including the first image sensor and the second image sensor; determining 1170 a compensated near point based on the near point and electronic rolling shutter data for the near point; and determining 1180 one of the compensated epipolar lines based on the far point and the compensated near point. For example, the technique 1150 may be implemented by the system 200 of FIG. 2A or the system 230 of FIG. 2B. For example, the technique 1150 may be implemented by an image capture device, such the image capture device 210 shown in FIG. 2, or an image capture apparatus, such as the image capture apparatus 110 shown in FIG. 1. For example, the technique 1150 may be implemented by a personal computing device, such as the personal computing device 260.

The technique 1150 includes determining 1160 a far point and a near point for an initial epipolar line. The initial epipolar line may be determined geometrically based on a relative position and/or orientation of the image sensors used to capture the images to be stitched. For example, the initial epipolar line may be based on a mechanical model of an apparatus including a first image sensor and a second image sensor. The far point may be an image portion (e.g., a pixel or block of pixels) on the initial epipolar line that is located on a boundary (e.g., at 90 degrees from north or south for the image sensor 340 or 342 of FIG. 3) between two images to be stitched and may correspond to zero or small parallax distortion (e.g., binocular disparity) observed for an object located far from the image sensors that captured the images. The near point may be a second image portion on the initial epipolar line that is located near an edge (e.g., at 97 degrees from north or south for the image sensor 340 or 342 of FIG. 3) of the seam between two images to be stitched and may correspond to a large parallax distortion observed for an object located near to the image sensors that captured the images.

The technique 1150 includes determining 1170 a compensated near point based on the near point and electronic rolling shutter data for the near point. A goal may be to identify a compensated near point (e.g., a pixel or block of pixels) that would have been captured along the initial epipolar line through the far point, if the image capture apparatus had been perfectly still or the far point and the near point were captured simultaneously. For example, the electronic rolling shutter data may include a time when the far point was captured, a time when the near point was captured, and angular rate data (e.g., one or more gyroscope measurements) for the time interval between these two times. For example, the compensated near point may be determined 1170 by rotating the near point by rotation corresponding to the orientation of image capture apparatus at the time the near point was captured relative to the orientation at the time the far point was captured.

For example, assume an epipolar line passes through far point $P_1=(x_1,y_1)$ (e.g., corresponding to an object at infinity) and near point $P_2=(x_2,y_2)$ (e.g., corresponding to an object at a shortest distance). Let $R_1$ be a rotation or orientation of an image capture apparatus including the image sensors used to capture the images to be stitched that is associated with point $P_1$. Let R2 be a rotation associated with point $P_2$. Because $P_1$ and $P_2$ are close to each other, $R_1$ and $R_2$ may be close to each other and we can reasonably approximate that a point $P_3$ lying between $P_1$ and $P_2$, hence of the form $kP_1+(1-k)P_2$ has an associated rotation $R_3=kR_1+(1-k)R_2$, when k is a linear interpolation constant. This may be true if the image capture apparatus moves or rotates at a constant rate between the times when the far point is captured and when the near point is captured. And if it is not exactly true, it may be a reasonable approximation. The goal may be to generate an epipolar line that simulates that all pixels are captured with a rotation $R_1$. For that, it suffices to move a point $P_3$ by $R_1R_3^{-1}$ to obtain $P_3'$, which is equivalent to say $P_3'=kP_1+(1-k)P_2'$ where $P_2'$ is obtained by rotating $P_2$ by $R_1R_2^{-1}$. Another way of saying this is that epipolar line $P_1:P_2$ is replaced by epipolar line $P_1:P_2'$. Note that the rotation that transform $P_2$ into $P_2'$ (i.e. $R_1R_2^{-1}$) can be derived directly from the gyroscope data for the image capture apparatus without computing $R_1$ and $R_2$.

The technique 1150 includes determining 1180 one of the compensated epipolar lines based on the far point and the compensated near point. Points (e.g., pixels or blocks of pixels) of the compensated epipolar line may be determined 1180 by linear interpolation between the far point and the compensate near point. For example, an intermediate point of the compensated epipolar line may be determined as $P_3'=kP_1+(1-k)P_2'$. The points of the compensated epipolar line may be searched in a one-dimensional search for correspondence between two images being stitched to determine parallax correction displacement (e.g., binocular disparity) for stitching the two images.

Figure 12A:
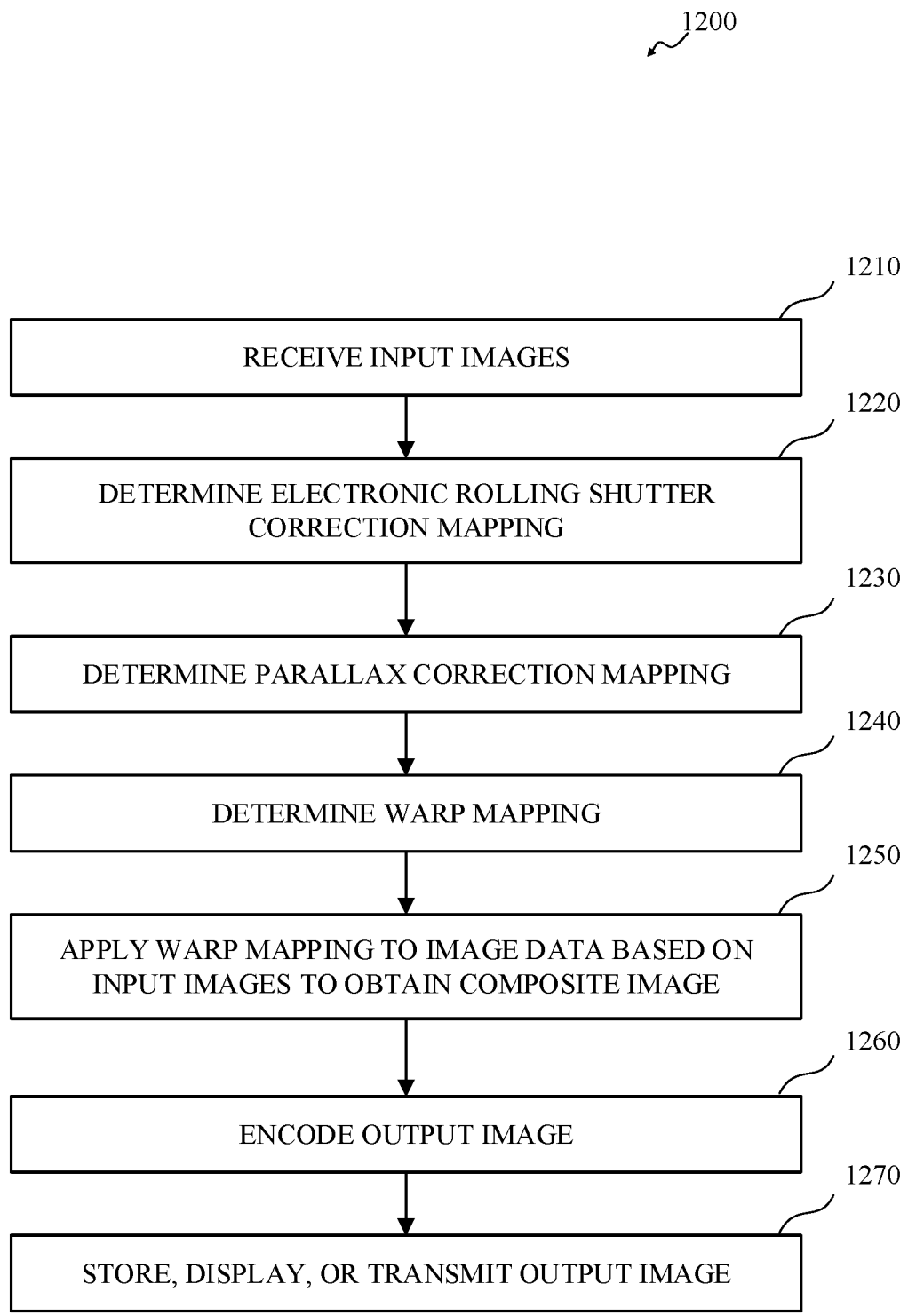
FIG. 12A is a flowchart of an example of a technique for stitching images captured using electronic rolling shutters.

FIG. 12A is a flowchart of an example of a technique 1200 for stitching images captured using electronic rolling shutters. The technique 1200 includes receiving 1210 input images (e.g., including a first image from a first image sensor and a second image from a second image sensor); determining 1220 an electronic rolling shutter correction mapping for the input images, wherein the electronic rolling shutter correction mapping specifies translations of image portions that depend on location within the first image and the second image along a dimension along which a rolling shutter advanced; determining 1230 a parallax correction mapping based on the first image and the second image for stitching the first image and the second image; determining 1240 a warp mapping based on the parallax correction mapping and the electronic rolling shutter correction mapping, wherein the warp mapping applies the electronic rolling shutter correction mapping after the parallax correction mapping; applying 1250 the warp mapping to image data based on the first image and the second image to obtain a composite image; encoding 1260 an output image based on the composite image; and storing, displaying, or transmitting 1270 an output image that is based on the composite image. For example, the technique 1200 may be implemented by the system 200 of FIG. 2A or the system 230 of FIG. 2B. For example, the technique 1200 may be implemented by an image capture device, such the image capture device 210 shown in FIG. 2, or an image capture apparatus, such as the image capture apparatus 110 shown in FIG. 1. For example, the technique 1200 may be implemented by a personal computing device, such as the personal computing device 260.

The technique 1200 includes receiving 1210 input images, including at least a first image from a first image sensor and a second image from a second image sensor. The image sensors may be part of an image capture apparatus (e.g., the image capture apparatus 110, the image capture device 210, or the image capture device 240) that holds the image sensors in a relative orientation such that the image sensors have partially overlapping fields of view. In some implementations, the first image sensor and the second image sensor are contained in a camera housing that also contains and a processing apparatus implementing the technique 1200. For example, the processing apparatus 212 may receive 1210 the input images from the image sensor 1 214 and the image sensor 2 216 of the image capture device 210 of FIG. 3. In some implementations, a first fish-eye lens (e.g., the lens 150 may be a fisheye lens) is attached to the first image sensor, and a second fish-eye lens (e.g., the lens 152 may be a fisheye lens) attached to the second image sensor. For example, the image sensors 340 and 342 of the image capture apparatus 300 of FIG. 3 may be used to capture the first image and the second image. For example, the images may be received 1210 from the sensors via a bus (e.g., the bus 224 or image signal processing bus 590). In some implementations, the images may be received 1210 via a communications link (e.g., the communications link 250). For example, the images may be received 1210 via a wireless or wired communications interface (e.g., Wi-Fi, Bluetooth, USB, HDMI, Wireless USB, Near Field Communication (NFC), Ethernet, a radio frequency transceiver, and/or other interfaces). For example, the images may be received 1210 via communications interface 266. For example, a front ISP (e.g., the front ISP 1320) may receive 1210 an input image signal. In some implementations, a front ISP may receive 1210 the input image as shown at 1350 in FIG. 13 from an image sensor, such as the image sensor 1310 shown in FIG. 13. For example, an input image signal may represent each pixel value in a defined format, such as in a RAW image signal format. In some implementations, an input image may be frame of video, i.e., one of a sequence of images of a video.

The technique 1200 includes determining 1220 an electronic rolling shutter correction mapping for the input images, including the first image and the second image. The electronic rolling shutter correction mapping may specify translations of image portions that depend on location within the first image and the second image along a dimension along which a rolling shutter advanced. For example, the electronic rolling shutter correction may include a rotation that is determined based on motion sensor (e.g., gyroscope, magnetometer, and/or accelerometer) measurements from a time associated with the input image(s). In some implementations, determining 1220 the electronic rolling shutter correction mapping includes receiving angular rate measurements from an angular rate sensor for a device including the first image sensor and the second image sensor for times during capture of the first image and the second image; and determining the electronic rolling shutter correction mapping based on the angular rate measurements and times when portions of the first image and the second image were captured using an electronic rolling shutter. For example, angular rate measurements may be interpolated and/or integrated to estimate the motion of an image capture device (e.g., the image capture device 210 of FIG. 2A or the image capture device 240 of FIG. 2B) during the time between capture of different portions of the input images captured using electronic rolling shutter. For example, determining 1220 the electronic rolling shutter correction mapping may include determining rotations for respective portions of the first image and the second image based on the angular rate measurements corresponding to times when the respective portions were captured; interpolating the rotations to determine interpolated rotations for smaller image portions of the first image and the second image; and determining the electronic rolling shutter correction mapping based on the interpolated rotations. For example, the electronic rolling shutter correction mapping may include records (e.g., similar to the record 1410 of FIG. 14) that associate portions (e.g., pixels or blocks of pixels) of a parallax corrected image with portions of a shutter corrected image. For example, the electronic rolling shutter correction mapping may be determined 1220 by a processing apparatus (e.g., the processing apparatus 212 or the processing apparatus 262).

The technique 1200 includes determining 1230 a parallax correction mapping based on a first image and a second image for stitching the first image and the second image. Parallax correction may be simplified (e.g., reduced from a two dimensional search to a one dimensional search) in some cases by performing pre-compensation for electronic rolling shutter distortion in a seam. In some implementations, determining 1230 the parallax correction mapping may include pre-compensating for electronic rolling shutter distortion within a seam region along a stitching boundary. For example, the technique 1280 of FIG. 12B may be implemented to compensate epipolar lines used to determine the parallax correction for electronic rolling shutter distortion. In some implementations, more than two images may be stitched together (e.g., stitching together six images from the image sensors of the image capture apparatus 110 to obtain a spherical image). In some implementations, stitching may include applying parallax correction (e.g., binocular disparity correction for a pair of images) for received images with overlapping fields of view to align the pixels from the images corresponding to objects appearing in multiple fields of view. For example, identifying the alignment for the images may include simultaneously optimizing the correspondence metrics and a smoothness criterion. For example, parallax correction may be applied in one dimension (e.g., parallel to an epipolar line between two image sensors) or in two dimensions. For example, the parallax correction mapping may be determined 1230 by a processing apparatus (e.g., the processing apparatus 212 or the processing apparatus 262).

For example, determining 1230 the parallax correction mapping may include identifying parallax translations or disparities along a stitching boundary by generating a stitching cost map, as described in relation to FIGS. 5 and 7. For example, the stitching cost unit 580 may be used to determine disparity as described in relation to FIG. 5. For example, determining 1230 the parallax correction mapping may include determining a stitching profile, as described in relation to FIGS. 5 and 7. In some implementations, two low resolution input images with overlapping fields of view may be warped to a stitching cost space. For example, an Anscombe transformation (or a similar transformation) may be applied (e.g., using a look up table) as part of the warp to the stitching cost space to impose a value independent noise level. For example, color images may be converted to grey scale images as part of the warp to the stitching cost space. For example, a transformation may be selected based on the epipolars being horizontal and applied as part of the warp to the stitching cost space. For example, an image may be mirrored as part of the warp to the stitching cost space. A stitching cost map may be generated based on the warped images. The stitching cost map may be a two dimensional area indexed by disparity and position (or angle) along the length of the seam or overlapping region of the two input images being stitched. The value of each element in the cost map may be a cost metric (e.g., a pixel discrepancy) associated with using that disparity at that position along the seam between the two images. A stitching profile may be determined as an array specifying a single parallax translation (or disparity) value at each position along the length of the seam. For example, a stitching profile may be determined by using an optimization process, based at least in part on the stitching cost map, to select an alignment path. For example, a stitching profile may be found that has low total cost along the path and smooth changes in disparity along the length of the seam. The parallax translations of the stitching profile may then be specified in records (e.g., similar to the record 1410 of FIG. 14) of the parallax correction mapping. The parallax correction mapping may specify translation of image portions (e.g., pixels or blocks of pixels) of the input images that are in the seam to correct for parallax distortion.

The technique 1200 includes determining 1240 a warp mapping based on the parallax correction mapping and the electronic rolling shutter correction mapping. The warp mapping may apply the electronic rolling shutter correction mapping after the parallax correction mapping. The warp mapping may include records that associate image portions of the composite image with corresponding image portions of the first image and the second image. For example, the warp mapping may include records such as the record 1410 of FIG. 14. In some implementations, the electronic rolling shutter correction mapping is determined 1220 at a lower resolution (e.g., using 32×32 pixel blocks) than the parallax correction mapping (e.g., determined using 8×8 pixel blocks). Determining 1220 the electronic rolling shutter mapping at a lower resolution may conserve computing resources (e.g., memory and/or processor bandwidth) in an image capture system. The warp mapping may be determined 1240 as a chain of mappings applied in succession. In some implementations, determining 1240 the warp mapping may include determining the warp mapping based on a lens distortion correction mapping for the first image and the second image, such that the warp mapping applies the parallax correction mapping to output of the lens distortion correction mapping. For example, the lens distortion correction mapping may specify a lens distortion correction transformation, such as those described in relation to operation 1010 of FIG. 10. In some implementations, the warp mapping is further determined 1240 based on an output projection mapping, such that the warp mapping applies the output projection mapping to output of the electronic rolling shutter correction mapping. For example, the output projection mapping may specify an output projection transformation, such as those described in relation to operation 1050 of FIG. 10. For example, the warp mapping may be determined 1240 by the warp and blend unit 570 of FIG. 5. For example, the warp mapping may be determined 1240 by the warp mapper 1370 of FIG. 13. For example, the warp mapping may be determined 1240 by a processing apparatus (e.g., the processing apparatus 212 or the processing apparatus 262).

The technique 1200 includes applying 1250 the warp mapping to image data based on the first image and the second image to obtain a composite image. For example, the warp mapping may include records in the format shown in the memory map 1400 of FIG. 14. For example, the warp mapping may be applied 1250 by reading an image portion (e.g., a pixel or block of pixels) of an input image (e.g., the first image or the second image) specified by a record of the warp mapping and writing the image portion to a corresponding location in the composite image that is specified by the record of the warp mapping. This process may be repeated for some or all of the records of the warp mapping to apply 1250 the warp mapping. For example, the warp mapping may be applied 1250 by the warp and blend unit 570 of FIG. 5. For example, the warp mapping may be applied 1250 by the warp module 1332 of FIG. 13. For example, the warp mapping may be applied 1250 by a processing apparatus (e.g., the processing apparatus 212 or the processing apparatus 262).

The input images may have been subject to image processing to mitigate image sensor noise, adjust tones to enhance contrast, or otherwise improve the quality of the input image(s) prior to applying 1250 of the warp mapping. For example, the input images may have been processed by a front ISP (e.g., e.g., the front ISP 1320) to perform operations such as image scaling, correcting dead pixels, performing band processing, decoupling vertical blanking, or a combination thereof. For example, the input images may have been processed by a noise reduction module (e.g., the temporal noise reduction unit 520 and/or the $R_2R$ 540) to mitigate image sensor noise using temporal and/or spatial noise reduction methods. For example, the input images may have been processed by the $R_2Y$ 550 to perform a demosaic operation. For example, the input images may have been processed by a tone mapping module (e.g., Y2Y 560) to perform local tone mapping and/or global tone mapping to contrast and/or improve perceived image quality.

The technique 1200 includes encoding 1260 an output image (e.g., in a compressed format). The output image (e.g., the frame of output video) may be encoded 1260 by an encoder (e.g., the encoder 1340).

The technique 1200 includes storing, displaying, or transmitting 1270 an output image that is based on the composite image. For example, the output image may be transmitted 1270 to an external device (e.g., a personal computing device) for display or storage. For example, the output image may be displayed 1270 in the user interface 220 or in the user interface 264. For example, the output image may be transmitted 1270 via the communications interface 218.

In some implementations (not explicitly shown), the technique 1200 may include determining an electronic image stabilization (EIS) transformation and incorporating it as part of the warp mapping. In some implementations (not explicitly shown), the technique 1200 may include blending the images along the stitching boundary in the composite image (e.g., as described in relation to the combined warp and blend unit 570 of FIG. 5).

Figure 12B:
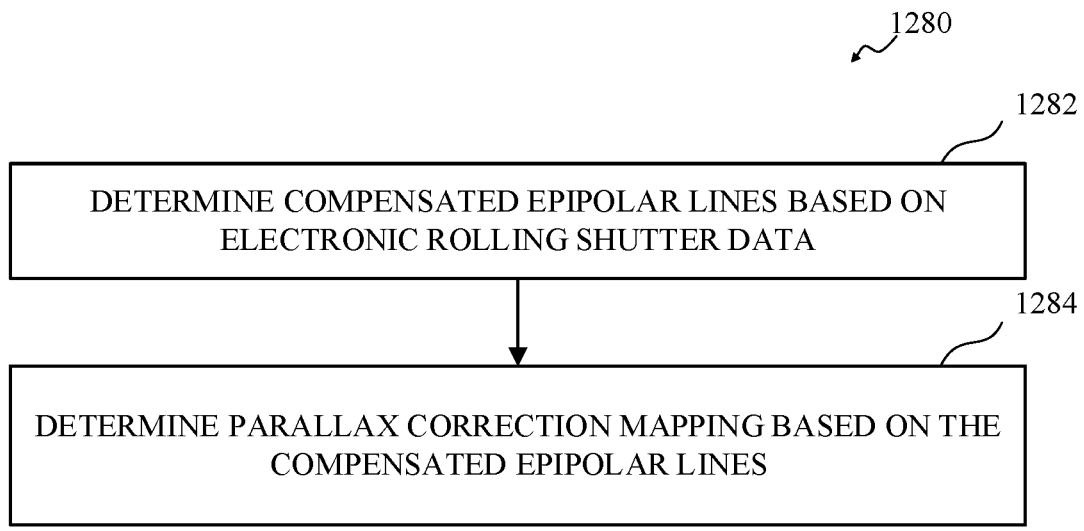
FIG. 12B is a flowchart of an example of a technique for compensating for electronic rolling shutter distortion when determining a parallax correction mapping for stitching images captured using electronic rolling shutters.

FIG. 12B is a flowchart of an example of a technique 1280 for compensating for electronic rolling shutter distortion when determining a parallax correction mapping for stitching images captured using electronic rolling shutters. The technique 1280 includes determining 1282 compensated epipolar lines based on electronic rolling shutter data; and determining 1284 the parallax correction mapping based on the compensated epipolar lines. For example, the technique 1280 may be implemented by the system 200 of FIG. 2A or the system 230 of FIG. 2B. For example, the technique 1280 may be implemented by an image capture device, such the image capture device 210 shown in FIG. 2, or an image capture apparatus, such as the image capture apparatus 110 shown in FIG. 1. For example, the technique 1280 may be implemented by a personal computing device, such as the personal computing device 260.

The technique 1280 includes determining 1282 compensated epipolar lines based on electronic rolling shutter data. An initial set of epipolar lines for a pair of image sensors may be determined based on the relative position and/or orientation of the two image sensors. The relative position and/or orientation of two image sensors may be determined as a mechanical model of an apparatus that includes the two image sensors and holds them in position and/or orientation relative to one another. The initial set of epipolar lines may include epipolar lines passing through respective image portions (e.g., pixels or blocks of pixels) along a stitching boundary (e.g., at 90 degrees from north or south for the image sensor 340 or 342 of FIG. 3). The epipolar lines in a seam may be specified by respective pairs of points (e.g., image portions) including a far point on a stitching boundary (e.g., at 90 degrees from north or south for the image sensor 340 or 342 of FIG. 3) that corresponds little or no binocular disparity for an object far from the image sensors, and a near point that is near an edge (e.g., at 97 degrees from north or south for the image sensor 340 or 342 of FIG. 3) of a stitching region or seam that will be searched and corresponds to a maximum expected binocular disparity for an object near the image sensors. Determining 1282 the compensated epipolar lines may include adjusting the respective near points based on electronic rolling shutter distortion information (e.g., gyroscope measurements for a time between when an image portion at the far point was captured and a second time when an image portion at the corresponding near point was captured). The far point and the adjusted near point specify a compensated epipolar line and can be used to identify other image portions along the compensated epipolar line by linear interpolation. For example, the technique 1290 of FIG. 12C may be implemented to determine 1282 a compensated epipolar line and may be repeated to determine 1282 multiple compensated epipolar lines.

The technique 1280 includes determining 1284 the parallax correction mapping based on the compensated epipolar lines. For example the parallax correction mapping may include a set of parallax correction translations (e.g., based on binocular disparities) for image portions along a seam between two images being stitched. For example, determining 1284 the parallax correction mapping may include performing a one-dimensional search for a parallax translation along one or more of the compensated epipolar lines. The image portions (e.g., pixels or blocks of pixels) along a compensated epipolar line may be searched for correspondence between the images being stitched. For example, a set of translations of image portions for parallax correction (e.g., binocular disparity correction for a pair of images) may be determined 1284 for received images with overlapping fields of view to align the pixels from the images corresponding to objects appearing in multiple fields of view. For example, identifying the alignment for the images may include simultaneously optimizing the correspondence metrics and a smoothness criterion. For example, determining 1284 a set of translations of image portions for parallax correction may include identifying parallax translations or disparities along a stitching boundary by generating a stitching cost map, as described in relation to FIGS. 5 and 7. For example, the stitching cost unit 580 may be used to determine disparity as described in relation to FIG. 5. For example, determining 1284 a set of translations of image portions for parallax correction may include determining a stitching profile, as described in relation to FIGS. 5 and 7. In some implementations, two low resolution input images with overlapping fields of view may be warped to a stitching cost space. For example, an Anscombe transformation (or a similar transformation) may be applied (e.g., using a look up table) as part of the warp to the stitching cost space to impose a value independent noise level. For example, color images may be converted to grey scale images as part of the warp to the stitching cost space. For example, a transformation may be selected based on the epipolars being horizontal and applied as part of the warp to the stitching cost space. For example, an image may be mirrored as part of the warp to the stitching cost space. A stitching cost map may be generated based on the warped images. The stitching cost map may be a two dimensional area indexed by disparity and position (or angle) along the length of the seam or overlapping region of the two input images being stitched. The value of each element in the cost map may be a cost metric (e.g., a pixel discrepancy) associated with using that disparity at that position along the seam between the two images. A stitching profile may be determined as an array specifying a single parallax translation (or disparity) value at each position along the length of the seam. For example, a stitching profile may be determined by using an optimization process, based at least in part on the stitching cost map, to select an alignment path. For example, a stitching profile may be found that has low total cost along the path and smooth changes in disparity along the length of the seam. In some implementations, the electronic rolling shutter correction mapping is determined at a lower resolution (e.g., using 32×32 pixel blocks) than the parallax correction mapping (e.g., determined using 8×8 pixel blocks). Determining 1220 the electronic rolling shutter mapping at a lower resolution may conserver computing resources (e.g., memory and/or processor bandwidth) in an image capture system.

Figure 12C:
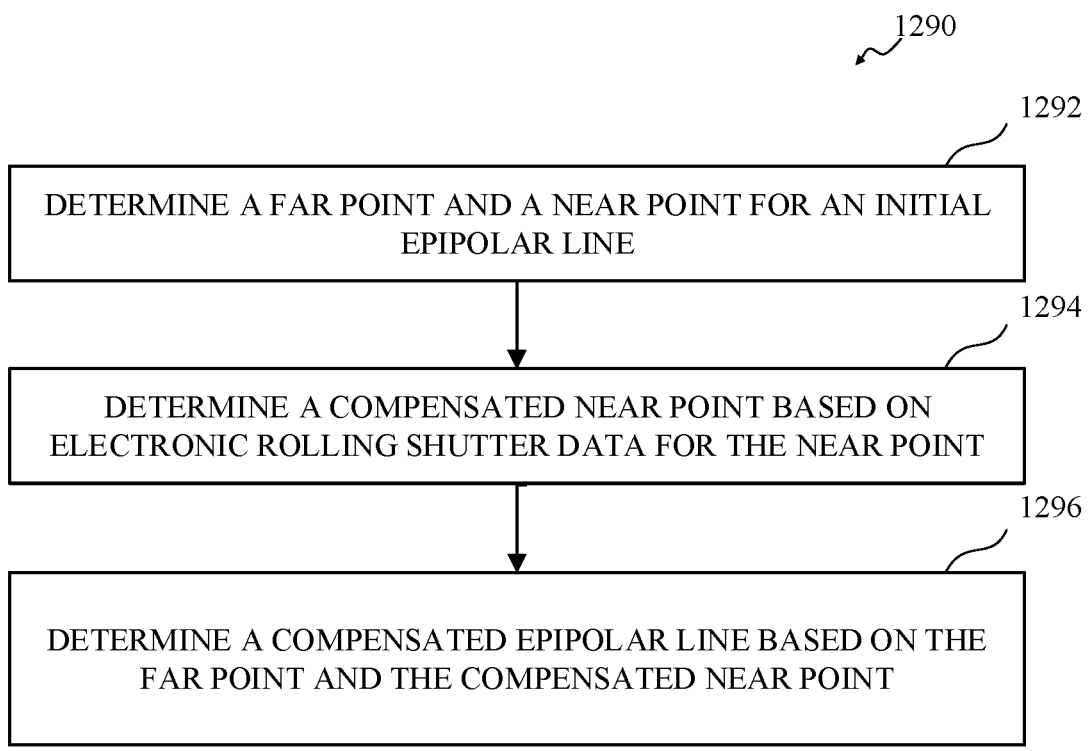
FIG. 12C is a flowchart of an example of a technique for determining a compensated epipolar line.

FIG. 12C is a flowchart of an example of a technique 1290 for determining a compensated epipolar line. The technique 1290 includes determining 1292 a far point and a near point for an initial epipolar line; determining 1294 a compensated near point based on the near point and electronic rolling shutter data for the near point; and determining 1296 one of the compensated epipolar lines based on the far point and the compensated near point. For example, the technique 1290 may be implemented by the system 200 of FIG. 2A or the system 230 of FIG. 2B. For example, the technique 1290 may be implemented by an image capture device, such the image capture device 210 shown in FIG. 2, or an image capture apparatus, such as the image capture apparatus 110 shown in FIG. 1. For example, the technique 1290 may be implemented by a personal computing device, such as the personal computing device 260.

The technique 1290 includes determining 1292 a far point and a near point for an initial epipolar line. The initial epipolar line may be determined geometrically based on a relative position and/or orientation of the image sensors used to capture the images to be stitched. For example, the initial epipolar line may be based on a mechanical model of an apparatus including a first image sensor and a second image sensor. The far point may be an image portion (e.g., a pixel or block of pixels) on the initial epipolar line that is located on a boundary (e.g., at 90 degrees from north or south for the image sensor 340 or 342 of FIG. 3) between two images to be stitched and may correspond to zero or small parallax distortion (e.g., binocular disparity) observed for an object located far from the image sensors that captured the images. The near point may be a second image portion on the initial epipolar line that is located near an edge (e.g., at 97 degrees from north or south for the image sensor 340 or 342 of FIG. 3) of the seam between two images to be stitched and may correspond to a large parallax distortion observed for an object located near to the image sensors that captured the images.

The technique 1290 includes determining 1294 a compensated near point based on the near point and electronic rolling shutter data for the near point. A goal may be to identify a compensated near point (e.g., a pixel or block of pixels) that would have been captured along the initial epipolar line through the far point, if the image capture apparatus had been perfectly still or the far point and the near point were captured simultaneously. For example, the electronic rolling shutter data may include a time when the far point was captured, a time when the near point was captured, and angular rate data (e.g., one or more gyroscope measurements) for the time interval between these two times. For example, the compensated near point may be determined 1294 by rotating the near point by a rotation corresponding to the orientation of image capture apparatus at the time the near point was captured relative to the orientation at the time the far point was captured.

The technique 1290 includes determining 1296 one of the compensated epipolar lines based on the far point and the compensated near point. Points (e.g., pixels or blocks of pixels) of the compensated epipolar line may be determined 1296 by linear interpolation between the far point and the compensate near point. For example, an intermediate point of the compensated epipolar line may be determined as $P_3'=kP_1+(1-k)P_2'$. The points of the compensated epipolar line may be searched in a one-dimensional search for correspondence between two images being stitched to determine parallax correction displacement (e.g., binocular disparity) for stitching the two images.

Some image capture devices use lenses (e.g., fish-eye or spherical lenses) that significantly distort captured images. An image signal processor may apply a warp transformation to correct lens distortion and other distortions associated with the capture of images with one or more image sensors (e.g., electronic rolling shutter correction, binocular disparity correction, image stitching, electronic image stabilization, etc.) Because some of these distortions can be significant, the warp transformation to correct them may significantly move portions (e.g., pixels or blocks of pixels) within the image(s). The warp transformation may even move portions outside of the current range of portions stored in an internal memory structure (e.g., a line buffer) used by the image signal processor to temporarily store portions of high data rate image (e.g., video) signals as it processes those images in pieces. As a consequence, either the input or output of the warp transformation may need to written to a larger external memory as a complete image or set of related images that can be accessed in an arbitrary order of the portions using limited memory bandwidth, which can be a precious resource in an image processing pipeline. Of course, complete images could be written to external memory before and after the warp transformation, but that would waste memory bandwidth.

Depending on the architecture of an image signal processing pipeline, writing complete images to external memory before or after the warp transformation may be preferred. For example, where an encoder requires writing of complete source images in external memory anyway, it may be advantageous to process the warp transformation in an order (e.g., a raster order) that is compatible with other processing performed by the image signal processor (e.g., temporal noise reduction) and perform the warp transformation on portions of the processed input image(s) as they become available in internal memory structures of the image signal processor. However, portions of the warp transformation (e.g., disparity correction) may depend on current image data for a complete frame.

A warp transformation may be determined based on a pre-processed version (e.g., a low resolution copy) of one or more input images and specified by a warp mapping that includes records that associate portions of the one or more input images (e.g., frames of input video) with portions of an output image (e.g., a frame of output video). The records of this warp mapping may be sorted by the associated portions of the input image(s) according to an order (e.g., a raster order) that is compatible with other processing performed by the image signal processor. When data for the input images is processed (e.g., for temporal noise reduction and/or spatial noise reduction), the warp transformation specified by the warp mapping may be applied to portions of the processed image data as the processed image data becomes available and the resulting portions of an output image may be written to the external memory. In this manner, reads and writes to external memory between the warp transformation and other processing in the image signal processor may be avoided and memory bandwidth and/or processor time may be conserved to improve the performance of the image capture device.

Figure 13:
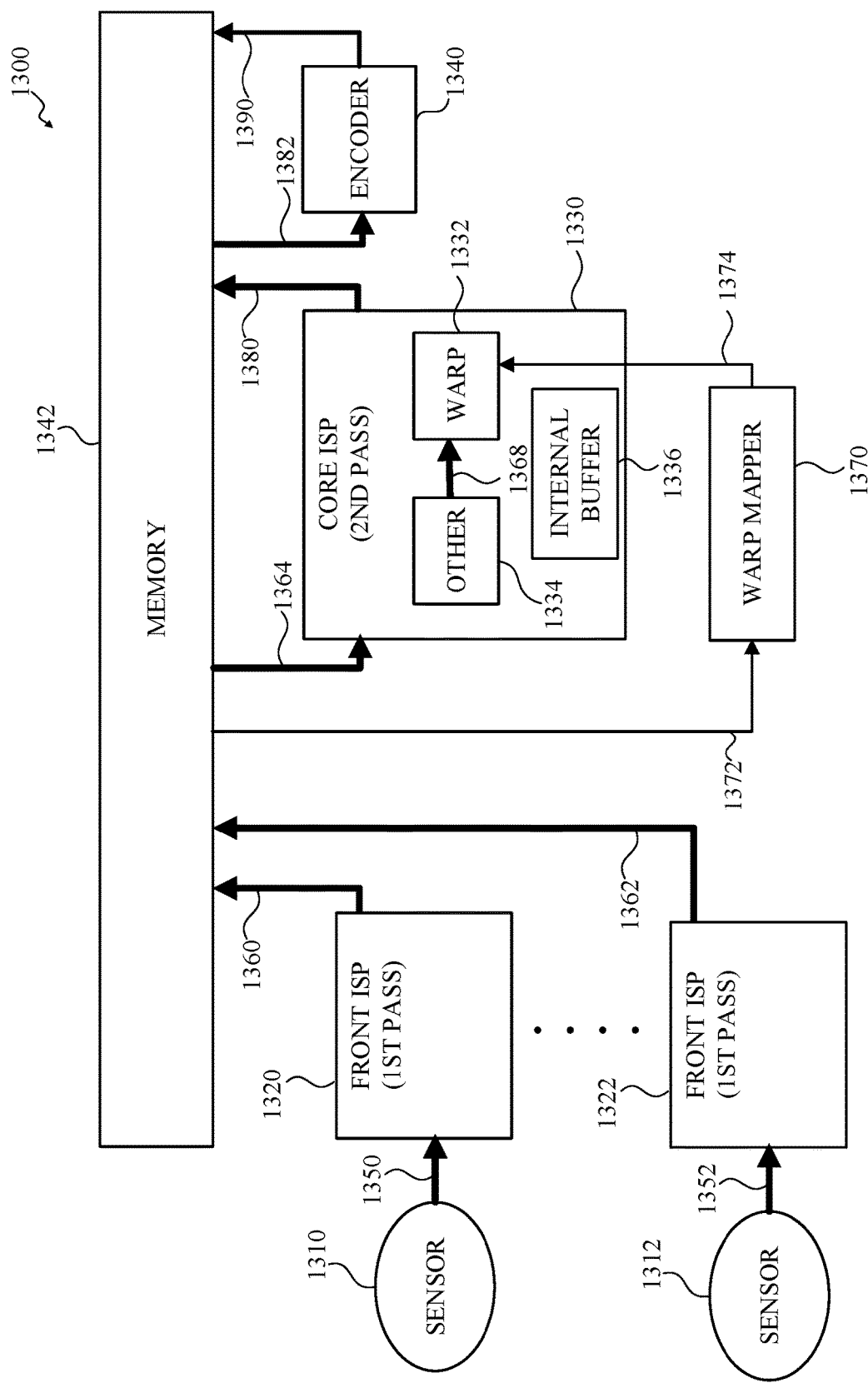
FIG. 13 is a block diagram of an example of an image signal processing and encoding pipeline, utilizing a warp mapping.

FIG. 13 is a block diagram of an example of an image signal processing and encoding pipeline 1300. In this example, an image signal processor implements a multi-pass processing in two stages. A first stage of the image signal processor includes front ISPs 1320 and 1322 that perform first pass processing on images captured by respective image sensors 1310 and 1312. A second stage of the image signal processor includes a core ISP 1330 that performs second pass processing on partially processed image data 1364, including warping and blending the images using warp module 1332, to produce an output image 1380 that combines the fields of view from the multiple image sensors 1310 and 1312. The output image 1380 may then be passed to an encoder 1340 for encoding in a compressed format. Within the core ISP 1330, other second pass functions 1334 (e.g., temporal noise reduction (TNR)) are performed, some of which may be more effectively or efficiently performed prior to warping and blending, using the warp module 1332, the images from the image sensors 1310 and 1312. Processed image data 1368 is passed directly (e.g., using an internal buffer 1336) from the other second pass image processing functions 1334 to the warp and blend functions of the warp module 1332 as it is generated (e.g., in raster order), avoiding an intermediate write to and read from a memory 1342. Performing the warp and blend functions of the warp module 1332 as the processed image data 1368 is generated (e.g., in raster order) may be facilitated by a warp mapper 1370 that reads data 1372 for complete images (e.g., frames of video) from the partially processed image data 1360 and 1362 (e.g., low resolution copies of the images to conserve memory bandwidth and/or reduce processor utilization) and determines warp mappings 1374 for the complete images based on the data 1372 and makes those mappings available to the warp module 1332 in the core ISP 1330 by the start of the second pass processing for the corresponding images in the core ISP 1330. This example configuration of the pipeline 1300 may conserve processing resources, including memory bandwidth and processor time, and/or reduce latency. In some implementations, the image signal processing and encoding pipeline 1300 may be included in an image capture device, such as one or more of the image capture devices 130, 132, 134 shown in FIG. 1 or the image capture device 210 shown in FIG. 2A, or an image capture apparatus, such as the image capture apparatus 110 shown in FIG. 1 or the image capture apparatus 300 shown in FIG. 3. In some implementations, the image signal processing and encoding pipeline 1300 shown in FIG. 13 may be similar to the image processing and coding pipeline 400 shown in FIG. 4, except as described herein.

The image signal processing and encoding pipeline 1300 includes the two image sensors 1310 and 1312. The input image signal 1350 from the image sensor 1310 is passed to the front ISP 1320 for initial processing. For example, the front ISP 1320 may be similar to front ISP 510 of FIG. 5 and implement some or all of that component's functions. The front ISP 1320 may process the input image signal 1350 to generate partially processed image data 1360 that may be subject to one or more additional passes of processing in the core ISP 1330 before being input to the encoder 1340. One or more frames of partially processed image data 1360 may be concurrently stored in the memory 1342 to await additional processing by the core ISP 1330. In some implementations, the front ISP 1320 may determine a low resolution image based on an image in the input image signal 1350. The low resolution image may be output as part of the partially processed image data 1360 along with or in lieu of a full resolution image in the partially processed image data 1360. Having a low resolution image included in the partially processed image data 1360 may facilitate efficient performance of downstream functions in the pipeline 1300. The input image signal 1352 from the image sensor 1312 is passed to the front ISP 1322 for initial processing. For example, the front ISP 1322 may be similar to front ISP 510 of FIG. 5 and implement some or all of that component's functions. The front ISP 1322 may process the input image signal 1352 to generate partially processed image data 1362 that may be subject to one or more additional passes of processing in the core ISP 1330 before being input to the encoder 1340. One or more frames of partially processed image data 1362 may be concurrently stored in the memory 1342 to await additional processing by the core ISP 1330. In some implementations, the front ISP 1322 may determine a low resolution image based on an image in the input image signal 1352. The low resolution image may be output as part of the partially processed image data 1362 along with or in lieu of a full resolution image in the partially processed image data 1362. Having a low resolution image included in the partially processed image data 1362 may facilitate efficient performance of downstream functions in the pipeline 1300.

The warp mapper 1370 may determine the warp mapping 1374 for an image (e.g. a frame of video) in the partially processed image data 1360 and 1362. For example, the warp mapper 1370 may implement the technique 1200 of FIG. 15A to determine the warp mapping 1374 based on data 1372 from the partially processed image data 1360 and 1362. In some implementations, the warp mapper 1370 may determine a sequence of transformations to be applied by the warp module 1332 to corresponding processed image data 1368 for an image (e.g., a frame of video) and specify those transformations with the warp mapping 1374. For example, such a sequence of transformations may include lens distortion correction, electronic rolling shutter correction, disparity based alignment and blending of images from multiple image sensors, electronic image stabilization rotation, and/or projection into a chosen output space for resulting output images. Some transformations specified by the warp mapping 1374 may be determined in whole or in part based on motion sensor measurements (e.g., from a gyroscope, magnetometer, and/or accelerometer) associated with an image (e.g., a frame of video). For example, electronic rolling shutter correction or electronic image stabilization may be based on motion sensor measurements associated with an image. Some transformations specified by the warp mapping 1374 may be determined based on data 1372 for the subject image. For example, a disparity based alignment and blending transformation may analyze data 1372 (e.g., low resolution images from multiple sensors) for the image to determine disparities and determine an alignment and blending ratios for portions of the input images.

The warp mapping 1374 may include a set of records that specify portions (e.g., pixels or blocks of pixels) of the input images that are associated with (i.e., will be used to determine) portions (e.g., pixels or blocks of pixels) of the corresponding output image. The warp mapper 1370 may sort the records of the warp mapping 1374 according to an order (e.g., a raster order) of the portions of the input images. This sorting of the records of the warp mapping 1374 may facilitate the application of the warp mapping 1374 to processed image data 1368 as it is generated in the same order and fed directly into the warp module 1332.

For example, the warp mapper 1370 may be implemented as part of the image signal processor (e.g., a component of the core ISP 1330). In some implementations (not shown), the warp mapper 1370 may be implemented as software running on an application processor with access to the memory 1342 and the warp mappings 1374 may be passed to the core ISP 1330 via the memory 1342. The warp mapper 1370 may be easier or cheaper to update or modify than some implementations of the image signal processor or some implementations of the encoder 1340 (e.g., an encoder that is implemented in hardware and/or provided as object code). The warp mapper 1370 may be modified in order to format output images 1380 from an image signal processor in a format that an encoder is designed to receive. Using the warp mapper 1370 implemented as software running on an application processor may reduce the cost and delays associated with maintaining the encoding pipeline 1300 as different components in the pipeline 1300 are updated.

The core ISP 1330 reads partially processed image data 1364 from the memory 1342 and performs a second pass of processing to generate output image data 1380. The warp module 1332 in the core ISP 1330 applies one or more transformations specified by the warp mapping 1374 to processed image data 1368 as the processed image data is generated (e.g., in a raster order) by the other functions 1334 of the core ISP 1330. For example, the core ISP 1330 may perform other functions 1334 (e.g., temporal noise reduction) of the image signal processor 500 discussed in relation to FIG. 5 to generate the processed image data 1368. The core ISP 1330 may include an internal buffer 1336 that stores less than a complete frame of the image data. For example, the internal buffer 1336 may be a line buffer that stores a few lines of pixels from a full resolution input image at any given time. The processed image data 1368 may be passed directly to the warp module 1332 without being written to the memory 1342. For example, one or more blocks of pixels of the processed image data 1368, as they are completed, may be stored in the internal buffer 1336 and read by the warp module 1332. For example, pixels of the processed image data 1368 may be read from the internal buffer 1336 in raster order as those pixels become available. By avoiding an intermediate write to and read from the memory 1342 for the processed image data 1368 as it passes from the other functions 1334 to the warp module 1332, computing resources (e.g., memory and processor bandwidth) may be conserved.

The encoder 1340 may receive source image data 1382. For example, the encoder 1340 may read the source image data 1382 from the memory 1342. Although described herein as source image data 1382, the source image data 1382 may include the output image data 1380 stored by the core ISP 1330 for one or more frames, such as frames of a video sequence.

Although not shown in FIG. 13, in some implementations, the core ISP 1330 may omit storing the output image data 1380 in the memory 1342. In some implementations, the encoder 1340 may receive the source image data 1382 directly from the core ISP 1330.

In some implementations, the encoder 1340 may read one or more source frames of video data, which may include buffering the source frames, such as in an internal data storage unit of the encoder 1340.

In some implementations, the encoder 1340 may compress the source image data 1382. Compressing the source image data 1382 may include reducing redundancy in the image data. For example, reducing redundancy may include reducing spatial redundancy based on a frame, reducing temporal redundancy based on the frame and one or more previously encoded frames, or reducing both spatial and temporal redundancy.

In some implementations, the encoder 1340 may encode each frame of a video sequence on a block-by-block basis. For example, the encoder 1340 may encode a current block of a current frame from the source image data 1382, which may include generating a predicted block based on previously coded information, such as one or more previously coded and reconstructed blocks or frames. Generating a prediction block may include performing motion compensation, which may include performing motion estimation, which may include identifying a portion, or portions, of one or more previously encoded and reconstructed frames, which may be referred to herein as reference frames, that closely matches the current block. A displacement between a spatial location of the current block in the current frame and a matching portion of the reference frame may be indicated by a motion, or displacement, vector. A difference between the prediction block and the current block may be identified as a residual or a residual block. The residual block may be transformed using a transform, such as a discrete cosign transform (DCT), an asymmetric discrete sine transform (ADST), or any other transform or combination of transforms, to generate a transform block including transform coefficients, which may be represented as a matrix, which may have the size and shape of the residual block. The encoder 1340 may perform quantization to quantize the transform coefficients, which may reduce the accuracy of the encoded data, the bandwidth utilization for the encoded data, or both. The quantized transform coefficients, the motion vectors, other encoding data, or a combination thereof may be entropy coded to generate entropy coded data, which may be referred to herein as the encoded data or the encoded output, and the encoded data may be output by the encoder 1040 as encoded output 1390. Although block-based encoding is described herein, other image coding techniques, such as coding based on arbitrary size and shape units, may be implemented in accordance with this disclosure.

In some implementations, the encoder 1340 may output, such as store, transmit, or both, the encoded data as encoded output 1390. For example, the encoder 1340 may store the encoded data as encoded output 1390 in the memory 1342, may transmit the encoded output 1390 to another device (not shown), or may store the encoded data as encoded output 1390 in the memory 1342 and transmit the encoded output 1390 to another device (not shown).

In some implementations, the encoded output 1390 may be received by a decoder (not shown), and may be decompressed, or decoded, to generate a reconstructed image or video corresponding to the source image data 1382.

In some implementations, one or more elements of encoding the source image data 1382, such as entropy coding, may be lossless. A reconstructed image or video generated based on losslessly encoded image or video data may be identical, or effectively indistinguishable, from the source image data 1382.

In some implementations, one or more elements of encoding the source image data 1382, such as quantization, may be lossy, such that some information, or the accuracy of some information, compressed by lossy compression may be lost or discarded or may be otherwise unavailable for decoding the encoded data. The accuracy with which a reconstructed image or video generated based on encoded image data encoded using lossy compression matches the source image data 1382 may vary based on the amount of data lost, such as based on the amount of compression. In some implementations, the encoder 1340 may encode the source image data 1382 using a combination of lossy and lossless compression.

Many variations (not shown) of the pipeline 1300 may be used to implement the techniques described herein. For example, a pipeline may include more than two image sensors (e.g., six image sensors on the faces of a cube shaped device) and the image signal processor can warp and blend images from all the images sensors. Additional front ISPs may also be included to handle initial processing for images from additional image sensors.

Figure 14:
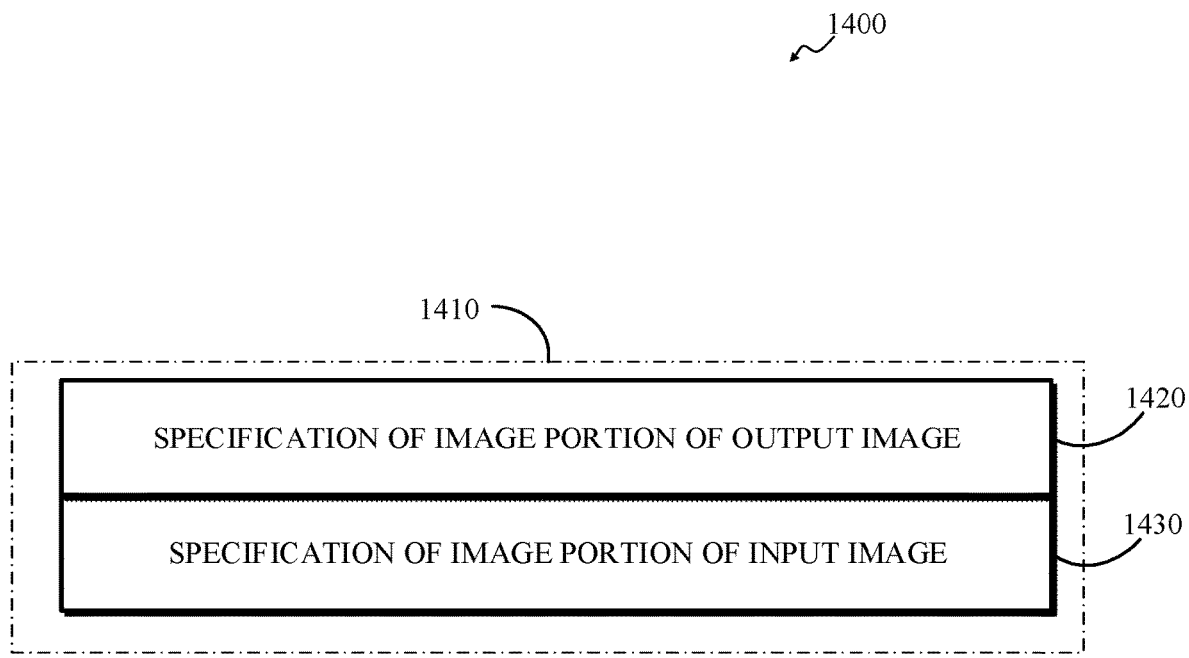
FIG. 14 is a memory map showing an example format for a record stored as part of warp mapping.

FIG. 14 is a memory map 1400 showing an example format for a record 1410 stored as part of warp mapping. In this example, the record 1410 of the warp mapping includes a specification 1420 of an image portion (e.g., a pixel or block of pixels) of an output image and a specification 1430 of an image portion (e.g., a pixel or block of pixels) of an input image. For example, an image portion may be specified by an address or position (e.g., as an ordered pair of coordinates or as raster number) within the respective image and/or a size (e.g., length and width in number of pixels). The specification 1430 of the image portion of the input image may also identify an input image from among a set of input images (e.g., using an image sensor identification number). A warp mapping may include many records in the format of record 1410 that collectively specify a mapping of image portions of processed input images to image portions of a composite output image. In some implementations, multiple records are associated with image portions corresponding to a seam where blending will be applied. Blending ratios for combining pixels from multiple input images in a seam may be determined based on output image coordinates in relation to a stitching boundary specified in output image coordinates. These blending ratios may be calculated during blending (e.g., as linear function of distance from a stitching boundary with clipping) and/or stored in a table of blending ratios indexed by coordinates in the output image corresponding to the seam(s).

In some implementations (not shown), blend ratios may be stored as fields in the some or all of the records of the warp mapping. For example, a blend ratio may be stored as a fixed point integer or a float representing a weighting to be applied to the image portion of an input image specified by specification 1430 when determining the image portion of the output image specified by specification 1420 during application of the warp mapping.

Where certain elements of these implementations may be partially or fully implemented using known components, those portions of such known components that are necessary for an understanding of the present disclosure have been described, and detailed descriptions of other portions of such known components have been omitted so as not to obscure the disclosure.

In the present specification, an implementation showing a singular component should not be considered limiting; rather, the disclosure is intended to encompass other implementations including a plurality of the same component, and vice-versa, unless explicitly stated otherwise herein.

Further, the present disclosure encompasses present and future known equivalents to the components referred to herein by way of illustration.

As used herein, the term "bus" is meant generally to denote any type of interconnection or communication architecture that may be used to communicate data between two or more entities. The "bus" could be optical, wireless, infrared or another type of communication medium. The exact topology of the bus could be, for example, standard "bus," hierarchical bus, network-on-chip, address-event-representation (AER) connection, or other type of communication topology used for accessing, e.g., different memories in a system.

As used herein, the terms "computer," "computing device," and "computerized device" include, but are not limited to, personal computers (PCs) and minicomputers (whether desktop, laptop, or otherwise), mainframe computers, workstations, servers, personal digital assistants (PDAs), handheld computers, embedded computers, programmable logic devices, personal communicators, tablet computers, portable navigation aids, Java 2 Platform, Micro Edition (J2ME) equipped devices, cellular telephones, smart phones, personal integrated communication or entertainment devices, or literally any other device capable of executing a set of instructions.

As used herein, the term "computer program" or "software" is meant to include any sequence of human or machine cognizable steps which perform a function. Such program may be rendered in virtually any programming language or environment including, for example, C/C++, C #, Fortran, COBOL, MATLAB™, PASCAL, Python, assembly language, markup languages (e.g., HTML, Standard Generalized Markup Language (SGML), XML, Voice Markup Language (VoxML)), as well as object-oriented environments such as the Common Object Request Broker Architecture (CORBA), Java™ (including J2ME, Java Beans), and/or Binary Runtime Environment (e.g., Binary Runtime Environment for Wireless (BREW)).

As used herein, the terms "connection," "link," "transmission channel," "delay line," and "wireless" mean a causal link between any two or more entities (whether physical or logical/virtual) which enables information exchange between the entities.

As used herein, the terms "integrated circuit," "chip," and "IC" are meant to refer to an electronic circuit manufactured by the patterned diffusion of trace elements into the surface of a thin substrate of semiconductor material. By way of non-limiting example, integrated circuits may include field programmable gate arrays (e.g., FPGAs), a programmable logic device (PLD), reconfigurable computer fabrics (RCFs), systems on a chip (SoC), application-specific integrated circuits (ASICs), and/or other types of integrated circuits.

As used herein, the term "memory" includes any type of integrated circuit or other storage device adapted for storing digital data, including, without limitation, read-only memory (ROM), programmable ROM (PROM), electrically erasable PROM (EEPROM), dynamic random access memory (DRAM), Mobile DRAM, synchronous DRAM (SDRAM), Double Data Rate 2 (DDR/2) SDRAM, extended data out (EDO)/fast page mode (FPM), reduced latency DRAM (RLDRAM), static RAM (SRAM), "flash" memory (e.g., NAND/NOR), memristor memory, and pseudo SRAM (PSRAM).

As used herein, the terms "microprocessor" and "digital processor" are meant generally to include digital processing devices. By way of non-limiting example, digital processing devices may include one or more of digital signal processors (DSPs), reduced instruction set computers (RISC), general-purpose complex instruction set computing (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW110, and/or other variations), USB (e.g., USB2), Ethernet (e.g., 10/100, 10/100/1000 (Gigabit Ethernet), 10-Gig-E, and/or other Ethernet implementations), MoCA, Coaxsys (e.g., TVnet™), radio frequency tuner (e.g., in-band or out-of-band, cable modem, and/or other radio frequency tuner protocol interfaces), Wi-Fi (802.11), WiMAX (802.16), personal area network (PAN) (e.g., 802.15), cellular (e.g., 3G, LTE/LTE-A/TD-LTE, GSM, and/or other cellular technology), IrDA families, and/or other network interfaces.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), High Speed Downlink Packet Access/High Speed Uplink Packet Access (HSDPA/HSUPA), Time Division Multiple Access (TDMA), Code Division Multiple Access (CDMA)(e.g., IS-95A, Wideband CDMA (WCDMA), and/or other wireless technology), Frequency Hopping Spread Spectrum (FHSS), Direct Sequence Spread Spectrum (DSSS), Global System for Mobile communications (GSM), PAN/802.15, WiMAX (802.16), 802.20, narrowband/Frequency Division Multiple Access (FDMA), Orthogonal Frequency Division Multiplex (OFDM), Personal Communication Service (PCS)/Digital Cellular System (DCS), LTE/LTE-Advanced (LTE-A)/Time Division LTE (TD-LTE), analog cellular, cellular Digital Packet Data (CDPD), satellite systems, millimeter wave or microwave systems, acoustic, infrared (i.e., IrDA), and/or other wireless interfaces.

As used herein, the term "robot" may be used to describe an autonomous device, autonomous vehicle, computer, artificial intelligence (AI) agent, surveillance system or device, control system or device, and/or other computerized device capable of autonomous operation.

As used herein, the terms "camera," or variations thereof, and "image capture device," or variations thereof, may be used to refer to any imaging device or sensor configured to capture, record, and/or convey still and/or video imagery which may be sensitive to visible parts of the electromagnetic spectrum, invisible parts of the electromagnetic spectrum (e.g., infrared, ultraviolet), and/or other energy (e.g., pressure waves).

While certain aspects of the technology are described in terms of a specific sequence of steps of a method, these descriptions are illustrative of the broader methods of the disclosure and may be modified by the particular application. Certain steps may be rendered unnecessary or optional under certain circumstances. Additionally, certain steps or functionality may be added to the disclosed implementations, or the order of performance of two or more steps may be permuted. All such variations are considered to be encompassed within the disclosure.

While the above-detailed description has shown, described, and pointed out novel features of the disclosure as applied to various implementations, it will be understood that various omissions, substitutions, and changes in the form and details of the devices or processes illustrated may be made by those skilled in the art without departing from the disclosure. The foregoing description is in no way meant to be limiting, but rather should be taken as illustrative of the general principles of the technology.

What is claimed is:

1. A system comprising:
    a first image sensor configured to capture a first image;
    a second image sensor configured to capture a second image; and
    a processing apparatus that is configured to:
        receive the first image from the first image sensor;
        receive the second image from the second image sensor;
        determine compensated epipolar lines based on electronic rolling shutter data;
        determine a parallax correction mapping based on the first image, the second image, and the compensated epipolar lines;
        determine a warp mapping based on the parallax correction mapping and an electronic rolling shutter correction mapping, wherein the warp mapping applies the electronic rolling shutter correction mapping to output of the parallax correction mapping; and
        apply the warp mapping to image data based on the first image and the second image to obtain a composite image.

2. The system of claim 1, in which determining the compensated epipolar lines based on electronic rolling shutter data comprises:
    determining a far point and a near point for an initial epipolar line;
    determining a compensated near point based on the near point and electronic rolling shutter data for the near point; and
    determining one of the compensated epipolar lines based on the far point and the compensated near point.

3. The system of claim 1, in which the electronic rolling shutter correction mapping is determined at a lower resolution than the parallax correction mapping.

4. The system of claim 1, comprising a camera housing that contains the first image sensor, the second image sensor, and the processing apparatus.

5. The system of claim 1, comprising an angular rate sensor and in which the processing apparatus is configured to determine the electronic rolling shutter correction mapping by performing operations comprising:
    receiving angular rate measurements from the angular rate sensor for a device including the first image sensor and the second image sensor for times during capture of the first image and the second image; and
    determining the electronic rolling shutter correction mapping based on the angular rate measurements and times when portions of the first image and the second image were captured using an electronic rolling shutter.

6. The system of claim 5, in which the processing apparatus is configured to determine the electronic rolling shutter correction mapping by performing operations comprising:
    determining rotations for respective portions of the first image and the second image based on the angular rate measurements corresponding to times when the respective portions were captured; and
    interpolating the rotations to determine interpolated rotations for smaller image portions of the first image and the second image; and
    determining the electronic rolling shutter correction mapping based on the interpolated rotations.

7. The system of claim 1, in which the warp mapping includes records that associate image portions of the composite image with corresponding image portions of the first image and the second image.

8. The system of claim 1, comprising:
    a first fish-eye lens attached to the first image sensor; and
    a second fish-eye lens attached to the second image sensor.

9. The system of claim 1, in which the warp mapping is further determined based on an output projection mapping, such that the warp mapping applies the output projection mapping to output of the electronic rolling shutter correction mapping.

10. A method comprising:
receiving a first image from a first image sensor;
receiving a second image from a second image sensor;
determining a parallax correction mapping based on the first image and the second image for stitching the first image and the second image;
determining a warp mapping based on the parallax correction mapping and an electronic rolling shutter correction mapping, wherein the warp mapping applies the electronic rolling shutter correction mapping after the parallax correction mapping;
applying the warp mapping to image data based on the first image and the second image to obtain a composite image; and
storing, displaying, or transmitting an output image that is based on the composite image.

11. The method of claim 10, in which determining the parallax correction mapping comprises:
determining compensated epipolar lines based on electronic rolling shutter data; and
determining the parallax correction mapping based on the compensated epipolar lines.

12. The method of claim 11, in which determining the compensated epipolar lines based on electronic rolling shutter data comprises:
determining a far point and a near point for an initial epipolar line;
determining a compensated near point based on the near point and electronic rolling shutter data for the near point; and
determining one of the compensated epipolar lines based on the far point and the compensated near point.

13. The method of claim 11, in which determining the parallax correction mapping comprises:
performing a one-dimensional search for a parallax translation along one of the compensated epipolar lines.

14. The method of claim 10, in which determining the warp mapping comprises:
determining the warp mapping based on a lens distortion correction mapping for the first image and the second image, such that the warp mapping applies the parallax correction mapping to output of the lens distortion correction mapping.

15. The method of claim 10, in which the warp mapping is further determined based on an output projection mapping, such that the warp mapping applies the output projection mapping to output of the electronic rolling shutter correction mapping.

16. The method of claim 10, comprising:
receiving angular rate measurements from an angular rate sensor for a device including the first image sensor and the second image sensor for times during capture of the first image and the second image; and
determining the electronic rolling shutter correction mapping based on the angular rate measurements and times when portions of the first image and the second image were captured using an electronic rolling shutter.

17. A method comprising:
receiving a first image from a first image sensor;
receiving a second image from a second image sensor;
applying parallax correction for stitching the first image and the second image to obtain a composite image, wherein applying parallax correction comprises:
compensating epipolar lines for electronic rolling shutter distortion, and
determining parallax correction based on a one-dimensional search along the compensated epipolar lines; and
applying electronic rolling shutter correction to the composite image to obtain an electronic rolling shutter corrected image.

18. The method of claim 17, in which compensating the epipolar lines for electronic rolling shutter distortion comprises:
determining a far point and a near point for an initial epipolar line;
determining a compensated near point based on the near point and electronic rolling shutter data for the near point; and
determining one of the compensated epipolar lines based on the far point and the compensated near point.

19. The method of claim 17, comprising;
receiving angular rate measurements from an angular rate sensor for a device including the first image sensor and the second image sensor for times during capture of the first image and the second image; and
determining the electronic rolling shutter correction mapping based on the angular rate measurements and times when portions of the first image and the second image were captured using an electronic rolling shutter.

20. The method of claim 17, comprising;
storing, displaying, or transmitting an output image that is based on the electronic rolling shutter corrected image.

* * * * *